(12) United States Patent
Wajnikonis

(10) Patent No.: US 11,906,079 B2
(45) Date of Patent: Feb. 20, 2024

(54) TELESCOPICALLY ASSEMBLED MECHANICAL CONNECTOR

(71) Applicant: Krzysztof Jan Wajnikonis, Fresno, TX (US)

(72) Inventor: Krzysztof Jan Wajnikonis, Rosharon, TX (US)

(*) Notice: Subject to any disclaimer, the term of this patent is extended or adjusted under 35 U.S.C. 154(b) by 14 days.

(21) Appl. No.: 17/976,608

(22) Filed: Oct. 28, 2022

(65) Prior Publication Data

US 2023/0072067 A1 Mar. 9, 2023

Related U.S. Application Data

(63) Continuation-in-part of application No. 17/485,336, filed on Sep. 25, 2021, which is a continuation-in-part (Continued)

(51) Int. Cl.
*F16L 15/00* (2006.01)
*F16L 15/08* (2006.01)

(52) U.S. Cl.
CPC .............. *F16L 15/08* (2013.01); *F16L 15/002* (2013.01)

(58) Field of Classification Search
CPC ....... F16L 15/00; F16L 15/001; F16L 15/002; F16L 15/04; F16L 15/06; F16L 15/08;

(Continued)

(56) References Cited

U.S. PATENT DOCUMENTS 5,964,486 A 10/1999 Sinclair
8,056,940 B2 11/2011 Morgan et al.

(Continued)

FOREIGN PATENT DOCUMENTS

AU 2008211995 B2 4/2009
AU 2010238542 11/2010

(Continued)

OTHER PUBLICATIONS

Merlin Connector make-up; Oil States Industry animation slide set: Screen captures from YouTube video clip entitled "Merlin Connector", 12 pages, 35 slides uploaded on Nov. 18, 2018 by applicant Krzysztof J. Wajnikonis. Retrieved from the Internet by googling: 'Merlin connector YouTube', resulted with the hyperlink: <https://www.youtube.com/watch?v=hwf7sASvpjE>. Technology 5—30 years old; Screen captues from YouTube video clip entitled "Merlin Connector" uploaded on Nov. 18, 2018.

(Continued)

*Primary Examiner* — Aaron M Dunwoody

(57) ABSTRACT

A telescopically assembled, Merlin™ Family Connector is provided with one or more sets of threads on substantially matching frustoconical surfaces of a pin and a box of the connector. Strengthening means are introduced involving at least one of: a mechanical stiffening clamp interacting with an outside surface of the box or a mechanical stiffening clamp interacting with an inside surface of the pin. The stiffening clamps may include systems of arbitrarily oriented ribs and/or fairing surfaces. The said strengthening means may be essentially annular clamps that would have relatively regular shapes essentially conforming to the external or internal surfaces of the box or the pin, respectively. The above modifications can be introduced to traditional connectors and to connectors designed to transfer high torsional loads.

20 Claims, 15 Drawing Sheets

Related U.S. Application Data of application No. 16/920,350, filed on Jul. 2, 2020, now Pat. No. 11,156,313, which is a continuation-in-part of application No. 15/782,835, filed on Oct. 12, 2017, which is a continuation-in-part of application No. 15/239,696, filed as application No. PCT/US2016/028033 on Apr. 18, 2016, now Pat. No. 11,434,699.

(60) Provisional application No. 62/409,313, filed on Oct. 17, 2016, provisional application No. 62/189,437, filed on Jul. 7, 2015, provisional application No. 62/148,665, filed on Apr. 16, 2015.

(58) Field of Classification Search
CPC ..... F16L 25/0081; F16L 55/16; F16L 55/162; F16L 55/163; F16L 55/165; F16L 55/1651; F16L 55/1652; F16L 55/1656; F16L 55/168; F16L 55/1683; F16L 55/1686; F16L 55/17; F16L 55/1705; F16L 55/1715; F16L 55/172; F16L 55/1725; F16L 55/178

See application file for complete search history.

(56) References Cited

U.S. PATENT DOCUMENTS

| | | | |
|---|---|---|---|
| 8,550,171 | B2 | 10/2013 | Wajnikonis et al. |
| 8,689,882 | B2 | 4/2014 | Wajnikonis et al. |
| 9,657,530 | B2 * | 5/2017 | Vemuri ............... E21B 17/042 |
| 10,024,121 | B2 | 7/2018 | Wajnikonis |
| 10,240,400 | B1 | 3/2019 | Wajnikonis |
| 10,260,290 | B2 * | 4/2019 | Pollack ............... E21B 17/015 |
| 2013/0033035 | A1 * | 2/2013 | Gallagher ............ D05B 3/02 |
| | | | 285/332.2 |

FOREIGN PATENT DOCUMENTS

| | | |
|---|---|---|
| EP | 803637 A2 | 10/1997 |
| EP | 2042682 A3 | 12/2013 |
| GB | 2033518 A | 5/1980 |
| GB | 1573945 | 8/1980 |
| GB | 2099529 A | 12/1982 |
| GB | 2113335 A | 8/1983 |
| GB | 2556700 | 2/2021 |
| GB | 2556691 | 5/2021 |
| GB | 2591877 | 11/2021 |
| GB | 2591878 | 11/2021 |
| GB | 2591879 | 11/2021 |
| GB | 2591880 | 11/2021 |
| WO | WO 2016/168797 A1 | 10/2016 |
| WO | WO 2016/191637 A1 | 12/2016 |

OTHER PUBLICATIONS

A facsimile from the Federal Aviation Administration (FAA) website [downloaded on Mar. 23, 2023 by this applicant Krzysztof J Wajnikonis] with the hyperlink: <https://amsrvs.registry.faa.gov/airmeninquiry/Main.aspx>.

The Webster's Third New International Dictionary of the English Language Unabridged meaning of the word 'clamp', as it differs from coating. [Copied on Apr. 6, 2023 by this applicant Krzysztof J. Wajnikonis].

The Webster's Third New International Dictionary of the English Language Unabridged meaning of the word 'coating'. [Copied on May 24, 2023 by this applicant Krzysztof J. Wajnikonis].

The Webster's Third New International Dictionary of the English Language Unabridged meaning of the word 'structural'. [Copied on May 31, 2023 by this applicant Krzysztof J. Wajnikonis].

Applicants 37 CFR 1.68 Declaration—certifying the result of thickness measurements of two Walmart disposable grocery bags. [Micrometer measurements made by this applicant Krzysztof J. Wajnikonis on May 31, 2023], Jun. 1, 2023.

Jacket platform riser clamp [downloaded from the internet on Apr. 6, 2023 by this applicant Krzysztof (Christopher) J. Wajnikonis], hyperlink: <https://www.google.com/search?client=safari&hl=en-us&q=subsea%20Clamp%installation&ved=2ahUKEwjS_ZjL95X-AhXNIGoFHdU_D0MQmolCKAB6BAgIEBA&bjw=414&bih=686&dpr=3#fpstate=ive&vld=cid:14770006,vid:qlWL-Mj704M>.

Explanation of anodized coatings from Encyclopedia Britannica. [Facsimile downloaded by the applicant Krzysztof J Wajnikonis on May 25, 2023] hyperlink: <https://www.britannica.com/technology/anodizing >.

Anodized coatings from Anodize LLC. [This facsimile downloaded by the applicant Krzysztof J Wajnikonis on May 25, 2023] hyperlink: <https://anodizeinc.com/types-of-anodizing/#:~:text=Hard%20anodizing%20can%20be%20made.and%20electrical%20and%20thermal%20insulation. >.

Explanation of electroless plating from Encyclopedia Britannica. [This facsimile downloaded by the applicant Krzysztof J Wajnikonis on May 25, 2023] hyperlink: <https://www.britannica.com/technology/electroless-plating >.

Explanation of thermal spray coating from HTS Coatings. [This facsimile downloaded by the applicant Krzysztof J Wajnikonis on May 25, 2023] hyperlink: <https://htscoatings.com/pages/thermal-spray>.

Explanation of HVOF spray coating from HTS Coatings. [This facsimile downloaded by the applicant Krzysztof J Wajnikonis on May 25, 2023 ] hyperlink: < https://htscoatings.com/pages/hvof-spray >.

Explanation of spray and fuse coating from HTS Coatings. [This facsimile downloaded by the applicant Krzysztof J Wajnikonis on May 25, 2023 ] hyperlink: <https://htscoatings.com/pages/spray-and-fuse-coatings >.

Explanation of plasma spray coating from HTS Coatings. [This facsimile downloaded by the applicant Krzysztof J Wajnikonis on May 25, 2023 ] hyperlink: < https://htscoatings.com/pages/plasma-spray >.

Explanation ceramic coatings on examples of specific applications from Encyclopedia Britannica, but it has wider applications. [This facsimile downloaded by the applicant Krzysztof J Wajnikonis on May 25, 2023 ] hyperlink: <https://www.britannica.com/technology/automotive-ceramics >.

Explanation carbide beads coatings from Praxair Surface Technologies. [This facsimile downloaded by the applicant Krzysztof J Wajnikonis on May 25, 2023 ] hyperlink: <https://www.praxairsurfacetechnologies.com/en/coating-services/coatings/tungsten-carbide-coating?gclid=EAIaIQobChMItZK2uYGR_wIVADrUAR3ywgKAEAMYASAAEgLk0vD_BwE >.

Explanation on plastic coatings example from Encyclopedia Britannica. The applicant notes that it is a very wide area, but basics are outlined. [This facsimile downloaded by the applicant Krzysztof J Wajnikonis on May 25, 2023 ] hyperlink: <https://www.britannica.com/technology/surface-coating/Pigments >.

Explanationon metallic coatings example from Secoa Metal Finishing. [This facsimile downloaded by the applicant Krzysztof J Wajnikonis on May 25, 2023 ] hyperlink: <https://secoatech.com/protective-metallic-coatings-types-and-benefits/#:~:text=A%20metallic%20coating%20consists%20of.metalli%20coatings%20to%20surface.>.

Epoxy Paint Coatings ASTM. [Downloaded from American Concrete Institute website by the applicant Krzysztof J Wajnikonis on May 30, 2023], hyperlink: <https://www.concrete.org/publications/internationalconcreteabstractsportal.aspx?m=details&id=S1727018#:~:text=The%20allowalbe%20range%20of%20epoxy.(7%20to%2016%20mils).>.

Scotchcote™ Epoxy Paint Coating from 3M®. [Downloaded from 3M® Scotchcote™ website by the applicant Krzysztof J Wajnikonis on May 30, 2023], hyperlink: <https://www.3m.com/3M/en_US/p/d/b40063307/>.

Another type of paint coating listed by Vemuri: [Downloaded from Sanchem website by the applicant Krzysztof J Wajnikonis on May 30, 2023], hyperlink: <https://www.sanchem.com/docs/Safegard-CC-5000.pdf >.

(56) References Cited

OTHER PUBLICATIONS

Another epoxy coating listed by Vemuri: [Downloaded from houzz.com website by the applicant Krzysztof J Wajnikonis on May 30, 2023], hyperlink: < https://www.houzz.com/photos/epoxy-floor-coatings-flexcore%E2%84%A2-advanced-polymer-floor-coatings-patio-cleveland-phvw-vp~3354905 >.

Maynaplate coating. [Downloaded from General Magnaplate website by the applicant Krzysztof J Wajnikonis on May 30, 2023], hyperlink: <https://www.magnaplate.com/pdfs/brochurs/magnaplate_hcr.pdf >.

Xylan coatings. [Downloaded from Matrix Coatings website by the applicant Krzysztof J Wajnikonis on May 30, 2023], hyperlink: <https://matrixcoat.com/a-brief-intro-to-xylan-coatings/>.

Alodine® EC2™[Downloaded from amorgalv.com website by the applicant Krzysztof J Wajnikonis on May 30, 2023], hyperlink: <http://www.armorgalv.com/uploads/downloads/20.pdf>.

Specification for Unbonded Flexible Pipe, ANSI/API Specification 17J (API Spec 17J), 3$^{rd}$ Edition. [Downloaded from Law.resource.org/pub/us/cfr/ website by the applicant Krzysztof J Wajnikonis on Jun. 24, 2023], hyperlink: https://law.resource.org/pub/us/cfr/ibr/002/api.17j.2008.pdf, Jul. 2008.

Magma Global, printed to pdf from general information M-Pipe website, p. 2. [Downloaded from magmaglobal.com website by the applicant Krzysztof J Wajnikonis on Jun. 24, 2023], hyperlink: https://www. magmaglobal.com/m-pipe/.

Soluforce General Brochure, p. 3. [Downloaded from soluforce.com website by the applicant Krzysztof J Wajnikonis on Jun. 24, 2023], hyperlink: https://www.soluforce.com/content/dam/pipelife/soluforce/marketing/general/brochures/soluforce-general-brochure.pdf.

The Webster's Third New International Dictionary of the English Language Unabridged meaning of the work 'bond', selected for relevance. [Copied on Jun. 24, 2023 by this applicant Krzysztof J. Wajnikonis].

The Webster's Third New International Dictionary of the English Language Unabridged meaning of the word 'bond' as applied to 'coating' . [Copied on Jun. 24, 2023 by this applicant Krzysztof J. Wajnikonis].

\* cited by examiner

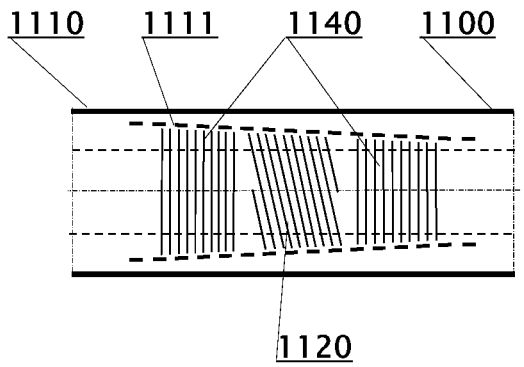
Fig. 11a
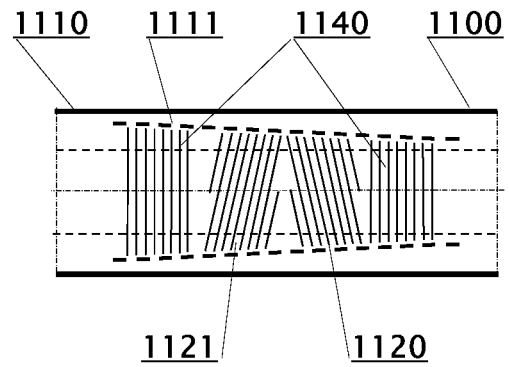
Fig. 11b
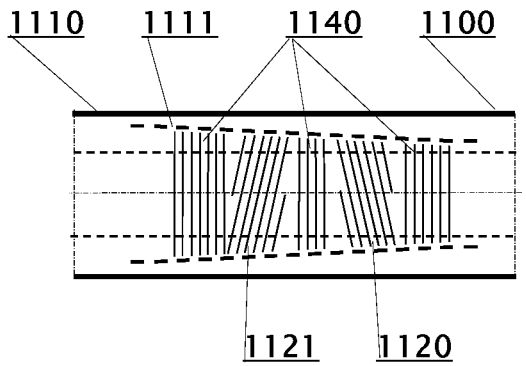
Fig. 11c
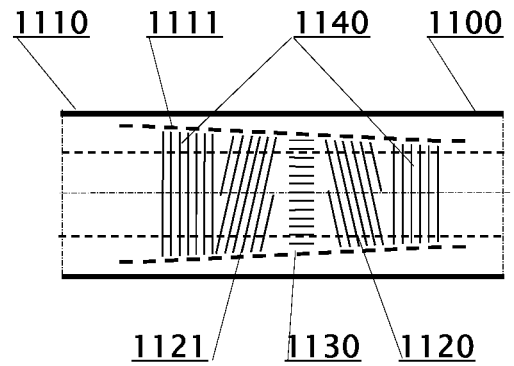
Fig. 11d
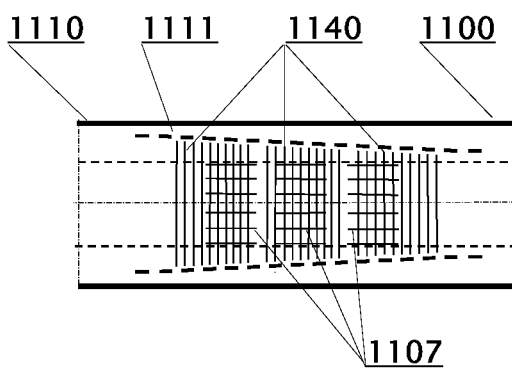
Fig. 11e
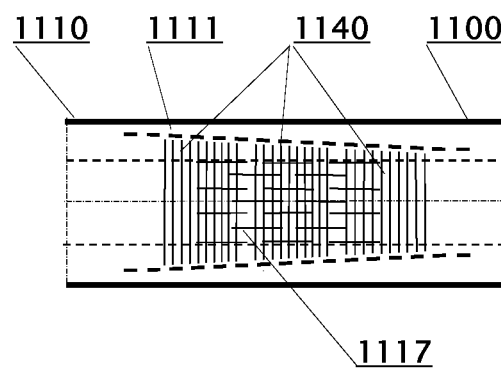
Fig. 11f
Fig. 11

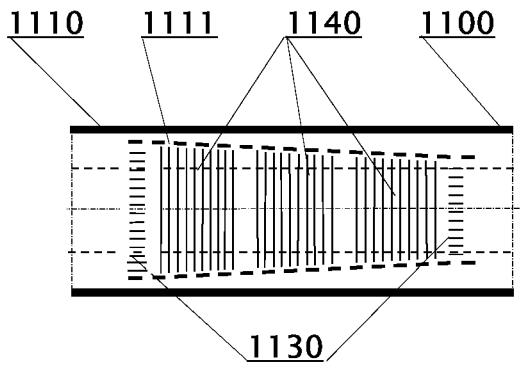
Fig. 11g
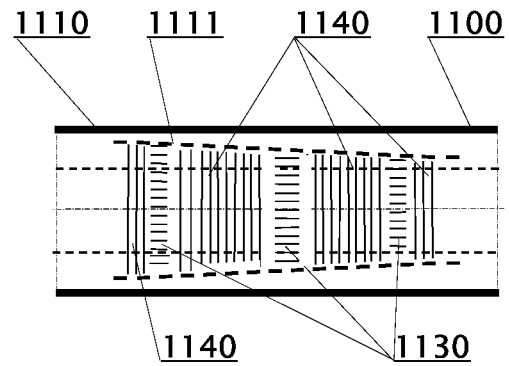
Fig. 11h
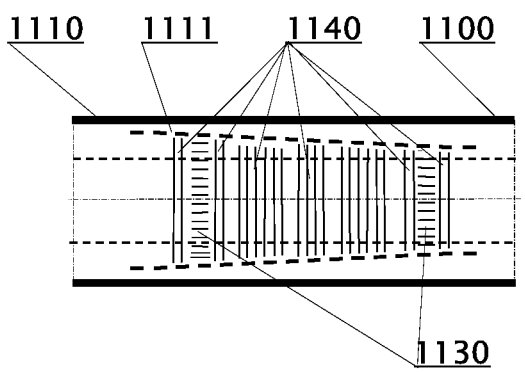
Fig. 11i
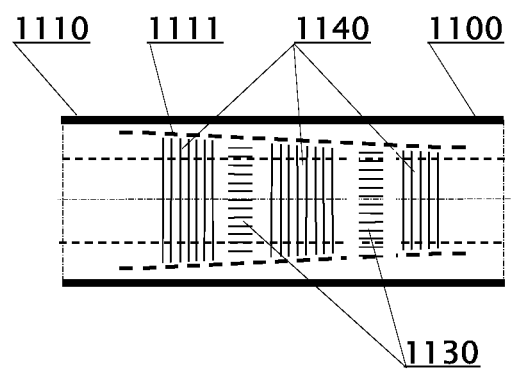
Fig. 11j
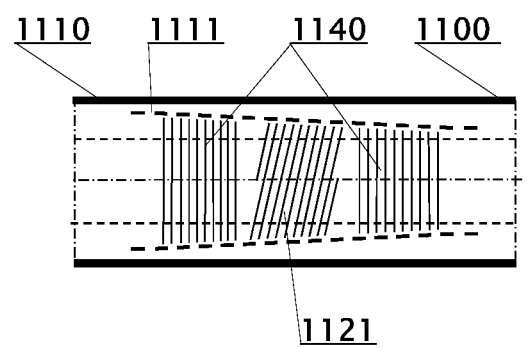
Fig. 11k
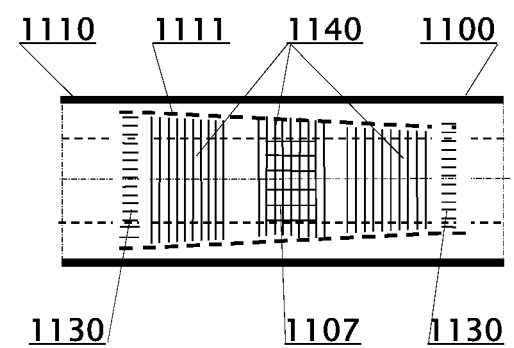
Fig. 11l
Fig. 11 continued

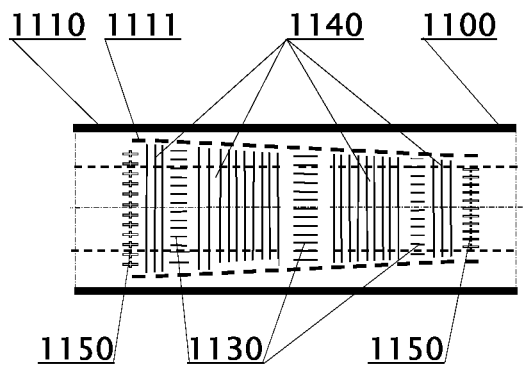
Fig. 11m
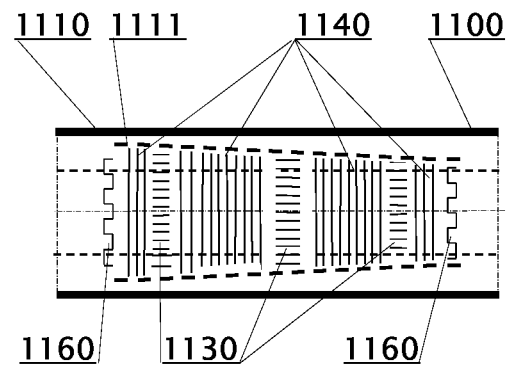
Fig. 11n
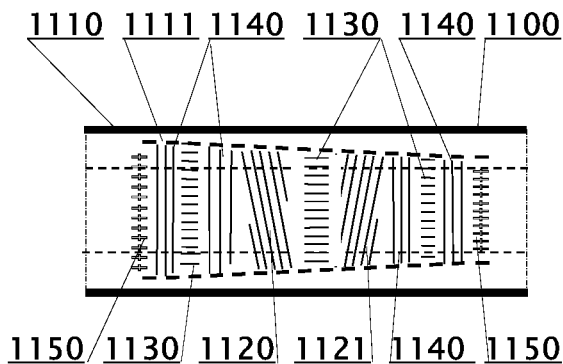
Fig. 11o
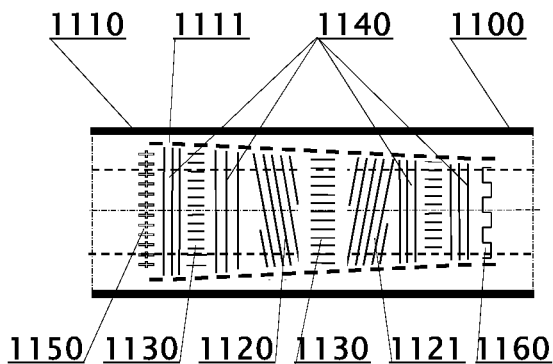
Fig. 11p
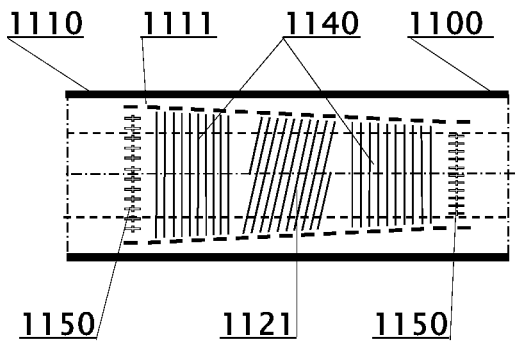
Fig. 11q
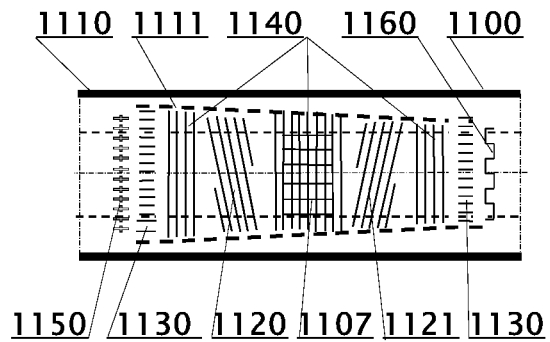
Fig. 11r
Fig. 11 continued

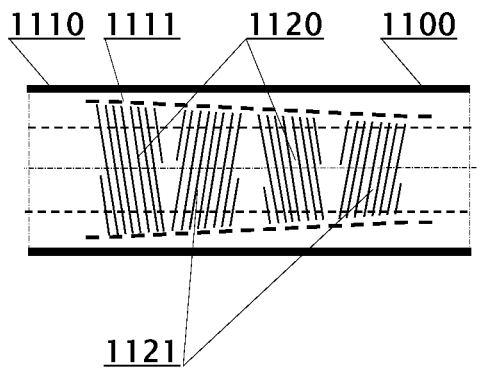
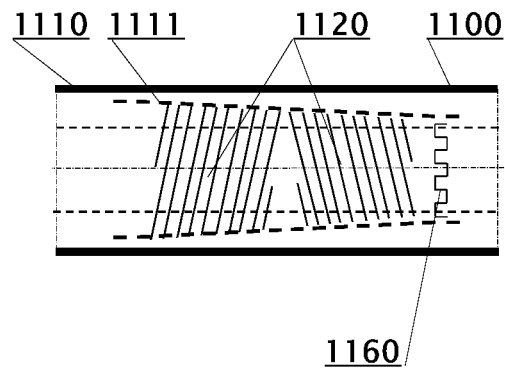
Fig. 11s
Fig. 11t
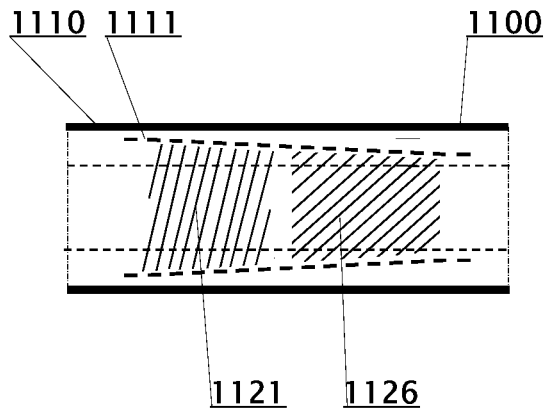
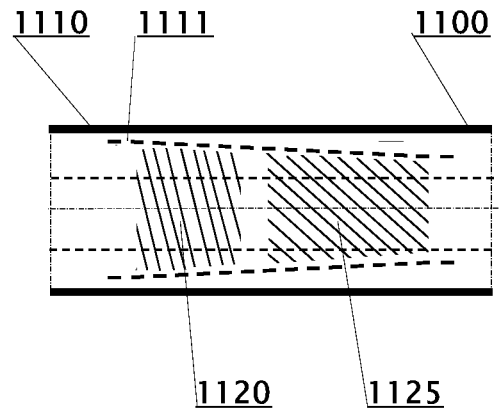
Fig. 11u
Fig. 11v
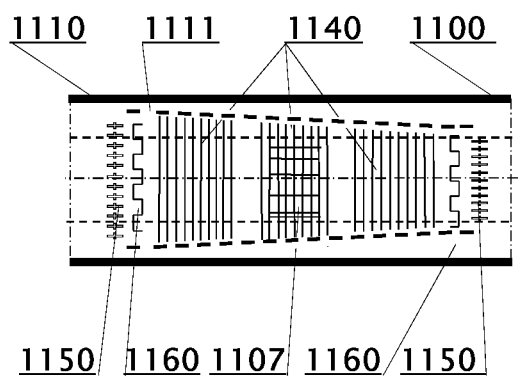
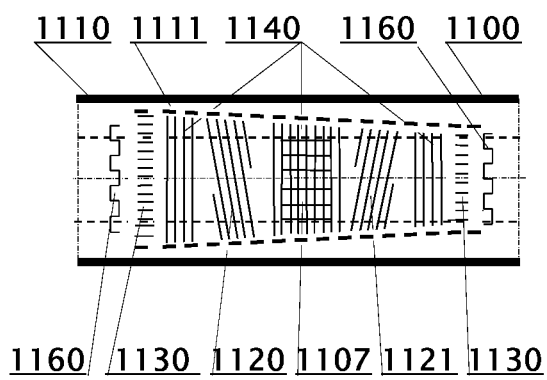
Fig. 11w
Fig. 11x
Fig. 11 continued

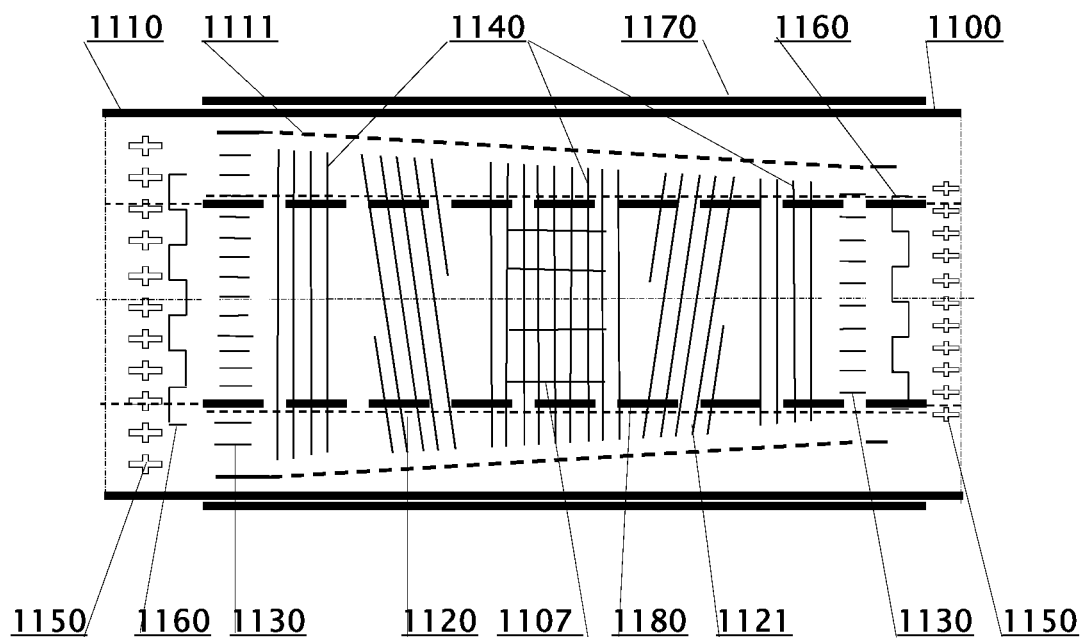
Fig. 11y
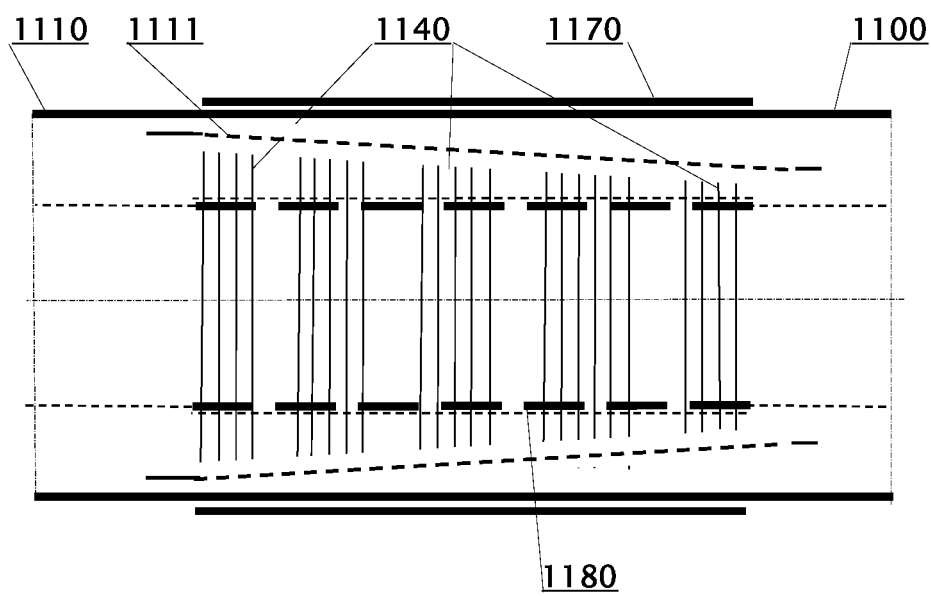
Fig. 11z
Fig. 11 continued

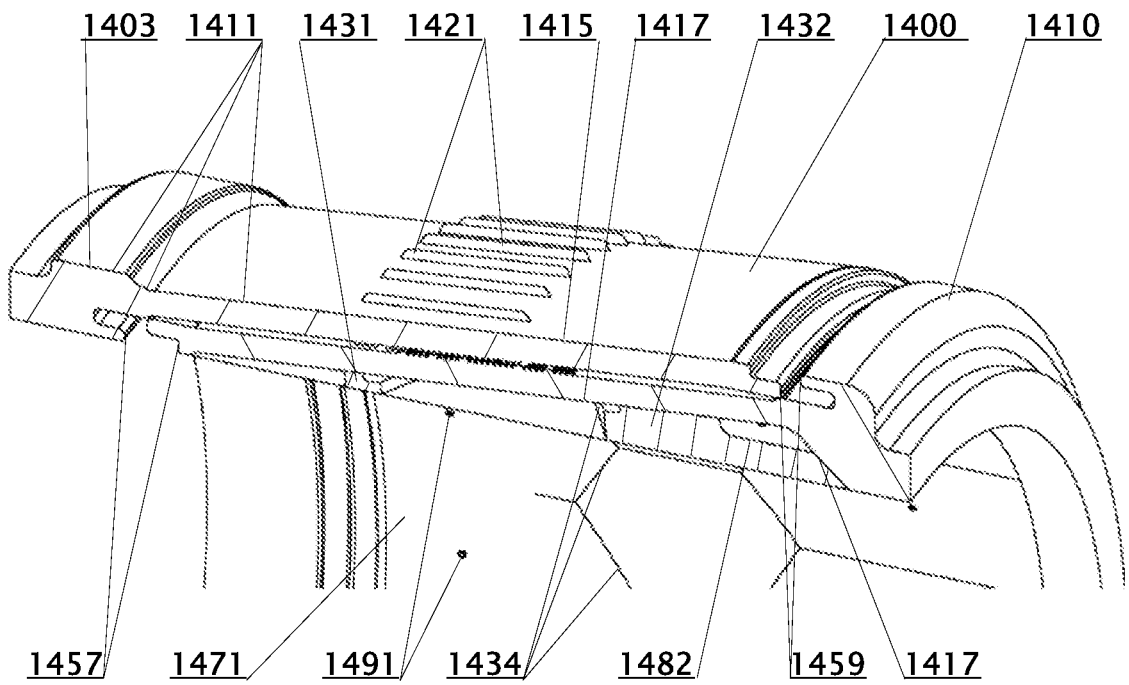
Fig. 14a
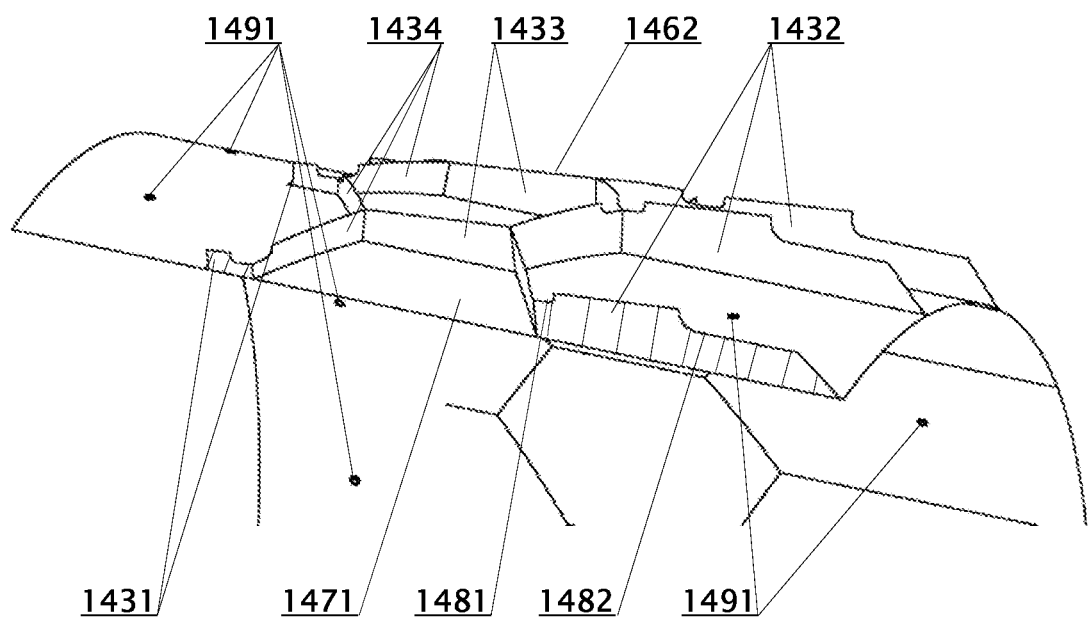
Fig. 14b
Fig. 14

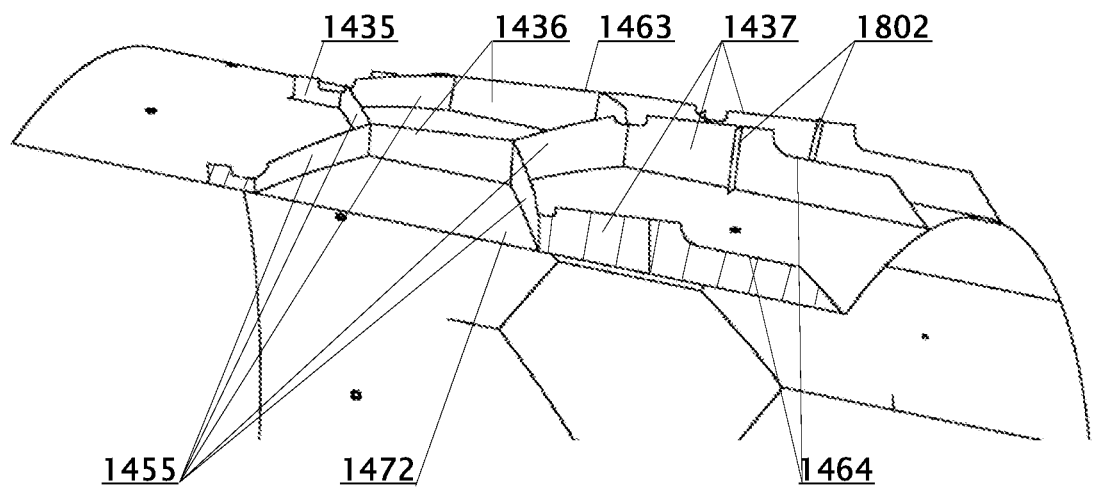
Fig. 14c
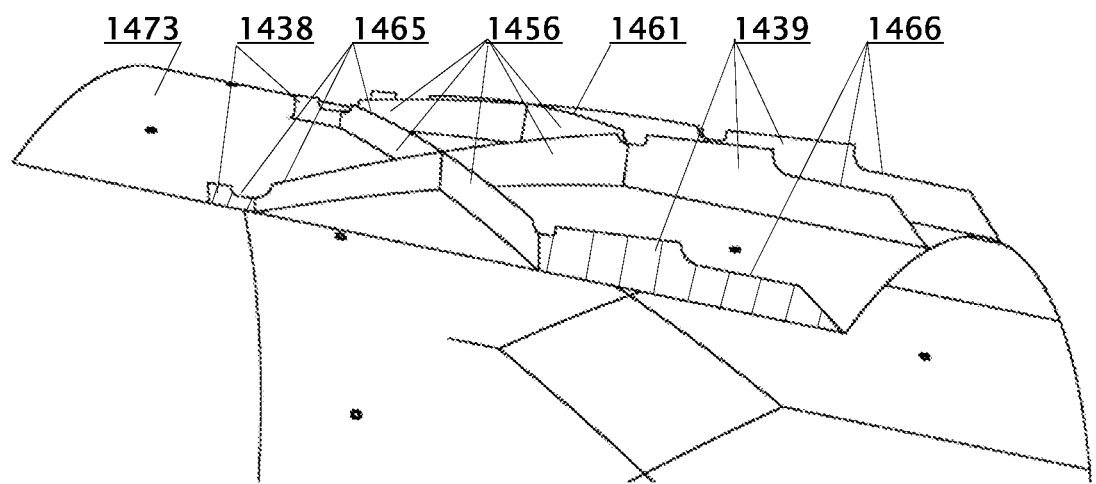
Fig. 14d
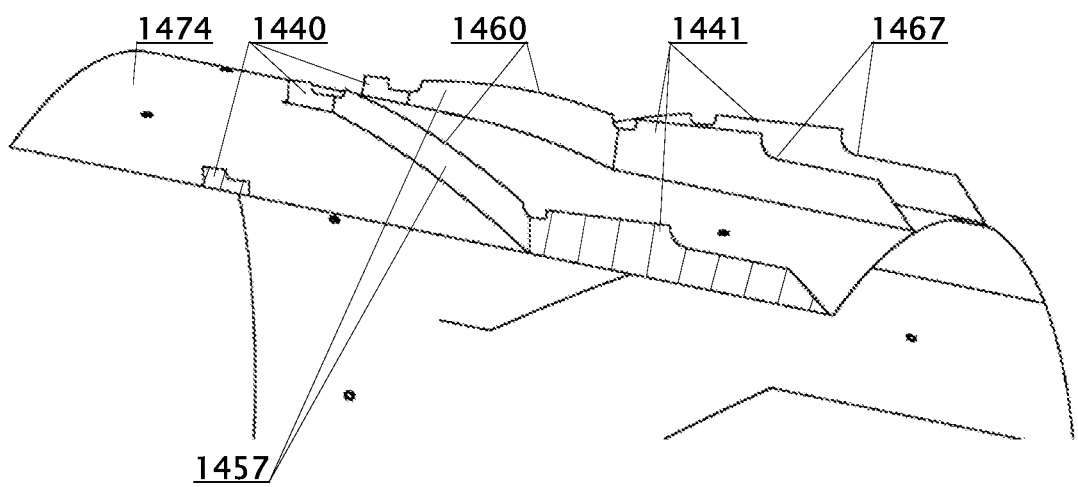
Fig. 14e
Fig. 14 continued

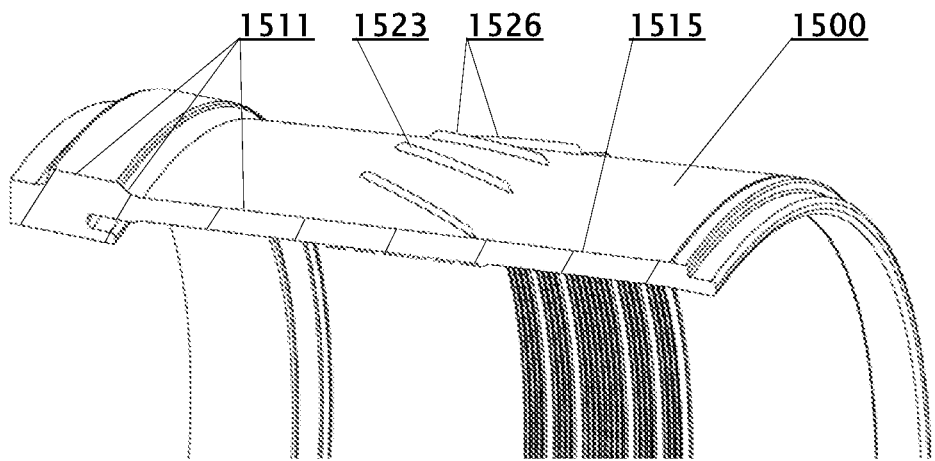
Fig. 15a
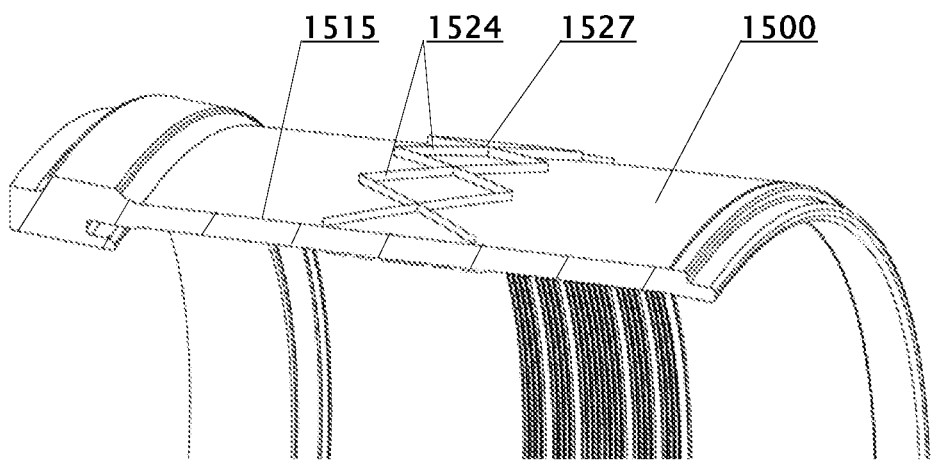
Fig. 15b
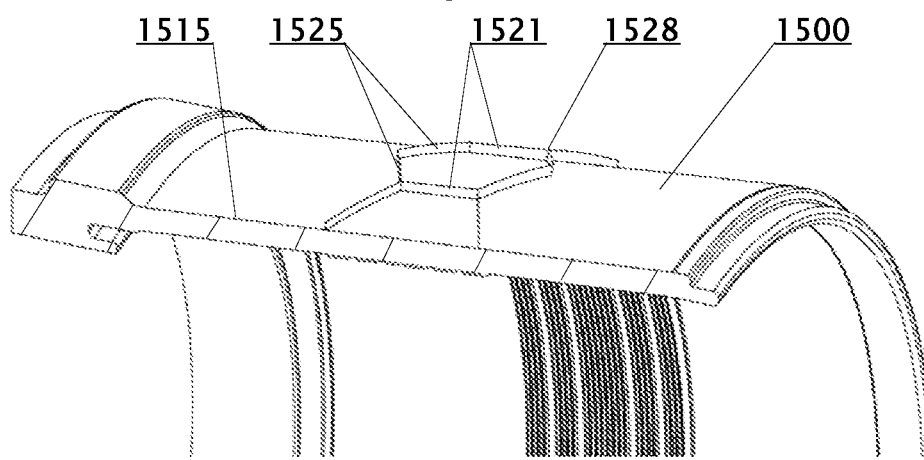
Fig. 15c
Fig. 15

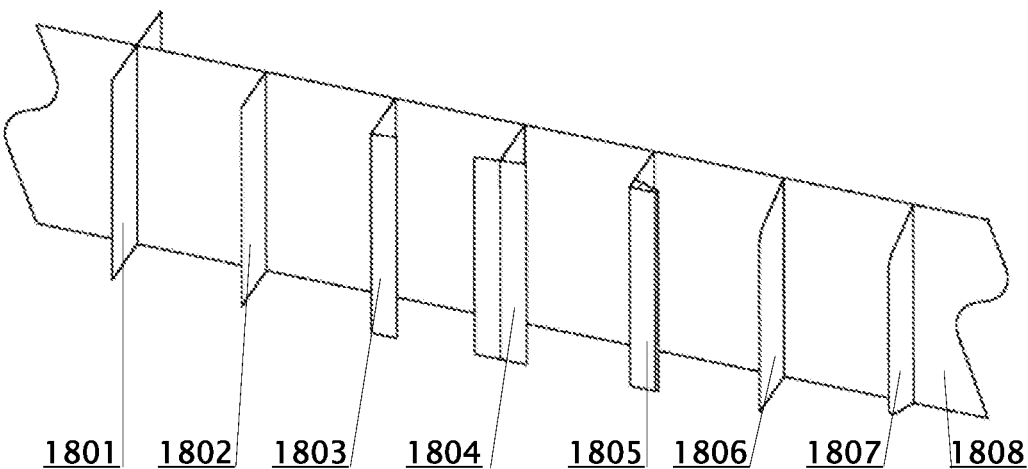
Fig. 18a
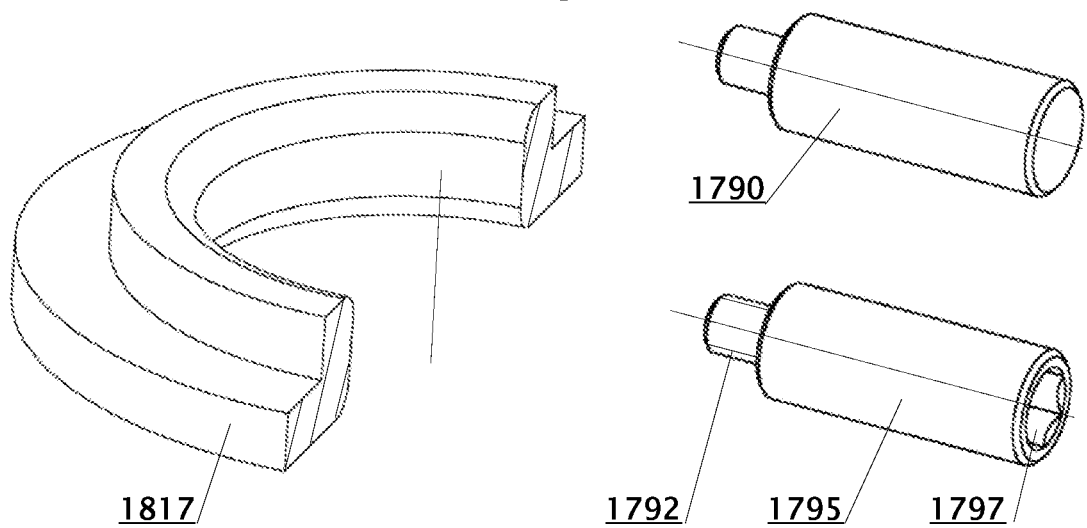
Fig. 18b
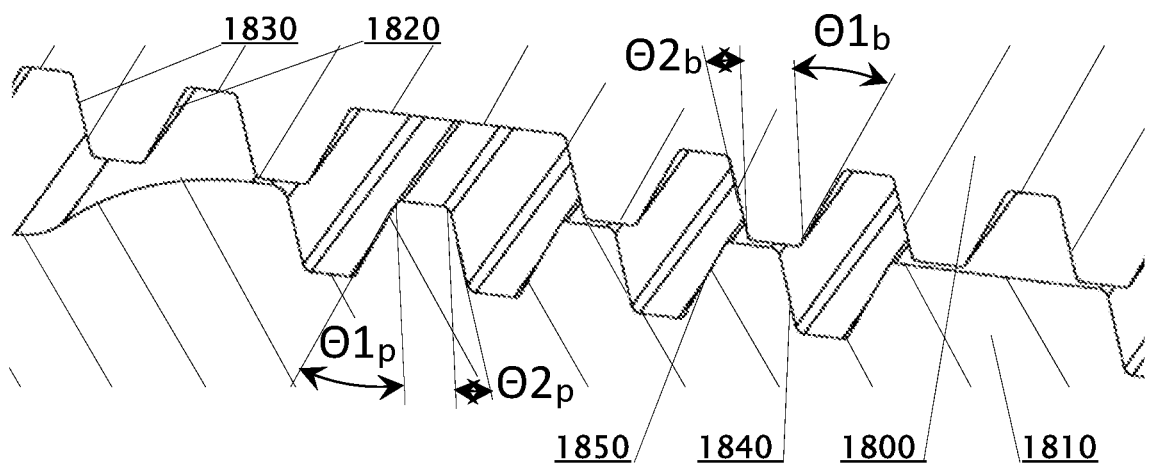
Fig. 18c
Fig. 18

TELESCOPICALLY ASSEMBLED MECHANICAL CONNECTOR

This application is a Continuation in Part (CIP) application following U.S. Utility patent application Ser. No. 17/485,336 titled TELESCOPICALLY ASSEMBLED MECHANICAL CONNECTOR filed on Sep. 25, 2021 incorporated herein, which is a CIP application following U.S. Utility patent application Ser. No. 16/920,350 titled MECHANICAL CONNECTORS filed on Jul. 2, 2020 issued on Oct. 26, 2021 as U.S. Pat. No. 11,156,313 and incorporated herein, which followed a CIP application Ser. No. 15/782,835 titled ENHANCEMENTS OF MECHANICAL CONNECTOR TECHNOLOGY filed on Oct. 12, 2017 and incorporated herein, which was a CIP application following U.S. Utility patent application Ser. No. 15/239,696 for MECHANICAL CONNECTOR OF LONG TORSIONAL AND BENDING FATIGUE LIFE filed on Aug. 17, 2016 and incorporated herein, which is based on U.S. provisional applications No. 62/189,437 filed on Jul. 7, 2015 and on No. 62/148,665 filed on Apr. 16, 2015, and on PCT Application PCT/US16/28033 (WO/2016/168,707) filed Apr. 18, 2016, U.S. provisional patent application No. 62/409,313 filed on Oct. 17, 2016 introduces enhancements to mechanical connector technology. This application claims the benefits of priority related to U.S. provisional applications Ser. Nos. 62/148,665, 62/189,437 and 62/409,313, of PCT application PCT/US16/28033 (WO/2016/168,707), and of U.S. utility patent application Ser. Nos. 15/239,696, 15/782,835, 16/920,350 and 17/485,336.

TECHNICAL FIELD

This invention relates to mechanical connectors used in any engineering application, and in particular in offshore engineering at or near the sea surface, above or below the water surface, as well as anywhere in the water column.

BACKGROUND ART

Mechanical connectors of the Merlin™ group (featured for example in GB1,573,945, GB2,033,518, GB2,099,529, GB2,113,335, U.S. Pat. Nos. 5,964,486, 8,056,940, EP0, 803,637, etc.) and types derived by third parties from the Merlin™ group of designs are widely used in Offshore Engineering. Merlin™ is a trade name of the most widely used connector in the group that is manufactured by Oil States Industries. Similar connectors acting on the same principle are also manufactured by others, but for simplicity all those designs are referred to herein as Merlin™ group, or Merlin™ family connectors. Those designs and their advantages are well known to anybody skilled in the art.

In particular, the Merlin™ group connectors known characterize with high static and fatigue strengths with regard to axial and bending loads, as required for traditional tendon, conductor, riser, etc. applications. The above traditional connectors do not typically experience high static or fatigue torsional loads and their torsional load capacities are limited to frictional resistance resulting from radial and axial connector preload that could be augmented by the actual loading of the connector. Accordingly the Merlin™ family connectors characterize with limited torsional load capacities that may be difficult to control accurately by design means. In known connectors the box outside stress diameters and the pin inside stress diameters are kept substantially constant along the threaded segments of the said connectors. Minor departures from that have been described in prior art literature, but those are nowhere as pronounced as in novel connectors introduced herein. A background art mechanical connector is provided with a thread (zero pitch angle for background art connectors) on substantially matching frustoconical surfaces extending between two sets of (metal) nipple seals (annotation 140, see FIG. 2; note that (metal) nipple seals 140 use the same basic configuration and operation principle on background art connectors, as they do on novel connectors). One of those sets of said (metal) nipple seals is located near an end of a box and the other said set of said (metal) nipple seals is located near an end of a pin. It is known to anybody skilled in the art that each of the above sets of the said (metal) nipple seals incorporates axially engaging, substantially cylindrical surfaces with an outside surface and an inside surface of a male substantially cylindrical segment interacting radially through the mechanism of a hoop stress with substantially matching surfaces of a substantially cylindrical cavity.

Oil States Industries offers also a high torsional capacity Lynx connector, but that connector is structurally different and it is not designed with particularly high torsional fatigue strength in mind. The Lynx is designed to resist accidental high loads.

Important design considerations pertaining to selecting heights of protrusions and depths of grooves used in the Merlin™ family connectors at various axial locations of those connectors, preferable taper angles at various locations as well as means to improve the telescopic assembly and disassembly operations with the use of hydraulic pressure are disclosed for example in U.S. Pat. No. 8,056,940. Those design features, or their equivalents, can be optionally applied to these designs, wherever applicable.

DISCLOSURE OF INVENTION

This invention builds up on technical features and on the industry experience with the use of Merlin™ family connectors. Novel technical structural features, not used previously in the Merlin™ family connectors, are provided in order to handle high torsional loads. In addition to friction, structural means that are used in order to transfer high torsional loads include: dog-clutch teeth, fitted pins, keys, splines and interlocked thread systems, all used in isolation or in arbitrary combinations. Modifications in the shapes of the box and the pin are introduced. Those are useful for weight control. The above can be used in particular in connectors designed for lower design pressures and for smaller piping/tubing diameters than are those used typically subsea. Additionally a use of assembly/disassembly fluids that solidify in at least some ranges of operational temperatures of connectors is introduced. Those include in particular resins or tar-like non-metals and liquid metals solidifying in single phases as well as in multiple phases like for example binary, ternary etc. eutectics.

Merlin™ family connectors and some of their third party derivatives can be welded to the ends of pipes to be connected, or the pins and the boxes forming the connections can be shaped in the actual pipe used. Typically high yield strength and high quality materials are used for building Merlin™ family connectors, and the same or similar characteristics materials should be used for building connectors according to this invention.

The following design enhancements of connectors are introduced herein:
  modifications of shapes of boxes and/or pins for lower operating pressures and assembly/disassembly pressures;

introduction of inside diameter (ID) fairings, outside diameter (OD) fairings strengthening fins, planar, curved, box or honeycomb stiffeners and web stiffeners for stiffness control, buckling resistance, material saving and weight control;

modifications of thread tooth geometry that enhance leak resistance & improve loading;

introduction of metallic and non-metallic assembly/disassembly fluids that essentially solidify in the design ranges of temperatures;

improvements in the solid to solid heat transfer between the pin and the box and improvements in heat dissipation.

Static and fatigue bending load capacities of novel connectors remain high, while the axial load capacities may or may not be high, depending on the design requirements. Depending on specific design requirements and economic factors (like for example component cost and the size of the market expected) the engineer can select between two subgroups of novel connectors that feature:

Novel connectors adapting Merlin™ family connectors for transferring high torque loads by adding high torque capacity through optimized structural additions;

Novel connectors featuring structural elements that require major design modifications.

The first subgroup includes:

Novel connectors utilizing fitted pins to transfer structurally high torsional loads;

Novel connectors utilizing the dog-clutch principle to transfer structurally high torsional loads;

Novel connectors utilizing the shaft-rotor type key systems to transfer structurally high torsional loads.

The second subgroup includes:

Novel connectors utilizing the shaft-rotor spline connection principle to transfer structurally high torsional loads.

Novel connectors utilizing the threaded connection principle to transfer structurally high torsional loads.

Novel connectors belong to the said first subgroup may involve new designs or they may involve design modifications of known Merlin™ family connectors. The structural additions are introduced in the not very highly loaded regions of known connectors, or in regions where loading pertaining to 'traditional design loads' on Merlin™ family connectors are reduced. Retrofitting spare or retired known connectors with new structural features and torque loading capabilities may be also feasible.

Novel connectors featuring the enhancements listed above can be built as new, carefully optimized designs.

Novel connectors feature variable, including for example tapered designs of the outside (stress) diameters of connector boxes and variable, including for example tapered designs of the inside (stress) diameters of pins in order to extend the use of the Merlin™ family connectors for use with smaller design pressures (and therefore reduced pressures used for the assembly and disassembly of connectors) in comparison with the Merlin™ family connectors that are typically used offshore. Tapering the OD makes the box shell more flexible and it also extends the use of the connectors to sizes smaller than those typically used with Merlin™ family connectors, i.e. 8⅝ inches (219.1 mm) and greater. Merlin™ family connectors used offshore are typically manufactured through the process of high precision, computer numerically controlled (CNC) single point diamond tool turning. The inside and outside stress diameters of a particular cross-section of a pin or a box are herein those essentially governing the hoop stressing of a given cross section of the pin or the box, respectively. Anybody knowledgeable in the art knows that hoop stresses at any diameter inside a wall of a cylindrical section can be essentially expressed in terms of the pressure across the wall and the inside and outside (stress) diameters of that cylindrical section.

Other features facilitating the extending this connector technology and the technology of the Merlin™ family connectors to smaller sizes involve increasing the manufacturing accuracy (decreasing tolerances) by utilizing more accurate high precision manufacturing technology. That includes for example using smaller, more accurate and/or more robustly built lathes, grinding, polishing, electrochemical polishing, electrolytic polishing (electropolishing), tumbling, rumbling, barreling, vibratory finishing, burnishing, peening, laser peening, sandblasting, etc. that allow achieving a greater dimensional accuracy than does turning. 3-dimensional (3D) printing can also be used.

For applications where low weight of novel connectors (example aerospace) is of importance, it may be advisable to use smaller numbers of thread teeth and/or very 'slim' thread teeth profiles, even if that makes it impossible to make up connections without a use of a pressurized fluid. The same can be utilized whenever the design lengths available for tubing or piping are limited, which may require a use of short connector lengths and short overlapping segments between the box and the pin.

Merlin™ family connectors, including those introduced herein are assembled and disassembled telescopically essentially in the same way, as described in the prior art documents. Assembled and/or disassembled telescopically means herein undergoing telescopic assembly and/or disassembly operations, respectively. The telescopic assembly and/or disassembly operations of the prior art Merlin™ family connectors and essentially of those introduced herein are well known to those skilled in the art and are described in the prior art documents. During the said telescopic assembly and/or disassembly operations the main axes of the pins and the boxes essentially coincide during the said telescopic assembly and/or disassembly operations, while all points of the said pins and/or boxes substantially follow essentially straight lines that are essentially parallel to the said essentially coinciding axes of the said pins and/or the said boxes. It is understood in the above simplified definition of the telescopic assemblies and/or disassemblies (and by implication in the definitions of being assembled and/or disassembled telescopically) that the term 'essentially parallel' disregards for simplicity the modifications of the shapes of the said straight lines due to radial deformations of the pins and the boxes resulting from pushing the said boxes together during the assemblies and/or those due to the applications of assembly or disassembly fluid pressures (hoop strain and meridional bending). Accordingly, during the said telescopic assembly and/or disassembly operations the said boxes and pins undergo radial deformations essentially in their meridional planes and the relative trajectories of points of the said pins and boxes depart from being strictly parallel to the connector axis and are said to be 'essentially parallel' lines because of the hoop strain and the meridional bending, as it is required by the said telescopic assembly and/or disassembly operations. That is well understood by those skilled in the art. Substantially no relative rotation of the boxes relative the pins is required to carry out the said telescopic assembly and/or disassembly operations, which distinguishes the Merlin™ family connectors from conventional pipeline connectors utilizing tapered threads connected by screwing boxes and pins together, which is not take place during the said telescopic assemblies and/or disassemblies.

No 'screwing together' is required during the telescopic assemblies and/or disassemblies of the Merlin™ family connectors. Accordingly, referring to connectors assembled and/or disassembled telescopically is herein synonymous with describing Merlin™ family connectors—those introduced herein, and their prior art predecessors.

This invention involves a telescopically assembled mechanical connector provided with a thread on substantially matching essentially frustoconical surfaces of a box and a pin, said substantially matching essentially frustoconical surfaces of said box and said pin extending essentially between two sets of nipple seals, whereas one said set of said nipple seals is located near an end of said box and another said set of said nipple seals is located near an end of said pin and whereas each said set of said nipple seals incorporates axially engaging, substantially cylindrical surfaces with an outside surface and an inside surface of a male substantially cylindrical annular segment interacting radially through a mechanism of a hoop stress with substantially matching surfaces of a substantially cylindrical annular cavity, whereas said sets of said nipple seals are used for sealing a cavity between said box and said pin;
whereas said telescopically assembled mechanical connector is assembled and disassembled utilizing a pressure of an assembly/disassembly fluid which expands said box and contracts said pin in a radial direction, which enables an assembly stroke in an axial direction that makes up a connection by engaging said threads of said box and said pin or which enables a disassembly stroke along said axial direction by disengaging said threads of said box and said pin respectively; whereas said threads of said box and said pin can engage only in a correct axial position due to a use of a non-uniform axial spacing of said threads, and whereas an excess of said assembly/disassembly fluid is removed through fluid outlet ports;
whereas:
  said telescopically assembled is defined as being assembled in a telescopic way,
  being assembled in said telescopic way is defined as having all points of said pin and/or said box substantially follow essentially straight lines during an assembly, whereas said straight lines are essentially parallel to essentially coinciding axes of said pin and of said box;
whereas said telescopically assembled mechanical connector includes an at least one mechanical clamp interacting structurally with said box and/or said pin, while remaining essentially unbonded to said box and/or said pin;
whereas said mechanical clamp interacting structurally with said box essentially restricts structurally a shell of said box from radial deformations outwards, i.e. away from an axis of said telescopically assembled mechanical connector, and/or said mechanical clamp interacting structurally with said pin essentially restricts structurally a shell of said pin from radial deformations inwards, i.e. towards said axis of said telescopically assembled mechanical connector;
whereas said mechanical clamp stabilizes an essentially circular shape of a cross-section of said telescopically assembled mechanical connector by essentially stiffening structurally said box and/or said pin, respectively;
whereas said mechanical clamp interacting structurally with said box and/or said pin is installed after said box and said pin are assembled telescopically and said excess of said assembly/disassembly fluid is removed through said fluid outlet ports and said mechanical clamp interacting structurally with said box and/or said pin is removed before said disassembly stroke is started;
wherein said telescopically assembled mechanical connector includes at least one of:
  said mechanical clamp essentially stiffening structurally an outside surface of said box,
  or said mechanical clamp essentially stiffening structurally an inside surface of said pin.

This invention involves a mechanical connector, including a telescopically assembled mechanical connector, provided with a thread on substantially matching frustoconical surfaces of a box and a pin, said substantially matching frustoconical surfaces of said box and said pin extending essentially between two sets of (metal) nipple seals, whereas one said set of said (metal) nipple seals is located near an end of said box and another said set of said (metal) nipple seals is located near an end of said pin and whereas each said set of said (metal) nipple seals incorporates axially engaging, substantially cylindrical surfaces with an outside surface and an inside surface of a male substantially cylindrical segment interacting radially through a mechanism of a hoop stress with substantially matching surfaces of a substantially cylindrical cavity; whereas said sets of said (metal) nipple seals are used for sealing a cavity between said box and said pin that can be pressurized with an assembly/disassembly fluid in order to facilitate an assembly or a disassembly by radially expanding said box and radially contracting said pin; said mechanical connector, including said telescopically assembled mechanical connector, provided with said thread on said substantially matching frustoconical surfaces extending essentially between said two sets of said (metal) nipple seals characterizes with a provision of a structural arrangement designed to transfer torque between said box and said pin of said mechanical connector, including said telescopically assembled mechanical connector, provided with said thread on said substantially matching frustoconical surfaces extending essentially between said two sets of said (metal) nipple seals;
wherein said structural arrangement designed to transfer torque between said box and said pin of said mechanical connector, including said telescopically assembled mechanical connector, provided with said thread on said substantially matching frustoconical surfaces of said box and said pin includes at least one of:
  a plurality of spline teeth,
  a plurality of dog-clutch teeth, including a single dog-clutch tooth,
  a plurality of fitted pins, including a single fitted pin,
  a plurality of keys,
  a plurality of right-handed threads, including a single right-handed thread, interlocking substantially with said thread on said substantially matching frustoconical surfaces of said box and said pin through the mechanism of at least one of:
    an interlocking of said right-handed thread with said thread on said substantially matching frustoconical surfaces of said box and said pin having a zero-pitch angle,
    an interlocking of said right-handed thread with said thread on said substantially matching frustoconical surfaces of said box and said pin having a left-handed thread,
    an interlocking of said right-handed thread with said thread on said substantially matching frustoconical surfaces of said box and said pin having a right-handed thread with a differing pitch,
  a plurality of left-handed threads, including a single left-handed thread, interlocking substantially with said thread on said substantially matching frustoconical surfaces of said box and said pin through the mechanism of at least one of:
- an interlocking of said left-handed thread with said thread on said substantially matching frustoconical surfaces of said box and said pin having said zero-pitch angle,
- an interlocking of said left-handed thread with said thread on said substantially matching frustoconical surfaces of said box and said pin having a right-handed thread,
- an interlocking of said left-handed thread with said thread on said substantially matching frustoconical surfaces of said box and said pin having a left-handed thread with a differing pitch;

whereas said structural arrangements designed to transfer torque between said box and said pin are arranged individually or in combinations in said mechanical connector, including said telescopically assembled mechanical connector, provided with said thread on said substantially matching frustoconical surfaces of said box and said pin.

This invention involves a mechanical connector, including a telescopically assembled mechanical connector, provided with a thread on substantially matching frustoconical surfaces of a box and a pin, said substantially matching frustoconical surfaces of said box and said pin extending essentially between two sets of (metal) nipple seals, whereas one said set of said (metal) nipple seals is located near an end of said box and another said set of said (metal) nipple seals is located near an end of said pin and whereas each said set of said (metal) nipple seals incorporates axially engaging, substantially cylindrical surfaces with an outside surface and an inside surface of a male substantially cylindrical segment interacting radially through a mechanism of a hoop stress with substantially matching surfaces of a substantially cylindrical cavity; whereas said sets of said (metal) nipple seals are used for sealing a cavity between said box and said pin that can be pressurized with an assembly/disassembly fluid that can be utilized in order to facilitate an assembly and/or a disassembly by radially expanding said box and radially contracting said pin; said mechanical connector, including said telescopically assembled mechanical connector, provided with said thread on said substantially matching frustoconical surfaces extending essentially between said two sets of said (metal) nipple seals being characterized with design modifications introduced in order to control weight, stiffness and buckling resistance incorporates at least one of:
- an outside (stress) diameter of said box of said mechanical connector, including said telescopically assembled mechanical connector, provided with said thread on said substantially matching frustoconical surfaces of said box and said pin incorporating a plurality of tapering surfaces or their approximation, including a single tapering surface or its approximation,
- or an inside (stress) diameters of said pin of said mechanical connector, including said telescopically assembled mechanical connector, provided with said thread on said substantially matching frustoconical surfaces of said box and said pin incorporating a plurality of tapering surfaces or their approximation, including a single tapering surface or its approximation.

This invention involves a mechanical connector, including a telescopically assembled mechanical connector provided with a thread on substantially matching frustoconical surfaces of a box and a pin, said substantially matching frustoconical surfaces of said box and said pin extending essentially between two sets of (metal) nipple seals, whereas one said set of said (metal) nipple seals is located near an end of said box and another said set of said (metal) nipple seals is located near an end of said pin and whereas each said set of said (metal) nipple seals incorporates axially engaging, substantially cylindrical surfaces with an outside surface and an inside surface of a male substantially cylindrical segment interacting radially through a mechanism of a hoop stress with substantially matching surfaces of a substantially cylindrical cavity; whereas said sets of said (metal) nipple seals are used for sealing a cavity between said box and said pin that can be pressurized with an assembly/disassembly fluid that can be used in order to facilitate an assembly and/or a disassembly by radially expanding said box and radially contracting said pin;

wherein said telescopically assembled mechanical connector provided with said thread on substantially matching essentially frustoconical surfaces of said box and said pin includes strengthening means involving at least one of:
- a mechanical stiffening arrangement on an outside surface of said box,
- or a mechanical stiffening arrangement on an inside surface of said pin.

The mechanical stiffening arrangements in the paragraph above may be made of at least one of:
- a high strength steel,
- or a corrosion resistant alloy,
- or a titanium alloy,
- or an aluminum alloy,
- or a magnesium alloy,
- or a nickel based alloy,
- or a non-metallic material including a plastic material,
- or a non-metallic natural or a non-metallic synthetic material,
- or an essentially composite material,
- or an essentially elastomeric material,
- or a material behaving in an essentially hyperelastic way,
- or at least one of said box or said pin utilizes at least one of a lining or a cladding or a weld overlay.

The non-metallic material, including plastic or/and hyperelastic material may be fiber, wire, fiber-mesh or wire-mesh reinforced. These mechanical stiffening arrangements may be integral with the box or the pin, or they can be separate external/internal strengthening arrangements, as applicable. In particular they can be essentially annular clamps that would have relatively regular shapes essentially conforming to the external or internal surfaces of the box or the pin, respectively.

This invention involves a mechanical connector, including a telescopically assembled mechanical connector, provided with a thread on substantially matching frustoconical surfaces of a box and a pin, said substantially matching frustoconical surfaces of said box and said pin extending essentially between two sets of (metal) nipple seals, whereas one said set of said (metal) nipple seals is located near an end of said box and another said set of said (metal) nipple seals is located near an end of said pin and whereas each said set of said (metal) nipple seals incorporates axially engaging, substantially cylindrical surfaces with an outside surface and an inside surface of a male substantially cylindrical segment interacting radially through a mechanism of a hoop stress with substantially matching surfaces of a substantially cylindrical cavity; whereas said sets of said (metal) nipple seals are used for sealing a cavity between said box and said pin that can be pressurized with an assembly/disassembly fluid that can be used in order to facilitate an assembly and/or a disassembly by radially expanding said box and radially contracting said pin;

wherein said mechanical connector, including said telescopically assembled mechanical connector, provided with said thread on said substantially matching frustoconical surfaces extending essentially between said two sets of said (metal) nipple seals being characterized with design modifications introduced in order to control weight, stiffness and buckling resistance incorporates at least one of:
  an outside (stress) diameter of said box of said mechanical connector, including said telescopically assembled mechanical connector, provided with said thread on said substantially matching frustoconical surfaces of said box and said pin is provided with a plurality of stiffener fins, including a single stiffener fin;
  or an inside (stress) diameters of said pin of said mechanical connector, including said telescopically assembled mechanical connector, provided with said thread on said substantially matching frustoconical surfaces of said box and said pin is provided with a plurality of stiffener fins, including a single stiffener fin.

This invention involves a mechanical connector, including a telescopically assembled mechanical connector, provided with a thread on substantially matching essentially frustoconical surfaces of a box and a pin, said substantially matching essentially frustoconical surfaces of said box and said pin extending essentially between two sets of (metal) nipple seals, whereas one said set of said (metal) nipple seals is located near an end of said box and another said set of said (metal) nipple seals is located near an end of said pin and whereas each said set of said (metal) nipple seals incorporates axially engaging, substantially cylindrical surfaces with an outside surface and an inside surface of a male substantially cylindrical, annular segment interacting radially through a mechanism of a hoop stress with substantially matching surfaces of a substantially cylindrical, annular cavity; whereas said sets of said (metal) nipple seals are used for sealing a cavity between said box and said pin that can be pressurized with an assembly/disassembly fluid that can be used in order to facilitate an assembly and/or a disassembly by radially expanding said box and radially contracting said pin;
wherein generatrices of interacting threads on said box and on said pin mismatch by design by at least 0.02°.

This invention involves a mechanical connector, including a telescopically assembled mechanical connector provided with a thread on substantially matching frustoconical surfaces of a box and a pin, said substantially matching frustoconical surfaces of said box and said pin extending essentially between two sets of (metal) nipple seals, whereas one said set of said (metal) nipple seals is located near an end of said box and another said set of said (metal) nipple seals is located near an end of said pin and whereas each said set of said (metal) nipple seals incorporates axially engaging, substantially cylindrical surfaces with an outside surface and an inside surface of a male substantially cylindrical segment interacting radially through a mechanism of a hoop stress with substantially matching surfaces of a substantially cylindrical cavity; whereas said sets of said (metal) nipple seals are used for sealing a cavity between said box and said pin that can be pressurized with an assembly/disassembly fluid that can be used in order to facilitate an assembly and/or a disassembly by radially expanding said box and radially contracting said pin;
whereas:
  loaded sides of said thread on said substantially matching frustoconical surfaces of said box and said pin are defined as sides, an engagement of which prevents a disconnection of said telescopically assembled mechanical connector provided with said thread on said substantially matching frustoconical surfaces of said box and said pin,
  unloaded sides of said thread on said substantially matching frustoconical surfaces of said box and said pin are defined as those sides of said thread on said substantially matching frustoconical surfaces of said box and said pin that are not said loaded sides of said thread on said substantially matching frustoconical surfaces of said box and said pin,
  each of thread generatrix angles $\Theta1_b$, $\Theta2_b$, $\Theta1_p$, $\Theta2_p$ is measured between a normal to an axis of said box or between a normal to an axis of said pin and a thread generatrix of said unloaded side of said thread on said substantially matching frustoconical surfaces of said box and said pin or of said loaded side of said thread on said substantially matching frustoconical surfaces of said box and said pin corresponding respectively:
    a box thread generatrix angle $\Theta1_b$ is measured on said unloaded side of said thread on said substantially matching frustoconical surface of said box,
    a box thread generatrix angle $\Theta2_b$ is measured on said loaded side of said thread on said substantially matching frustoconical surface of said box,
    a pin thread generatrix angle $\Theta1_p$ is measured on said unloaded side of said thread on said substantially matching frustoconical surface of said pin,
    a pin thread generatrix angle $\Theta2_p$ is measured on said loaded side of said thread on said substantially matching frustoconical surface of said pin;
wherein said mechanical connector, including said telescopically assembled mechanical connector, provided with said thread on said substantially matching frustoconical surfaces of said box and said pin is characterized by at least one of absolute values of:
  a thread generatrix mismatch angle $|\Theta1_b-\Theta1_p|\geq0.02°$,
  or a thread generatrix mismatch angle $|\Theta2_b-\Theta2_p|\geq0.02°$.

This invention utilizes pressurized fluids that solidify in operational conditions (including liquid metals and metallic alloys) and those fluids are typically liquid, including molten, in order to assemble or disassemble Merlin™ family connectors and/or mechanical connectors of long torsional and bending fatigue life.

This invention involves also the use of pressurized fluids that solidify in operational conditions (including liquid metals and metallic alloys) and those fluids are typically liquid, including molten, in order to assemble or disassemble mechanical connectors, including telescopically assembled mechanical connectors and/or mechanical connectors of long torsional and bending fatigue life.

This invention involves a mechanical connector, including a telescopically assembled mechanical connector, provided with a thread on substantially matching frustoconical surfaces of a box and a pin, said substantially matching frustoconical surfaces of said box and said pin extending essentially between two sets of (metal) nipple seals, whereas one said set of said (metal) nipple seals is located near an end of a box and another said set of said (metal) nipple seals is located near an end of a pin and whereas each said set of said (metal) nipple seals incorporates axially engaging, substantially cylindrical surfaces with an outside surface and an inside surface of a male substantially cylindrical segment interacting radially through a mechanism of a hoop stress with substantially matching surfaces of a substantially cylindrical cavity; whereas said sets of said (metal) nipple seals are used for sealing a cavity between said box and said pin that can be pressurized with an assembly/disassembly fluid in order to facilitate an assembly and/or a disassembly by radially expanding said box and radially contracting said pin;

and wherein said mechanical connector, including said telescopically assembled mechanical connector, provided with said thread on said substantially matching frustoconical surfaces extending essentially between said two sets of said (metal) nipple seals includes an assembly/disassembly fluid remaining liquid, including molten, during assembly/disassembly operations;

and whereas after an assembly operation said assembly/disassembly fluid is allowed to solidify in an assembled condition of said mechanical connector, including said telescopically assembled mechanical connector, and remains essentially solid, thus becoming essentially a solid seal.

This invention involves a mechanical connector, including a telescopically assembled mechanical connector provided with a thread on substantially matching frustoconical surfaces of a box and a pin, said substantially matching frustoconical surfaces of said box and said pin extending essentially between two sets of nipple seals, whereas one said set of said nipple seals is located near an end of a box and another said set of said nipple seals is located near an end of a pin and whereas each said set of said nipple seals incorporates axially engaging, substantially cylindrical surfaces with an outside surface and an inside surface of a male substantially cylindrical segment interacting radially through a mechanism of a hoop stress with substantially matching surfaces of a substantially cylindrical cavity; whereas said sets of said nipple seals are used for sealing a cavity between said box and said pin that can be pressurized with an assembly/disassembly fluid in order to facilitate an assembly and/or a disassembly by radially expanding said box and radially contracting said pin;

and whereas said mechanical connector, including said telescopically assembled mechanical connector, provided with said thread on said substantially matching frustoconical surfaces extending essentially between said two sets of said nipple seals includes said assembly/disassembly fluid remaining liquid, including molten, during assembly/disassembly operations;

wherein after an assembly operation said assembly/disassembly fluid is allowed to solidify in an assembled condition of said mechanical connector, including said telescopically assembled mechanical connector, and remain essentially solid, thus becoming essentially a solid seal.

This invention involves a mechanical connector provided with a thread on substantially matching frustoconical surfaces of a box and a pin, said substantially matching frustoconical surfaces of said box and said pin extending essentially between two sets of nipple seals, whereas one said set of said nipple seals is located near an end of said box and another said set of said nipple seals is located near an end of said pin and whereas each said set of said nipple seals incorporates axially engaging, substantially cylindrical surfaces with an outside surface and an inside surface of a male substantially cylindrical segment interacting radially through a mechanism of a hoop stress with substantially matching surfaces of a substantially cylindrical cavity; whereas said sets of said nipple seals are used for sealing a cavity between said box and said pin;

whereas:
loaded sides of said thread on said substantially matching frustoconical surfaces of said box and said pin are defined as sides, an engagement of which prevents a disconnection of said mechanical connector provided with said thread on said substantially matching frustoconical surfaces of said box and said pin, unloaded sides of said thread on said substantially matching frustoconical surfaces of said box and said pin are defined as those sides of said thread on said substantially matching frustoconical surfaces of said box and said pin that are not said loaded sides of said thread on said substantially matching frustoconical surfaces of said box and said pin, each of thread generatrix angles $\Theta1_b$, $\Theta2_b$, $\Theta1_p$, $\Theta2_p$ is measured between a normal to an axis of said box or between a normal to an axis of said pin and a thread generatrix of said unloaded side of said thread on said substantially matching frustoconical surfaces of said box and said pin or of said loaded side of said thread on said substantially matching frustoconical surfaces of said box and said pin corresponding respectively:

a box thread generatrix angle $\Theta1_b$ is measured on said unloaded side of said thread on said substantially matching frustoconical surface of said box, a box thread generatrix angle $\Theta2_b$ is measured on said loaded side of said thread on said substantially matching frustoconical surface of said box, a pin thread generatrix angle $\Theta1_p$ is measured on said unloaded side of said thread on said substantially matching frustoconical surface of said pin, a pin thread generatrix angle $\Theta2_p$ is measured on said loaded side of said thread on said substantially matching frustoconical surface of said pin;

wherein said mechanical connector provided with said thread on said substantially matching frustoconical surfaces of said box and said pin is characterized by at least one of absolute values of:

a thread generatrix mismatch angle $|\Theta1_b - \Theta1_p| \geq 0.02°$,
or a thread generatrix mismatch angle $|\Theta2_b - \Theta2_p| \geq 0.02°$.

This invention involves a mechanical connector provided with a thread on substantially matching frustoconical surfaces of a box and a pin, whereas at least one of said box or said pin utilizes friction welding.

This invention involves a mechanical connector provided with a thread on substantially matching frustoconical surfaces of a box and a pin, whereas at least one of said box or said pin is manufactured involving injection molding.

This invention involves a mechanical connector provided with a thread on substantially matching frustoconical surfaces of a box and a pin, whereas at least one of said box or said pin is manufactured involving 3-Dimensional printing.

This invention involves a mechanical connector provided with a thread on substantially matching frustoconical surfaces of a box and a pin, whereas at least one of said box or said pin utilizes traditional welding fabrication.

This invention involves a mechanical connector provided with a thread on substantially matching frustoconical surfaces of a box and a pin, whereas at least one of said box or said pin is made of at least one of:
a high strength steel,
or a corrosion resistant alloy,
or a titanium alloy,
or an aluminum alloy,
or a magnesium alloy,
or a nickel based alloy,
or a non-metallic material including a plastic material,
or an essentially hyperelastic material,
or at least one of said box or said pin utilizes at least one of a lining or a cladding or a weld overlay.

The non-metallic material, including plastic or/and hyperelastic material may be fiber, wire, fiber-mesh or wire-mesh reinforced.

This invention involves a mechanical connector provided with a thread on substantially matching frustoconical surfaces of a box and a pin, said substantially matching frustoconical surfaces of said box and said pin extending essentially between two sets of nipple seals, whereas one said set of said nipple seals is located near an end of said box and another said set of said nipple seals is located near an end of said pin and whereas each said set of said nipple seals incorporates axially engaging, substantially cylindrical surfaces with an outside surface and an inside surface of a male substantially cylindrical segment interacting radially through a mechanism of a hoop stress with substantially matching surfaces of a substantially cylindrical cavity; whereas said sets of said nipple seals are used for sealing a cavity between said box and said pin;
wherein said mechanical connector includes an assembly/disassembly fluid remaining liquid during an assembly operation;
and whereas after said assembly operation said assembly/disassembly fluid is allowed to solidify in an assembled condition of said mechanical connector, and remains essentially solid, thus becoming essentially a solid seal.

This invention involves a mechanical connector provided with a thread on substantially matching frustoconical surfaces of a box and a pin, wherein an assembly/disassembly fluid is metallic.

This invention involves a mechanical connector provided with a thread on substantially matching frustoconical surfaces of a box and a pin, wherein an assembly/disassembly fluid is non-metallic.

This invention involves a mechanical connector provided with a thread on substantially matching frustoconical surfaces of a box and a pin, said substantially matching frustoconical surfaces of said box and said pin extending essentially between two sets of nipple seals, whereas one said set of said nipple seals is located near an end of said box and another said set of said nipple seals is located near an end of said pin and whereas each said set of said nipple seals incorporates axially engaging, substantially cylindrical surfaces with an outside surface and an inside surface of a male substantially cylindrical segment interacting radially through a mechanism of a hoop stress with substantially matching surfaces of a substantially cylindrical cavity; whereas said sets of said nipple seals are used for sealing a cavity between said box and said pin; whereas said mechanical connector is telescopically assembled, and whereas the thread on the substantially matching frustoconical surfaces of the box and the pin includes at least one of:
    an axisymmetric thread,
    a left-handed thread,
    a right-handed thread;
and wherein said mechanical connector includes a plurality of splines designed to transfer torsional loads structurally.

This invention involves a mechanical connector provided with a thread on substantially matching frustoconical surfaces of a box and a pin, said substantially matching frustoconical surfaces of said box and said pin extending essentially between two sets of nipple seals, whereas one said set of said nipple seals is located near an end of said box and another said set of said nipple seals is located near an end of said pin and whereas each said set of said nipple seals incorporates axially engaging, substantially cylindrical surfaces with an outside surface and an inside surface of a male substantially cylindrical segment interacting radially through a mechanism of a hoop stress with substantially matching surfaces of a substantially cylindrical cavity; whereas said sets of said nipple seals are used for sealing a cavity between said box and said pin;
whereas said mechanical connector is telescopically assembled, and whereas the thread on the substantially matching frustoconical surfaces of the box and the pin includes at least one of:
    an axisymmetric thread,
    a left-handed thread,
    a right-handed thread;
and wherein said mechanical connector includes a plurality of keys designed to transfer torsional loads structurally.

This invention involves a mechanical connector provided with a thread on substantially matching frustoconical surfaces of a box and a pin, said substantially matching frustoconical surfaces of said box and said pin extending essentially between two sets of nipple seals, whereas one said set of said nipple seals is located near an end of said box and another said set of said nipple seals is located near an end of said pin and whereas each said set of said nipple seals incorporates axially engaging, substantially cylindrical surfaces with an outside surface and an inside surface of a male substantially cylindrical segment interacting radially through a mechanism of a hoop stress with substantially matching surfaces of a substantially cylindrical cavity; whereas said sets of said nipple seals are used for sealing a cavity between said box and said pin; whereas said mechanical connector is telescopically assembled, and whereas the thread on the substantially matching frustoconical surfaces of the box and the pin includes at least one of:
    an axisymmetric thread,
    a left-handed thread,
    a right-handed thread;
and wherein said mechanical connector includes a plurality of fitted shear pins designed to transfer torsional loads structurally.

This invention involves a mechanical connector provided with a thread on substantially matching frustoconical surfaces of a box and a pin, said substantially matching frustoconical surfaces of said box and said pin extending essentially between two sets of nipple seals, whereas one said set of said nipple seals is located near an end of said box and another said set of said nipple seals is located near an end of said pin and whereas each said set of said nipple seals incorporates axially engaging, substantially cylindrical surfaces with an outside surface and an inside surface of a male substantially cylindrical segment interacting radially through a mechanism of a hoop stress with substantially matching surfaces of a substantially cylindrical cavity; whereas said sets of said nipple seals are used for sealing a cavity between said box and said pin;
whereas said mechanical connector is telescopically assembled, and whereas the thread on the substantially matching frustoconical surfaces of the box and the pin includes at least one of:
    an axisymmetric thread,
    a left-handed thread,
    a right-handed thread;
and wherein said mechanical connector includes a one or more dog-clutch teeth designed to transfer torsional loads structurally.

This invention involves a mechanical connector provided with a thread on substantially matching frustoconical surfaces of a box and a pin, said substantially matching frustoconical surfaces of said box and said pin extending essentially between two sets of nipple seals, whereas one said set of said nipple seals is located near an end of said box and another said set of said nipple seals is located near an end of said pin and whereas each said set of said nipple seals incorporates axially engaging, substantially cylindrical surfaces with an outside surface and an inside surface of a male substantially cylindrical segment interacting radially through a mechanism of a hoop stress with substantially matching surfaces of a substantially cylindrical cavity; whereas said sets of said nipple seals are used for sealing a cavity between said box and said pin;

whereas said mechanical connector is telescopically assembled, and whereas the thread on the substantially matching frustoconical surfaces of the box and the pin includes at least one of:
- an axisymmetric thread,
- a left-handed thread,
- a right-handed thread, and wherein said thread includes at least one of:
- said left-handed thread interlocking with said right-handed thread,
- said axisymmetric thread interlocking with said left-handed thread,
- said axisymmetric thread interlocking with said right-handed thread,
- said left-handed thread interlocking with a left-handed thread having a different pitch,
- said right-handed thread interlocking with a right-handed thread having a different pitch, designed to transfer torsional loads structurally.

Depending on specific design requirements and economic factors (like for example component cost and the size of the market expected) the engineer can select between two subgroups of novel connectors that feature:
- Novel connectors adapting Merlin™ family connectors for transferring high torque loads by adding high torque capacity through optimized structural additions;
- Novel connectors featuring structural elements that require major design modifications.

The first subgroup includes:
- Novel connectors utilizing fitted pins to transfer structurally high torsional loads;
- Novel connectors utilizing the dog-clutch principle to transfer structurally high torsional loads;
- Novel connectors utilizing the shaft-rotor type key systems to transfer structurally high torsional loads.

The second subgroup includes:
- Novel connectors utilizing the shaft-rotor spline connection principle to transfer structurally high torsional loads.
- Novel connectors utilizing the threaded connection principle to transfer structurally high torsional loads.

Novel connectors belonging to the said first subgroup may include new designs or they may involve design modifications of known Merlin™ family connectors. The structural additions are introduced in the not very highly loaded regions of known connectors, or in regions where loading pertaining to 'traditional design loads' on Merlin™ family connectors are reduced. Retrofitting spare or retired known connectors with new structural features and torque loading capabilities may be also feasible.

Novel connectors belonging to the said second subgroup require new design.

This invention involves a mechanical connector, including a telescopically assembled mechanical connector, whereas a connection between a pin and a box of said mechanical connector is effected by the principle of zero-pitch angle threads provided on an essentially outside surface of said pin interacting axially and radially by means of axial and radial pretensions with essentially matching zero-pitch angle threads provided on an essentially inside surface of said box; whereas said zero-pitch angle threads provided on said essentially outside surface of said pin and said essentially matching zero-pitch angle threads provided on said essentially inside surface of said box are arranged along a frustoconical pitch diameter surface that is essentially common to said essentially outside surface of said pin and to said essentially inside surface of said box; said mechanical connector being provided with structural means for transferring torque between said pin and said box, whereas said mechanical connector has static and fatigue torsional and bending load capacities controlled by design means and said mechanical connector is also capable of transferring axial loads between said pin and said box of said mechanical connector;

said structural means for transferring torque between said pin and said box including:
- a plurality of sets of splines provided on a plurality of essentially matching surface sets of interactions between said pin and said box, including a single essentially matching surface set of interaction between said pin and said box; and also including
- a plurality of dog-clutch type teeth provided on a plurality of essentially matching surface sets of interactions between said pin and said box, including a single essentially matching surface set of interaction between said pin and said box; and also including
- a plurality of fitted pins, including a single fitted pin, whereas said plurality of said fitted pins is arranged along a plurality of essentially matching surface sets between said pin and set box, including a single essentially matching interaction surface set between said pin and said box, whereas the transfer of said torque is effected by interactions of said pin with said plurality of said fitted pins and at the same time by an interaction of said plurality of said fitted pins with said box; and also including
- a plurality of keys, including a single key, whereas said plurality of said keys is arranged along a plurality of essentially matching surface sets between said pin and set box, including a single essentially matching surface set between said pin and said box, whereas the transfer of said torque is effected by interactions of said pin with said plurality of said keys and at the same time by an interaction of said plurality of said keys with said box; and also including
- right-handed threads provided on a plurality of essentially matching surface sets of interactions between said pin and said box, including a single essentially matching surface set of interaction between said pin and said box; and also including
- left-handed threads provided on a plurality of essentially matching surface sets of interactions between said pin and said box, including a single essentially matching surface set of interaction between said pin and said box; and also including
- right-handed threads and left-handed threads provided on a plurality of essentially matching surface sets of interactions between said pin and said box, including a single essentially matching surface set of interaction between said pin and said box.

BRIEF DESCRIPTION OF DRAWINGS

FIGS. 1 through 20 are provided to facilitate understanding of key features and key implementations of novel connectors.

FIG. 1 shows an exploded view of a novel connector utilizing spline torque transfer.

FIG. 2 shows a cross-section through one side of a novel connector utilizing spline torque transfer (shown in FIG. 1).

FIG. 3 presents a half view of a novel connector featuring a key torque transfer arrangement.

FIG. 4 shows a detail of a key interacting with a box of a novel connector.

FIG. 5 presents a half view of a novel connector featuring fitted pin torque transfer arrangement.

FIG. 6 shows details of fitted pins interacting with pins and boxes of novel connectors, one for each end of the interacting surfaces.

FIG. 7 depicts a detail of a novel connector assembled, whereas the dog-clutch torque transfer principle is utilized near the outside surfaces of the pin and the box. The dog-clutch teeth utilize the full material thickness available between the (metal) nipple seal region and the outside surface of the connector.

FIG. 8 depicts a detail of a novel connector in an exploded view, whereas the dog-clutch torque transfer principle is utilized near the outside surfaces of the pin and the box. The dog-clutch teeth utilize a part of the material thickness available between the (metal) nipple seal region and the outside surface of the connector.

FIG. 9 depicts a detail of a novel connector assembled, whereas the dog-clutch torque transfer principle is utilized near the inside surfaces of the pin and the box. The dog-clutch teeth utilize the full material thickness available between the (metal) nipple seal region and the inside surface of the connector.

FIG. 10 depicts a detail of a novel connector in an exploded view, whereas the dog-clutch torque transfer principle is utilized near the inside surfaces of the pin and the box. The dog-clutch teeth utilize a part of the material thickness available between the (metal) nipple seal region and the inside surface of the connector.

FIGS. 11a through 11z depict examples of schematic representations of many design implementations of novel connectors, most of which utilize the following arrangements for transferring torque structurally:
 the spline connection principle;
 the key connection principle;
 the fitted (shear) pin connection principle;
 the dog-clutch connection principle;
 the interlocking threads connection principle.

FIGS. 11a through 11y depict for the sake of example design implementations of the above listed torque transfer mechanisms used separately and in combinations. Variations in structural segment sequencing along the example connectors shown are also featured. FIGS. 11y and 11z depict stiffening arrangements of novel and known connectors, respectively.

FIG. 12 depicts schematically a segment of a novel connector that combines the dog-clutch and the fitted (shear) pin principles. The high torque capacity region is located near the external (metal) nipple seals and the torque bearing protrusions extend partly through the wall thickness of the box.

FIG. 13 depicts schematically a segment of a novel connector that combines the dog-clutch and the fitted (shear) pin principles. The high torque capacity region is located near the internal (metal) nipple seals and the torque bearing protrusions extend partly through the wall thickness of the pin.

FIGS. 14a through 14e depict an example detail half view of a relatively low pressure (LP) to medium pressure (MP) connector provided with novel structural modifications. Several examples of pin design details are featured.

FIGS. 15a through 15c depict example detail half views of LP to MP connector box designs provided with novel structural modifications.

FIG. 16 depicts an example detail half view of a novel relatively high pressure (HP) connector design featuring axisymmetric threads.

FIG. 17 depicts an example detail half view of a novel HP connector design featuring axisymmetric threads and shear fitted pins arranged near the outside nipple seals.

FIGS. 18a through 18c depict example design details of novel mechanical connectors.

FIG. 19 depicts schematically optional thread crest geometry modifications.

FIG. 20 depicts a detail of a novel connector box interacting with a pin featuring a novel use of an assembly/disassembly fluid solidified in cavities.

MODES OF CARRYING OUT THE INVENTION

The high structural torsional capacities of novel connectors are achieved by incorporating high capacity torque transfer components in the design of the connectors, while the high torsional fatigue life is achieved by optimally shaping and accurately finishing the surfaces of components that transfer high torques between the objects connected. The objects connected can involve pipe or tube segments and/or elements of offshore or onshore structures. The said novel connectors incorporate also structural elements typical to the design of the Merlin™ family connectors that provide them with high bending capacities, and wherever required also with high axial load capacities.

Several implementations of novel connectors are depicted on FIGS. 1 through 20.

Any connector according to this invention can be built out of metallic or non-metallic materials. That is reflected for sakes of examples on FIGS. 4, 6, 9, 10, 12, 13 and 20 by varying cross-section hatchings, with differing kinds of hatchings separated with pointed lines. On all other figures the uniform line hatchings used are understood to represent either metallic or non-metallic materials.

Figure 1:
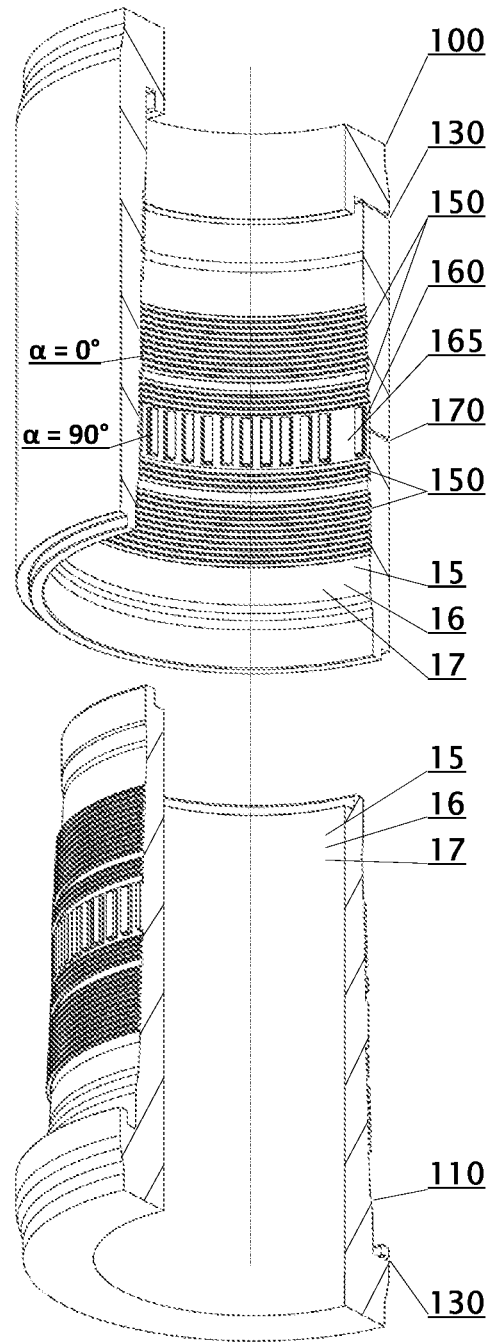
Figure 2:
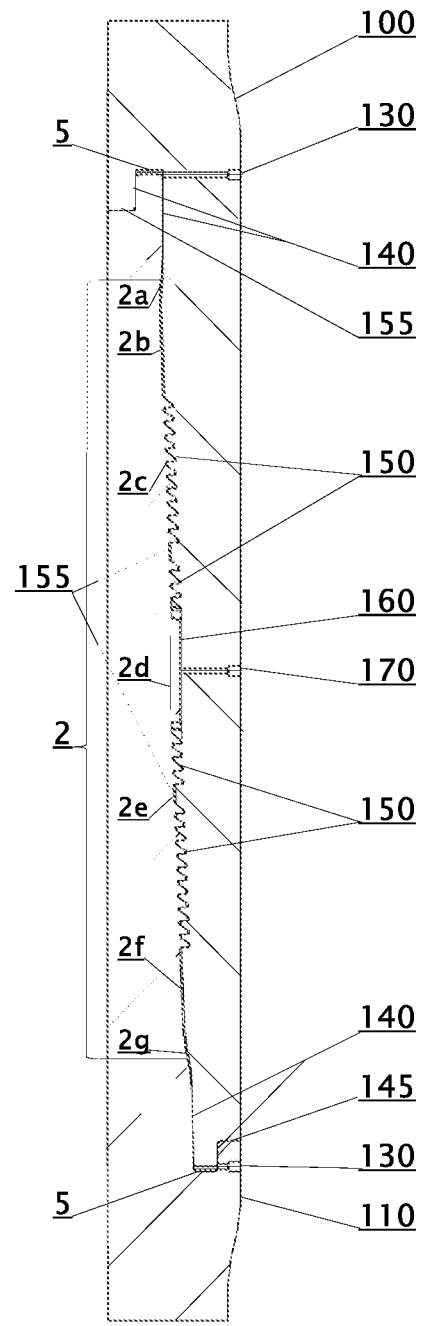

FIGS. 1 and 2 show a novel connector featuring spline torque transfer arrangement 160. FIG. 1 shows an exploded view of box 100 and pin 110, while FIG. 2 shows a cross-section through the same connector assembled.

Figure 3:
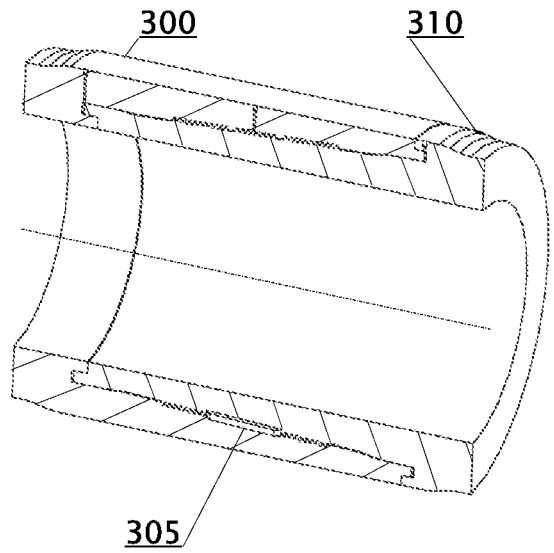
Figure 5:
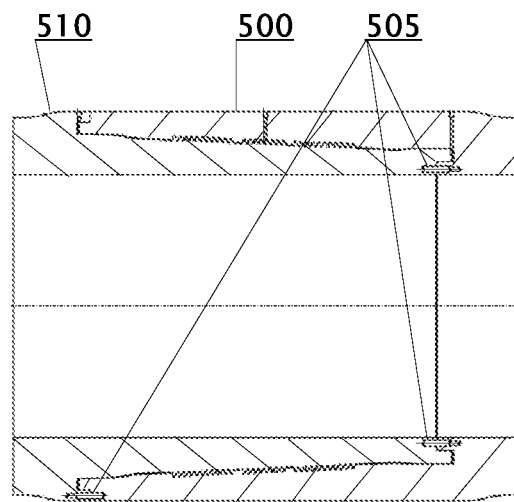

It is noted that spline system (set) 160, 165 as shown in FIGS. 1 and 2 can be also incorporated in FIG. 3, FIG. 5, it can be combined with any of FIGS. 7 through 10 or with FIGS. 11a through 11c, 11e, 11f, 11k, 11s, 11t, 11w, 11y, 12, 13, 14a, 15a through 17, 18c and/or 20 similarly to the arrangement depicted for a sake of examples on FIGS. 11d, 11g through 11j, 11l through 11p, 11r, 11u, 11v and/or 11x, 11y, 14a through 14e, 15a through 15c and/or 16 through 20. All the above highlighted combinations of structural torque transfer principles represent feasible designs of novel connectors.

In addition to spline torque transfer arrangement 160 this connector implements typical Merlin™ family features that are well known to those skilled in the art. The assembly and disassembly of all novel connectors featured herein are similar and they are briefly outlined here by reference to FIGS. 1 and 2.

Most novel connectors featured can be assembled either simply by (telescopic) pushing the box and the pin together, or they may need to be assembled (telescopically) with the aid of fluid pressure contracting the pin and expanding the box, which is the principle well known to those skilled in the art. A disassembly is only feasible while using fluid pressure, thus reversing the most common assembly operation that also utilizes an assembly fluid. That is carried out similarly to the corresponding operational procedures relevant to the Merlin™ family connectors and some of their derivatives. The assembly/disassembly of novel connectors are reversible, i.e. they can be disassembled (telescopically) using fluid pressure and reassembled (telescopically) again. The (telescopic) assembly and/or the (telescopic) disassembly can be carried out above or below the water surface.

During a telescopic assembly or disassembly with the aid of fluid pressure the annular compartment along an essentially frustoconical interface between a box and a pin is pressurized, so that a radial expansion of the box and a radial contraction of the pin result in an enlargement of a radial gap between the box and the pin, so that thread tips of the interacting parts become clear of each other and the parts can be pushed together (or let to slide away from each other in a controlled way) while a considerable force caused by the 'end cap' pressure of the assembly/disassembly fluid attempts at all times to push the box and the pin away from each other. That happens without any, or substantially without excessive contact between the thread tips of the threaded surfaces of the box and the pin. As soon as the connector make-up overlap has been reached during an assembly, the fluid pressure is reduced the radial deformations of the pin and the box disappear, the excess fluid is let out, all the threads snap into their final design positions and the connector is made-up. The relative axial, telescopic movement between the box and the pin is guided by essentially cylindrical interaction surfaces of (metal) nipple seals that at all times seal the pressurized fluid compartment on its ends. A telescopic disassembly is the reverse of the telescopic assembly.

Important design considerations pertaining to selecting heights of protrusions and depths of grooves used in the Merlin™ family connectors at various axial locations of those connectors, as well, preferable taper angles at various locations as well as means to improve the telescopic assembly and/or disassembly operations with the use of hydraulic pressure are disclosed for example in U.S. Pat. No. 8,056,940 and those essentially apply to implementations of this invention described herein. Those design features, or their equivalents, can be optionally applied to these designs, where applicable.

Identically to the known Merlin™ family connectors, each novel, mechanical connector, including a telescopically assembled mechanical connector, is provided with a zero pitch angle, axisymmetric thread located on substantially overlying, substantially matching, substantially frustoconical surfaces 2 extending essentially between two sets of (metal) nipple seals 140. One of said sets of (metal) nipple seals 140 is located near an end of box 100 and the other said set of nipple seals 140 is located near an end of pin 110. It is known to anybody skilled in the art that each of said sets of (metal) nipple seals 140 incorporates telescopically engaging, substantially cylindrical surfaces with an outside substantially cylindrical surface and an inside substantially cylindrical surface of a male substantially cylindrical segment interacting radially through the mechanism of a hoop stress with substantially matching substantially cylindrical surfaces of an annulus of a substantially cylindrical cavity 5. Said substantially matching substantially frustoconical surfaces 2 have in general variable taper angles of lines 2a, 2b, 2c, 2d, 2e, 2f and 2g shown for a sake of examples on FIG. 2. Lines 2a, 2b, 2c, 2d, 2e, 2f and 2g extend along segments of said substantially matching, substantially overlying substantially frustoconical surfaces 2, as shown. Anybody knowledgeable in the art knows that taper angles of lines 2a through 2g are measured between the tangents to said lines 2a through 2g and the axis of the said connector. In particular line 2d shown along a segment of splines 160 features for a sake of example a zero taper angle, a precise value is impossible to determine from FIG. 1 or 2, and any variation within a small range or even within a greater range of taper angles, like up to those pertaining for example to line 2c or even line 2g do not affect the novelty of this invention. Anybody knowledgeable in the art is aware that thread pitch angles are zero by definition for axisymmetric threads along for example lines 2c or 2e. The thread pitch angles are always independent on a small or larger value of the local taper angle. Along spline segment 160 (line 2d) the thread pitch angles are essentially equal to 90°, see FIG. 1 and the description of FIGS. 11a through 11x. Contact surfaces 145 adjacent to outside nipple seals are often referred to as outside abutment surfaces 145. Outside abutment surfaces 145 (or joint 145) provide effective sealing between box 100 and pin 110, because at joint 145 contact surfaces of box 100 and pin 110 are typically under axial compression, as those knowledgeable in the field know. Essentially parallel surfaces 155 form a gap adjacent to inside nipple seals and they are often referred to as inside abutment surfaces 155. Inside abutment surfaces 155 can provide additional sealing between box 100 and pin 110 if an O-ring or other elastic seal is inserted in their gap. As those knowledgeable in the field know, the gap of inside 'abutment' surfaces 155 is necessary, because during the assembly or disassembly the pin expands axially proportionally to its Poisson ratio as the result of being compressed radially and simultaneously the box contracts axially proportionally to its Poisson ratio, as it is being expanded radially. These combined actions result in decreasing of the width of the gap of inside 'abutment' surfaces 155 during assemblies and disassemblies. Has there been no gap, it would not have been possible to assemble the connector, the threads would have never engaged in their final assembly position. The opposite phenomena take place at outside abutment surfaces 145, and that is why it is possible to design a connector sealing at outside abutment surfaces 145. For connectors utilizing dog clutch teeth to transfer torque (see further below), outside abutment surfaces 145 and/or inside abutment surfaces 155 can be split into segments.

It is obvious from this description that thread pitch angle $\alpha$ at a given point along a frustoconical surface is defined as:

$$\alpha = \lim_{\Delta\varphi \to 0} \left[ a \tan\left(\frac{2 \cdot \Delta H}{\Delta\varphi \cdot D_h}\right) \right]$$

where:
$\Delta_\varphi$—infinitesimally small interval of the connector azimuth angle measured in radians between the points at azimuth angle locations $-0.5 \cdot \Delta_\varphi$ and $+0.5 \cdot \Delta_\varphi$ from the point along the thread line, where angle $\alpha$ is being measured;
$\Delta H$—infinitesimally small axial distance along the connector span over (corresponding to) the above $-0.5 \cdot \Delta_\varphi$ to $+0.5 \cdot \Delta_\varphi$ azimuth angle interval measured in radians from the given point along the thread line at which angle $\alpha$ is being measured;
$D_H$—the pitch diameter of the thread at the point along the thread, where angle $\alpha$ is being measured.

Whenever pitch H of a thread is constant along a frustoconical surface of a connector (a most practical case and the most common mathematical representation), the above formula simplifies and:

$$\alpha = \lim_{\Delta\varphi \to 0}\left[a\,\tan\left(\frac{2 \cdot \Delta H}{\Delta\varphi \cdot D_h}\right)\right] = a\,\tan\left(\frac{H}{\pi \cdot D_H}\right)$$

For zero thread pitch angle α, axisymmetric threads pitch H=0, therefore angle α is also zero. For left handed or right handed threads on a frustoconical surface H>0 and α>0, by definition. Whenever pitch H is constant along a frustoconical surface, angle α varies slightly, because $D_H$ varies along the connector. Wherever angle α is required to be constant along a thread line, pitch H has to vary accordingly by keeping the ratio of H to $D_H$ constant, see the relations above. For splines treated as special cases of threads, H is infinite and α=90°, because)tan (90°) is infinite, see FIG. 1.

(Metal to metal) nipple seals 140 are used to seal a cavity between box 100 and pin 110 that is filled with an assembly/disassembly fluid at the stage when the connector is only initially assembled. Nipple seals 140 seal the said cavity, while the fluid is delivered through port 170. Fluid (hydraulic) pressure expands box 100 and 'contracts' pin 110 in the radial direction through the mechanism of hoop straining and meridional bending. The relation between the hoop stress(ing) σ and the hoop strain(ing) ∈ is known to anybody skilled in the art, because it is expressed by the Hooke's Law: σ=∈·E, where E is the Young modulus. That enables the final assembly stroke in the axial direction that makes up the connection by engaging zero-pitch angle threads 150, 155 of box 100 and pin 110. Axisymmetric, zero-pitch angle grooves (threads) 150, 155 can engage only in the correct axial position due to the use of non-uniform axial spacings of thread 155. Axisymmetric, zero-pitch angle thread 150, 155 is responsible for the transfer of axial and bending loads as well as for the axial and radial pre-stressing of the connector. Excess fluid is removed through fluid outlet ports 130 near each end of the connector.

Novel connectors of high torsional and bending load capacity optionally, but quite often require precisely accurate azimuth angle orientations of box 100 relative pin 110. The azimuth orientation angles of box 100 relative pin 110 are modified by rotating pin 110 relative box 100 around the axis of the connector. In a case the azimuth assembly angle is specified, spline set (system) 160 (and optionally 165) can optionally engage only in the correct circumferential position due to the optional use of optional non-uniform angular spacings of trough 165 (and of the matching optional spline tooth, not visible) in the circumferential direction, so that the novel connector can optionally be assembled in only the prescribed design azimuth orientation. That is most often the case.

In the connector shown in FIGS. 1 and 2 spline system (set) 160 (optionally including spline 165) is arranged on cylindrical segments of box 100 and pin 110, which is optional and preferable, but splines can also be shaped along tapered surfaces, essentially matching the average local taper angles of the contact surfaces of box 100 and pin 110.

Similarly to splines used in machine engineering, splines 160 (and optional splines 165) can be parallel-sided, they can have involute shaped sides, they can have triangularly shaped spline teeth, they can have straight teeth interacting with involute shaped teeth, etc., as required. If necessary radial and circumferential pre-loads can be used by utilizing a required degree of interference fitting between spline teeth 160 (and optionally spline 165) of box 100 and pin 110. The latter is often the case depending on the design requirements, as it typically is in Merlin™ family connectors with regard to the axial and radial pre-loading. Spline teeth 160 (and optionally teeth 165) of the connector shown in FIGS. 1 and 2 are examples, any known spline geometries can be used.

Design features typically used for assembling/disassembling the connectors shown in FIGS. 1 through 20 are deliberately omitted from the drawings for simplicity. Annotations 15, 16 and 17 on FIG. 1 indicate options to use lining 15, cladding 16 and/or welding overlay 17 on any surface of the connector, as required by design conditions. Lining 15, cladding 16 and/or welding overlay 17 most often with Corrosion Resistant Alloys (CRAs) are shown on FIG. 1 for sake of example in a generic way, because those can be used on any surface of any novel connector shown on FIGS. 1 through 20, according to particular project requirements, as it is known with regard to prior art connectors.

FIG. 3 presents a half view of a novel connector featuring key 305 torque transfer arrangement. For simplicity only box 300 and pin 310 are annotated, the remaining design features shown are analogous to those already explained.

Figure 4:
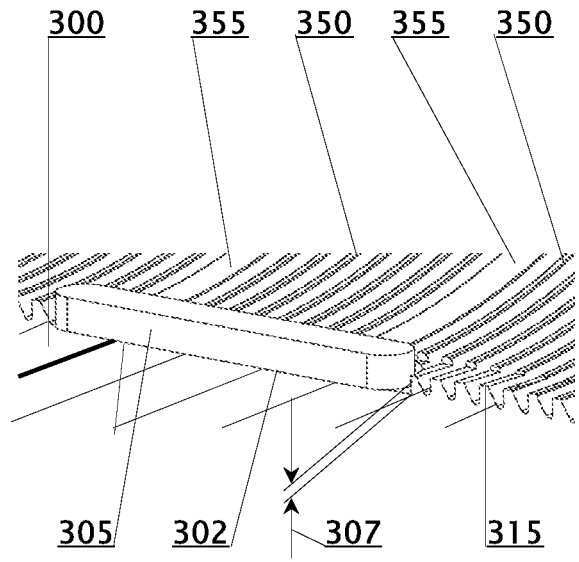

FIG. 4 shows a detail of key 305 interacting with box 300 of the connector in FIG. 3. Key 305 shown in FIGS. 3 and 4 is sunk in pin 310. Gap 307 is shown between outside face 302 of key 305 and the depth of the key groove provided in box 300. Axisymmetric, zero-pitch angle thread is designated with 350 and 355; 355 is pertaining to non-uniform axial spacing grooving designed to prevent accidental incorrect assembly. The longitudinal axis of key 305 shown is parallel to the average taper of the interacting surfaces of box 300 and pin 310 along the length of the key, which is preferred, but that does not need be the case in other designs.

The precise shape of the example outside face 302 of key 305 is impossible to see in the figures. In order to allow for some bending rigidity of key 305 during the final stage of the assembly, while box 300 and pin 310 flex in meridional bending because of a pressurization, groove 315 can be optionally provided. Groove 315 may not be required in cases when outside face 302 of key 305 is rounded to match the outside major diameters of the axisymmetric grooving of pin 310 (not shown in FIG. 4 and not annotated on FIG. 3). Rounding outside face 302 of key 305 is preferable, either to match the outside contour of major diameters of the axisymmetric pin grooving, or equal to the minimum value of the major diameter of the axisymmetric pin grooving along the length of key 305, so that the outside corners of key 305 (sides of outside face 302) never protrude outside of the contour of the adjacent grooving of pin 310. Key 305 is best interference fitted into its channel in pin 310, and preferably also (preferably loosely) bolted to pin 310 (optional screw not shown) or otherwise secured, in order to avoid a possibility of jamming during a disassembly or assembly of the connector. The sides of key 305 are preferably also interference fitted into the key channel in box 300.

In FIGS. 3 and 4 key 305 shown is double-rounded, but that is for the sake of an example only. Practically all types of key connections used in machine engineering can be used with novel connectors. Those include feather keys, square keys, flat keys, beveled keys, Woodruff keys, taper keys, etc.

The key inserts can be alternatively provided with circular, oval, elliptical, or other curvilinear cross-sections. It is noted, however, that more machine-connection-like key cross section shapes, like square or rectangular cross sections with only slightly rounded edges have higher bearing load capacities than have those provided by keys having circular or elliptical cross sections.

Depending on the torque capacity of the connector required for a particular design, multiple keys can be arranged around the circumference of the connector (multiple o'clock positions), which is preferably the case. Those keys can be arranged in one circumferential row, like in case of FIG. 3, 11*f*, 11*l*, 11*r*, 11*w*, 11*x* or/and 11*y*, with additional keys not visible, or in several rows (see schematic illustrations in FIG. 11*e*), in staggered rows or in irregular arrangements (see schematic illustration in FIG. 11*f*). It is noted that key system 305 as shown on FIG. 4 can be also incorporated in the design shown on FIG. 5, it can be combined with any of FIGS. 7 through 10 or with any of FIGS. 11*a* through 11*d*, 11*g* through 11*k*, 11*m* through 11*q*, 11*s* through 11*v*, 11*x*, 11*y*, 12, 13, 14*a* through 14*e*, 15*a* through 15*c* and/or 16 through 20. All the above highlighted combinations represent feasible designs of novel connectors.

In a case of an 'off a shelf', or retrofitted Merlin™ family connector being adapted to carry high torsional loads, it may be acceptable to sacrifice some of the original axial and even bending capacity of the connector in order to upgrade its torsional load capacity by adding systems (sets) of keys 305.

If required, keys 305 are optionally, but typically, arranged around the circumference in a non-uniform circumferential pitch or/and pattern, in order to assure the connector assembly with the prescribed azimuth orientation of box 300 relative pin 310.

FIG. 5 presents a half view of a novel connector featuring shear (fitted) pin 505 torque transfer arrangements. Multiple fitted pins sets 505 can be arranged around the circumference of the connector in the region of one of the connector ends or simultaneously in regions of both ends as it is shown on FIG. 5. The use of shear pins 505 simultaneously at both connector ends is preferable, because that limits frictional load differential between the interaction surfaces of box 500 and pin 510. Shear pins 505 can be arranged in a single row at each end, or in multiple rows (sets) that may or may not be staggered with regard to each other in the radial and/or circumferential direction(s), see for example FIG. 17. Only one row of shear pins 505 is shown near each end in FIG. 5, for the sake of an example. If required, shear pins 505 are optionally, but typically, arranged with a non-uniform circumferential pitch (spacing) or pattern in order to assure the connector assembly with the correct azimuth orientation of box 500 relative pin 510.

Figure 6:
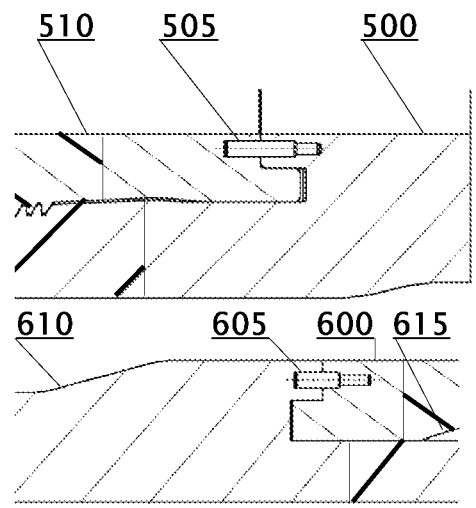

FIG. 6 shows details of shear (fitted) pins 505, 605 interacting with pins 510, 610 and with boxes 500, 600 according to this invention, one for each end of the interacting surfaces. The top detail depicted in FIG. 6 is that of the connector shown in FIG. 5; see the bottom right corner of FIG. 5. The bottom detail in FIG. 6 is that of another similar connector, note the differing dimensional proportions of box 600, pin 610 and fitted pin 605. In particular note circumferential groove 615 in the box that is used in order to increase locally the meridional flexibility of box 600. Similar grooves or systems of multiple grooves increasing locally the structural flexibility can be arranged in corresponding locations or in other regions of boxes and/or pins, in particular in the regions adjacent to (metal) nipple seals. Depending on particular design requirements those may be beneficial in any connector depicted on FIGS. 1 through 20 or otherwise discussed herein.

Connectors featuring fitted pins 505, 605 can be economical in design, retrofitted with shear fitted pins or otherwise adapted for particular design requirements, because shear pins 505, 605 or alike can be easily located in regions of relatively low structural loading. Holes to fit shear pins 505, 605 are relatively easy to drill, shim or/and tap if threads are required to whatever geometries may be selected. Typically interference fitting of shear pins 505, 605 or alike may be required depending on particular design needs.

Shear (fitted) pins 505, 605 can be optionally screwed into one of the parts being connected or/and bonded with an adhesive, see also FIGS. 12, 13, 17 and 18*b*. O-rings, metal ring seals or other sealing arrangements can be used in order to protect shear pins 505, 605 from seawater and from internal fluids, as applicable. CRAs, titanium alloys, aluminum alloys, magnesium alloys, nickel based alloys, steels, other materials, cladding with CRAs, weld overlaying with CRAs or encapsulating of interacting regions in protective resins, etc. can be used with novel connectors featured herein. It is noted that fitted pins 505, 605 as shown on FIG. 6 can be also incorporated in the designs shown on FIGS. 1 through 3, or they can be combined with any of FIGS. 7 through 10 or with any of FIGS. 11*a* through 11*l*, 11*n*, and 11*s* through 11*v*, FIG. 11*x*, 11*y*, 14*a*, 15*a* through 15*c*, 18*c*, 19 and/or 20. All the above highlighted combinations represent feasible designs of novel connectors.

Figure 7:
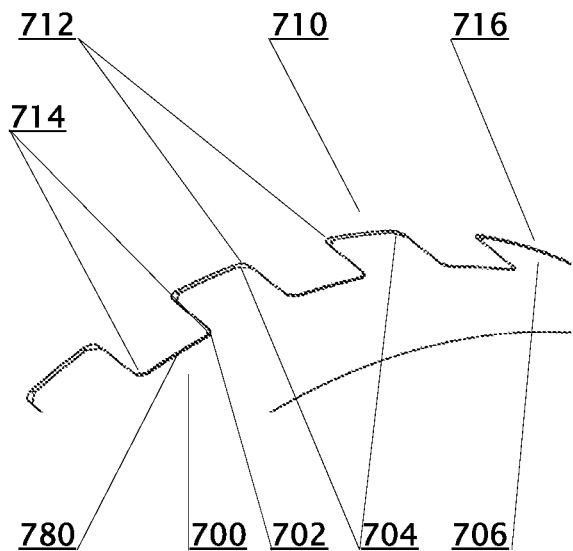

FIG. 7 depicts a detail of a novel connector assembled. The dog-clutch torque transfer principle is utilized near the outside surfaces of pin 710 and box 700. Dog-clutch teeth 780, 706, 716 utilize the full material thickness available between the (metal) nipple seal region and the outside surface of the connector, which is not fully visible on the figure.

If required, dog-clutch teeth 780, as well as optional dog-clutch teeth 706 and 716, are typically arranged around the circumference in a non-uniform circumferential pitch or/and pattern, in order to assure the connector assembly with the correct azimuth orientation of box 700 relative pin 710. Optional teeth 706/716 have for that purpose optionally different circumferential dimensions than teeth 780 have.

Figure 8:
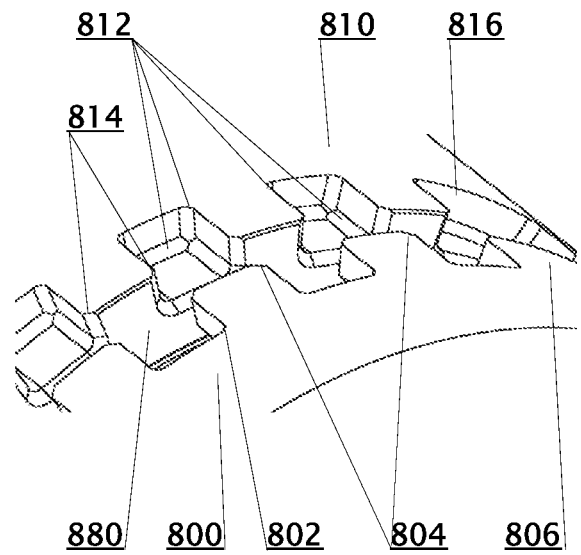

FIG. 8 depicts in an exploded view a detail of a novel connector. The dog-clutch torque transfer principle is utilized near the outside surfaces of pin 810 and box 800. Dog-clutch teeth 880, as well as optionally differently dimensioned dog-clutch teeth 806 and 816 utilize a partial material thickness available between the (metal) nipple seal region and the outside surface of the connector.

It is known to anybody skilled in the art that long life torsional fatigue strength of circular cross-section components (like for example turbine shafts) is less sensitive to the working cross-section changes than bending fatigue is. However, for this application high torsional fatigue strength is important and the preferred designs utilize relatively large fillet radii 702, 802 and 712, 812 for the concave regions of component edges. In particular large fillet radii 702, 802 are used on FIGS. 7 and 8 for box 700, 800 concave edge regions and large fillet radii 712, 812 are used for pin 710, 810 concave edge regions. For convex edge regions the shapes are not critical for fatigue life and chamfers 704, 804 are shown for the convex edge regions of boxes and 714, 814 for the convex edge regions of pins, but fillets can be also used instead. High torsional load capacity arrangements 780, 880, as well as optional dog-clutch teeth 706 and 806, 716 and 816 shown can feature optionally non-uniform circumferential pitch of shapes 706, 806 and 716, 816 on boxes 700, 800 and pins 710, 810 respectively, in order to assure that the connector can be optionally assembled only in its prescribed azimuth orientation of pins 710, 810 relative boxes 700, 800, respectively.

Figure 9:
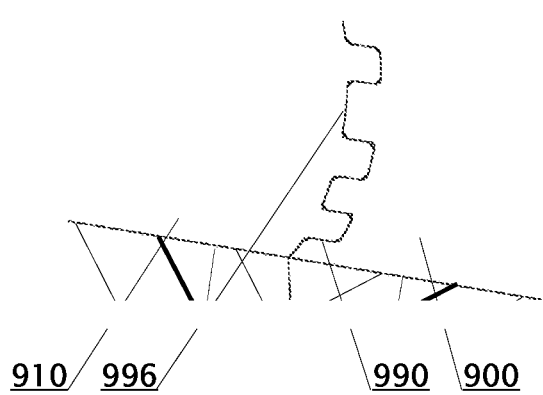

FIG. 9 depicts a detail of a novel connector assembled. The dog-clutch torque transfer principle is utilized near the inside surfaces of pin 910 and box 900. Dog-clutch teeth 990, as well as optionally differently dimensioned dog-clutch teeth 996, utilize the full material thickness available between the (metal) nipple seal region and the inside surface of the connector, which is not fully visible on the figure.

If required, dog-clutch teeth 990, as well as optional dog-clutch teeth 996, can be optionally, but typically, arranged around the circumference in an optional non-uniform circumferential pitch or/and pattern, in order to assure the connector assembly with the prescribed azimuth orientation of box 900 relative pin 910. Optional teeth 996 can have for that purpose different circumferential spacing than teeth 990 have.

Figure 10:
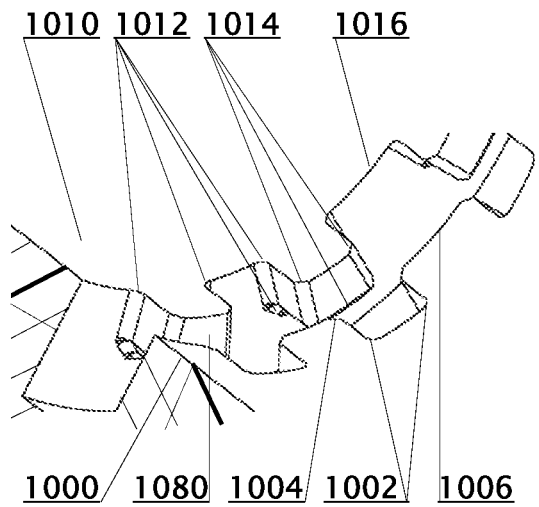

FIG. 10 depicts in an exploded view a detail of a novel connector. The dog-clutch torque transfer principle is utilized near the inside surfaces of pin 1010 and box 1000. Dog-clutch teeth 1080, as well as optional dog-clutch teeth 1006 and 1016, utilize a partial material thickness available between the (metal) nipple seal region and the inside surface of the connector.

If required, dog-clutch teeth 1080, as well as optional dog-clutch teeth 1006 and 1016, can be optionally, but typically, arranged around the circumference in an optional non-uniform circumferential spacing or/and pattern, in order to optionally assure the connector assembly with the prescribed azimuth orientation of box 1000 relative pin 1010. Optional teeth 1006/1016 have for that purpose different circumferential spacing than teeth 1080 have.

For applications where high torsional fatigue strength is important and the preferred designs utilize relatively large fillet radii 1002 and 1012 for concave regions of component edges. In particular large fillet radii 1002 are used for box 1000 concave edge regions and large fillet radii 1012 are used for pin 1010 concave edge regions. For convex edge regions the shapes are not critical for torsional strength and chamfers 1004 are shown for the convex edge regions of box 1000 and 1014 for the convex regions of edges of pin 1010, but fillets can be also used instead.

The design of the protruding teeth and matching hollows carrying torsional loads can be reversed between the boxes and the pins without affecting the functionality of this invention in the examples shown on FIGS. 7 through 10. A mixed reversed/not reversed design can also be used instead of that shown.

Connectors featuring the dog-clutch torque transfer arrangements can be economical in design for particular requirements, because torque transfer teeth 780, 706, 716, 880, 806, 816, 990, 996, 1006, 1016 can be easily located in regions of relatively low structural loading as shown in FIGS. 7 through 10, 12 and/or 13. Dog-clutch teeth arrangements like those shown in details on FIGS. 7 through 10 can be also incorporated for example in any of the designs shown on FIGS. 11a through 11m, 11o, 11q, 11s, 11u, 11v, and/or 14a through 20. All the above highlighted combinations represent feasible designs of novel connectors.

Whenever the torque transfer arrangements are located simultaneously on both ends [near both (metal) nipple seal systems in the same connector, novel connectors utilizing fitted pins 505, 605 or dog-clutch torque transferring teeth 780, 706, 716, 880, 806, 816, 990, 996, 1006, 1016 characterize with most of the torque being transferred through the connector structures, while largely by-passing those main contact surfaces between the boxes and the pins that transfer the axial and bending loads.

FIGS. 11a through 11y depict for the sake of example design implementations of torque transfer mechanisms featured used separately and in combinations. Variations in structural segment sequencing along the example connectors shown are also featured.

Example design implementations of novel mechanical connectors shown in FIGS. 11a through 11y provide differing load transfer functions between box 1100 and pin 1110 are separated longitudinally into segments (sets). Surfaces 1111 of frustoconical pitch diameters (averaged diameter) are depicted schematically with dashed lines. Those extend between (metal) nipple seals near each of the connectors, which are shown on FIGS. 11a through 11y with short lines parallel to the connector axes, but not annotated. Groove/protrusions systems (also referred to herein as grooving) along frustoconical surfaces 1111 are shown schematically with groups of thin continuous lines. In general, the taper angles of the frustoconical surfaces of box 1100 and pin 1110 vary along the lengths of the connectors. The same is in general the case with other connectors like those shown on FIGS. 1 through 20. Fitted (shear) pin systems (sets) are indicated with rows of hollow shapes with barbs. Dog-clutch tooth systems are shown with rectangular zig-zag lines.

Because generic families of connectors are represented only schematically on FIGS. 11a through 11y, the same generic annotations are used for simplicity on FIGS. 11a through 11y for all the generic components corresponding in connectors of differing designs:

Known types of grooving (thread) providing static and fatigue transfer of axial and bending loads are annotated 1140 (axisymmetric, zero pitch angle, i.e. $\alpha=0°$);

Thread grooving featuring absolute values of pitch angles (fixed or variable) greater than 0° and smaller than 90° ($0°<\alpha<90°$) according to this invention are annotated 1120 and 1121 for general left-handed and general right-handed threads respectively; additionally left handed threads and right handed threads that have pitches significantly differing (i.e. greater or smaller) from those annotated 1120 and/or 1121 used in the same connector are annotated 1125 and 1126, respectively. Groovings 1120, 1121, 1125 and 1126 combine the functions of transfer of axial, bending and torsional static and dynamic (fatigue) loads; pitch angles of left-handed or right-handed threads generally vary slightly along a frustoconical segment of the connector, while always satisfying $0°<\alpha<90°$, but for telescopically assembled connectors discussed herein they can undergo arbitrary variations along connectors or be in particular constant along a connector, if desired so (thus describing a conical helix, or concho-spiral), even though in general there may be no reason for keeping angle $\alpha$ constant;

Spline (grooving) sets according to this invention that transfers torsional static and dynamic loads are annotated 1130 (absolute value pitch angles essentially equal to 90°, $\alpha=90°$, because splines can be regarded as threads having infinite axial pitch; note that the tangent of 90° is infinite);

Systems (sets) of keys used for torque transfer are annotated 1107 for keys arranged in circumferential rows and 1117 for axially staggered key patterns, or for keys distributed irregularly on surfaces 1111;

Systems (sets) of fitted shear pins used for torque transfer are annotated 1150;

Systems (sets) of dog-clutch teeth used to transfer torque and situated in the outside or in the inside abutment areas are annotated 1160.

The numbers and/or sequences of segment (set) types shown in any schematic view included on FIGS. 11a through 11z and their relative axial arrangements are incidental and these values/features can be modified arbitrarily without changing the type of implementation of this invention.

FIG. 11a depicts an example implementation of a novel connector featuring two segments with grooving (thread) type 1140 and one segment with left-handed grooving (thread) type 1120. The example shown in FIG. 11a equally represents its mirror image with a replacement of grooving (thread) type 1120 with right-handed grooving (thread) type 1121, as shown on FIG. 11k.

FIG. 11b depicts an example novel connector featuring two segments with grooving type 1140 and two non-zero pitch angle segments with thread types 1120 and 1121. Segment 1120 utilizes a left-handed thread and segment 1121 utilizes a right-handed thread.

FIG. 11c depicts an example novel connector featuring several segments with grooving (thread) type 1140, a segment with thread type 1120 and a segment with thread type 1121. Segment 1120 utilizes a left-handed thread and segment 1121 utilizes a right-handed thread.

FIG. 11d depicts an example novel connector featuring two segments with grooving (thread) type 1140, one segment (set) with spline grooving type 1130, a segment with thread type 1120 and a segment with thread type 1121 (see also FIGS. 1 and 2). It is understood that similar systems utilizing multiple spline sets (segments) 1130 can also be used in connectors featuring also segments type 1120 and/or 1121, in connectors utilizing only segments type 1140 and sets type 1130, see FIGS. 1, 2, 11g through 11j, 11l through 11p, 11r, 11x or/and 11y for examples.

FIGS. 11e and 11f depict example novel connectors featuring known type of axisymmetric, zero-pitch angle grooving 1140 that is utilized to transfer axial and bending loads between box 1100 and pin 1110 with key inserts 1107, 1117 essentially following local taper angles of the pitch diameter surfaces 1111 of box 1100 and pin 1110. Any geometrical shapes and types of key inserts 1107, 1117 can be used. It is noted however, that the key-grooves and the key-inserts need not necessarily follow the local taper angles in many similar connectors. They may or may not be arranged essentially in straight lines and in addition to being arranged essentially in axial (meridional) planes, they can also be arranged at non-zero angles to the said axial (meridional) planes of the said novel connector.

Although that does not necessarily need to be the case, it is preferred that key inserts have as slim design as possible, in particular in the radial direction of the connector. If feasible, the grooving used to insert the keys utilized in this invention should preferably not penetrate inside the material of box 1100 or pin 1110 deeper than grooving type 1140, or/and types 1120 or/and 1121 if also used in the same connector (see also FIGS. 3 and 4).

However, in particular where the length of the said connector is the issue, or when the axially symmetric grooving is very shallow, deeper grooving than that outlined above may need to be used with key grooving 1107, 1117 utilized in the said novel connectors. Shallow grooving 1107, 1117 may weaken bending load capacities of connectors only minimally.

Non-zero pitch angle thread segments 1120, 1121, while used separately would only allow a reliable torque transfer in one rotational direction, that which tightens the tapered thread. Applying a torque in the opposite direction would have unscrewed the connection. Both these facts are well known to those skilled in the art, because they are widely used in threaded connections, including for example tapered threaded drill-pipe connectors. However, in novel connectors the unscrewing of either thread 1120 or 1121 is prevented because of the interlocking with other types of grooving 1140, 1121, 1120, or/and 1126, 1125 respectively and novel connectors like for example those shown on FIGS. 11a through 11d, 11k, 11o through 11v, 11x and/or 11y are very effective in the transfer of torsional loads in both opposite rotational directions. In novel connectors featuring only segments with thread direction 1120 (see FIG. 11a) or 1121 (see FIG. 11k or/and 11q) the unscrewing is prevented by interlocking (via an axial load) with axisymmetric grooving 1140. On connectors that utilize non-zero pitch angle thread 1120 and 1121 (FIGS. 11b, 11c and 11d) thread 1120 is torsionally interlocked against the opposite thread, with grooving 1140 and in the case of the system shown in FIG. 11d spline set (system) 1130 helping additionally. Interlocking in the torsional load direction is also effected simultaneously with any other structural arrangements used optionally, or in order to increase the torque transfer capacities of novel connectors, see multiple examples shown and/or described herein.

FIG. 11g features spline (rows) sets 1130 arranged outside axisymmetric, zero pitch angle grooving 1140 arranged along interface 1111 of box 1100 and pin 1110.

FIGS. 11h through 11j feature each several spline (rows) sets 1130 arranged interchangeably between axisymmetric, zero pitch angle thread 1140 arranged along interface 1111 of box 1100 and pin 1110.

FIG. 11k depicts an example novel connector featuring two segments with grooving (thread) type 1140 and one segment with grooving (thread) type 1121. The example shown in FIG. 11k equally represents its mirror image with a replacement of grooving (thread) type 1121 with grooving (thread) type 1120, as shown on FIG. 11a.

FIG. 11l depicts an example novel connector featuring three segments with grooving (thread) type 1140, two segments (sets) of splines 1130 arranged between the segments of axisymmetric threads 1140 and key system 1107.

FIG. 11m depicts an example novel connector featuring four segments with grooving (thread) type 1140, three segments (sets) of splines 1130 arranged between the segments of axisymmetric threads 1140 and two systems of fitted shear pins at each connector end.

FIG. 11n depicts an example novel connector featuring four segments with grooving (thread) type 1140, three segments (sets) of splines 1130 arranged between the segments of axisymmetric threads 1140 and systems of dog-clutch teeth 1160 at each connector end.

FIG. 11o depicts an example novel connector featuring four segments with grooving (thread) type 1140, three segments (sets) of splines 1130, single segments of non-zero pitch angle threads 1120 and 1121 each, and systems of fitted shear pins 1150 at each connector end.

FIG. 11p depicts an example novel connector featuring four segments with grooving (thread) type 1140, three segments (sets) of splines 1130, single segments of non-zero pitch angle threads 1120 and 1121, a system (set) of fitted shear pins 1150 near the outside (metal) nipple seals and a system (set) of dog-clutch teeth 1160 near the inside (metal) nipple seals.

FIG. 11q depicts an example novel connector featuring two segments with grooving (thread) type 1140, one segment with right-handed thread 1121 and systems (sets) of fitted shear pins 1150 at each connector end. Example novel connector shown in FIG. 11r implements a combination of 5 structural torque transfer arrangements featured herein implemented in a single design.

FIG. 11r depicts an example novel connector featuring three segments with grooving (thread) type 1140, two segments (sets) of splines 1130, single segments of non-zero pitch angle threads 1120 and 1121 each, a system (set) of keys 1107, a system of fitted shear pins 1150 near the outside (metal) nipple seals and a system of dog-clutch teeth 1160 near the inside (metal) nipple seals. Example novel connector shown in FIG. 11r implements a combination of 6 structural torque transfer arrangements featured herein implemented in a single design.

FIG. 11s depicts an example novel connector featuring two segments each of non-zero pitch angle threads 1120 and 1121, four segments in total.

FIG. 11t depicts an example novel connector featuring single segments each of non-zero pitch angle threads 1120 and 1121 and a system (set) of dog-clutch-teeth 1160 arranged near the inside (metal) nipple seals.

Note that FIGS. 11s through 11v do not feature axisymmetric thread 1140, which is acceptable, because each of threads 1120, 1121, 1125 and 1126 also transfer axial and bending loads. In fact threads 1120, 1121, 1125 and/or 1126 can be used in novel connectors without a use of zero pitch angle segment(s), providing that they are interlocked with at least one of the other structural torque transfer sets: splines, keys, fitted pins, dog-clutch pins or even other segment(s) of thread 1125, 1126, 1120 and/or 1121 respectively (i.e. those in the same directions, i.e. same-handed, see FIGS. 11u and 11v), providing that they use sufficiently differing pitch angle values, so that torsional interlocking would occur. It is, however, preferred to use pairs of opposite-handed thread segments with thread interlocking in mind; opposite-handed pairs meant as pairing left-handed thread segments with right-handed segments and vice versa.

FIG. 11u depicts an example novel connector featuring a segment of right-handed thread 1121 and a same-handed, i.e. also right-handed segment of thread 1126 having a pitch angle differing from that of thread segment 1121.

FIG. 11v depicts an example novel connector featuring a segment of left-handed thread 1120 and a same-handed, i.e. also left-handed segment of thread 1125 having a pitch angle differing from that of thread segment 1120.

FIG. 11w depicts an example novel connector featuring three segments with grooving (thread) type 1140, a segment (set) of keys 1107, two systems (sets) of dog-clutch teeth 1160 at each connector end two systems (sets) of fitted shear pins 1150 at each connector end.

FIG. 11x depicts an example novel connector featuring three segments with grooving (thread) type 1140, two segments (sets) of splines 1130, single segments of non-zero pitch angle threads 1120 and 1121 each, a system (set) of keys 1107 and systems (sets) of dog-clutch teeth 1160 near each end of the connector. Example novel connector shown in FIG. 11x implements a combination of 5 structural torque transfer arrangements featured herein implemented in a single design, with a system of fitted (shear) pins not used.

FIG. 11y depicts an example novel connector featuring three segments with grooving (thread) type 1140, two segments (sets) of splines 1130, single segments of non-zero pitch angle threads 1120 and 1121 each, a system (set) of keys 1107, two systems (sets) of (fitted) shear pins 1150 and systems (sets) of dog-clutch teeth 1160 near each end of the connector. All but one sets of structural arrangements designed to transfer torque are optional. FIG. 11y also depicts schematically optional external 1170 and internal 1180 sets of stiffening arrangements according to this invention that can essentially be for example annular stiffening clamps.

FIG. 11z depicts an example known connector featuring five segments with axisymmetric grooving (thread) type 1140. FIG. 11z also depicts schematically optional external 1170 and internal 1180 sets of stiffening arrangements according to this invention that can essentially be for example annular stiffening clamps.

External clamp 1170 and/or internal clamp 1180 depicted on FIG. 11y and on FIG. 11z have as their purpose structural restricting essentially of the box shell from radial deformations outwards (outbound, i.e. away from the connector axis) and structural restricting essentially of the pin shell from radial deformations inwards (inbound, i.e. towards the connector axis), respectively. Clamp 1170 and clamp 1180 keep the threads between the boxes and shells firmly engaged both locally and globally. External clamp 1170 essentially restricts the box shell from radial deformations outwards, however it is a good practice to extend it beyond the abutment joint of outside nipple seals, accordingly it also restricts a part of the outside pin surface from radial deformations outwards. Internal clamp 1180 essentially restricts the pin shell from radial deformations inwards, however it is a good practice to extend it beyond the 'abutment' surfaces of inside nipple seals, accordingly it also restricts a part of the inside box surface from radial deformations inwards. The inside 'abutment' is by necessity a gap that can be sealed with an O-ring, or similar. Accordingly, because of the radial restricting actions of external clamp 1170 and/or internal clamp 1180 depicted on FIG. 11y and on FIG. 11z, the connector threads engaged on the frustoconical surfaces of the box and the pin are essentially engaged in an essentially compressive 'vise grip' acting through a mechanism of radial interference fit in the radial direction at all o'clock locations around the circumference of the box and the pin of the connector. The term 'essentially compressive vise grip' is self-descriptive with regard to compressing radially the female and male interacting thread surfaces together. It is defined as essentially compressing radially together the female thread surface and the male thread surface interacting with said female thread surface, as if they were engaged in a compressive grip of an imaginary vise. The strength of the said vise grip varies from very light, to very strong, depending on particular design needs.

Clamps 1170 and/or 1180 that extend beyond the abutment surfaces of nipple seals additionally help to seal the nipple seal surfaces and they may also provide their own sealing surfaces on the areas of interactions with the boxes and/or with the pins. O-rings, or other seals or gaskets can be optionally added between the clamps and/or the box and/or the pin on both sides of the outside and inside abutment areas. In cases where clamps 1170 and/or 1180 are segmented gaskets or other seals can be added to seal areas of segment interactions. For connectors utilized in low pressure installations silicone sealant or similar can be used. The purpose of clamps 1170 and/or 1180 is also the stabilization of essentially circular cross-sections structurally by essentially strengthening the boxes and/or the pins, respectively. That involves their design shape stabilizations by stiffening the connectors under any combinations of axial, bending and torsional loads. Clamps 1170 and/or 1180 are installed after the connectors are assembled, and they are typically removed before their disassemblies. While in place, clamps 1170 and/or 1180 restrict radial expansion of boxes and/or radial compression of pins and thus prevent disengaging of threads connecting boxes and pins. External clamp 1170 and/or internal clamp 1180 depicted on FIG. 11y and on FIG. 11z essentially conform to the external surfaces of the boxes and to the internal surfaces of the pins, respectively. Optionally but preferably, external clamps 1170 depicted on FIG. 11y and on FIG. 11z are installed with interference fits, so that the internal surfaces of external clamps 1170 are in interference fits with the conforming external surfaces of their boxes. Similarly, optionally but preferably, internal clamps 1180 depicted on FIG. 11y and on FIG. 11z are installed with interference fits, so that the external surfaces of internal clamps 1180 are in interference fits with the conforming internal surfaces of their pins.

External clamps 1170 and/or internal clamps 1180 depicted on FIG. 11y and on FIG. 11z are clamped to corresponding boxes and/or pins respectively. External clamp 1170 and/or internal clamp 1180 interact structurally with their adjacent boxes and/or pins while remaining essentially unbonded to their adjacent boxes and/or pins, but they may utilize matching (conforming) locating grooves and/or recesses. The matching (conforming) locating grooves and/or recesses may be arranged circumferentially, longitudinally or at acute angles to the connector axes. Known or novel connectors depicted on FIG. 11y and on FIG. 11z may also utilize repositionable/removable 'sticky adhesive' areas, cotter pins, safety wire, etc. that are essentially non-structural and they are used substantially to keep external clamps 1170 and/or internal clamps 1180 depicted on FIG. 11y and on FIG. 11z in their design locations relative the boxes and/or pins they interact with.

External clamps 1170 and/or internal clamps 1180 according to this invention depicted on FIG. 11y and on FIG. 11z can be split along one or more o'clock locations on their circumferences in order to assure an easy assembly, typically at some stage after the pins and the boxes are assembled telescopically, or they can form continuous sleeves. Splitting surfaces can be arranged in planes with connector axes, they can be slanted at acute angles to the connector circumferential surfaces. Splitting surfaces can also run at acute angles to connector axes, follow essentially helicoidal guiding lines, etc. Additional reasons for at least one of external clamps 1170 and/or internal clamps 1180 to be installed after the telescopic assembly of the connector is completed include the fact that known Merlin™ family connectors are typically designed in a critical way and a presence of fixed (bonded) external or internal stiffenings of boxes and pins would have made the telescopic assembly or disassembly of the connector impossible. In particular with a use of boxes and/or pins and/or clamps 1170 and/or 1180 made of elastomeric materials and/or essentially hyperelastic materials (like rubber, isoprene, neoprene, some other natural or synthetic materials that model essentially well as hyperelastic materials, etc.), it may be feasible to slide on outside or in inside the connectors continuous sleeve clamps that are not split along their circumferences or clamps that are split along single o'clock locations. Ramrods and/or pigs and/or robots can be used for help in installations of internal clamps 1180 with the clamp pre-positioned before installation near the connector, or pushed in along a greater length of a pipe being connected. Ramrods and/or pigs and/or robots can include positioning, fitting and/or other tools, or/and they can be provided with tool-heads, etc., which may be optional or necessary depending on particular designs. External sleeve clamps, or external clamps split along single o'clock locations can also be prepositioned near the connector before their telescopic assemblies.

Sets of stiffening, clamping arrangements 1180 can have their inside diameters faired with the internal diameters of known or novel connectors, so that they are essentially the same as those of the connectors, as shown schematically on FIGS. 11y and 11z. Elastomeric materials perform essentially in a hyperelastic ways, but many other natural or synthetic materials can be also modeled as essentially hyperelastic materials. The elongation in such materials can be relatively high; an order of magnitude of up to around 400% is quite common; this is very high in comparison with high strength metallic materials, which reach plastic strains (elongations) of the order of 0.3% to 0.53%, (or even up to 0.67% for some titanium alloys) when one is considering metals that can be used for manufacturing known Merlin™ family connectors. What follows are correspondingly greater thread teeth heights versus material thickness in connectors utilizing non-metallic materials, like elastomeric materials in comparison with high strength metals. Utilizing external clamps 1170 and/or internal clamps 1180 according to this invention depicted on FIG. 11y and on FIG. 11z in the design of Merlin™ family connectors built from non-metallic materials, like elastomeric or other natural or synthetic is typically very important. In addition to the roles of external clamps 1170 and/or internal clamps 1180 already described, the clamps are typically designed to additionally seal the connectors and decrease the probability of eventually developing leaks. External clamps 1170 and/or internal clamps 1180 according to this invention depicted on FIG. 11y and on FIG. 11z stiffen the boxes and/or pins they clamp regarding deflections caused by any combinations of axial, bending and torsional loads. They are also designed to prevent accidental penetration of internal or external fluids into the annuli between the boxes and the pins and thus they are designed to prevent accidental disassemblies of connectors because of fluid pressure penetrations into the annuli and/or other similar leaks. Because of the essential interference fits they improve the engagements of axisymmetric and/or left handed and/or right handed threads and prevent global or local disengagements of the said threads that might happen under excessive axial and/or bending and/or torsional loads of the connectors, as applicable. External clamps 1170 and/or internal clamps 1180 according to this invention depicted on FIG. 11y and on FIG. 11z are also very effective in preventing buckling, including cardioidal buckling of components of connectors featuring slender design and/or that of connectors made of synthetic or natural non-metallic materials that are more elastic than metallic materials typically are. Other types of shapes becoming unstable (buckling) relevant here may involve local flattening of cross-sections or 'kinks' (typically occurring under local bending and or bending combined with torsion and/or with axial loads; those 'kinks' are not dissimilar to garden hose kinks). Stiffener web buckling and/or asteroidal buckling of components under excessive torsional loads, or torsional loads coupled with bending and/or axial loads may also occur. The above loss of stability (or buckling) modes may be particularly relevant to connectors of light and/or slender design and to connectors utilizing in their construction composite materials, elastomeric materials and/or essentially hyperelastic materials (like rubber, isoprene, neoprene, some other natural or synthetic materials that model essentially well as hyperelastic materials, etc.) and/or external clamps 1170 and/or internal clamps 1180 according to this invention depicted on FIG. 11y and on FIG. 11z are particularly effective in preventing the section loss of stability (buckling).

Cardioidal buckling occurs in general under bending and/or axial loads, but torsion may also be involved. Typically an essentially circular cross-section collapses inwards along its o'clock location that results in assuming a roughly cardioidal (or U-shaped) form that propagates along the connector, pipe or tube. When some kind of laminated design is involved, like that of a box and pin assembled in a known or novel Merlin™ family connector, cardioidal buckling is more likely to affect internal layer(s), i.e. pins herein, following by a very likely unplanned, i.e. accidental disconnection. External clamps 1170 and/or internal clamps 1180 according to this invention depicted on FIG. 11y and on FIG. 11z are introduced herein to prevent that and other forms of buckling like section flattening, asteroidal buckling, etc. Asteroidal buckling can occur under predominantly torsional loads. When those loads become too high, material or shape non-uniformities may promote bulging of some (several) o'clock location(s) of a cross-section inwards (towards the center of the cross-section), which can propagate axially and circumferentially along essentially (several) helicoidal line(s).

In their construction external clamps 1170 and/or internal clamps 1180 according to this invention depicted on FIG. 11y and on FIG. 11z can utilize:
 friction welding,
 injection molding,
 3-Dimensional printing.

External clamps 1170 and/or internal clamps 1180 according to this invention depicted on FIG. 11y and on FIG. 11z can include stiffening ribs also known as for example rib stiffeners or web stiffeners or structural stiffenings or stiffeners or ribs or webs.

External clamps 1170 and/or internal clamps 1180 according to this invention depicted on FIG. 11y and on FIG. 11z can be made of at least one of:
 a high strength steel,
 or a corrosion resistant alloy,
 or a titanium alloy,
 or an aluminum alloy,
 or a magnesium alloy,
 or a nickel based alloy,
 or a non-metallic material including a plastic material,
 or a non-metallic natural or a non-metallic synthetic material,
 or a composite material,
 or an essentially elastomeric material,
 or a material behaving in an essentially hyperelastic way,
 or at least one of said box or said pin utilizes at least one of a lining or a cladding or a weld overlay.

External clamps 1170 and/or internal clamps 1180 according to this invention depicted on FIG. 11y and on FIG. 11z made of non-metallic material, including a plastic material, or a natural material, or a synthetic material, or an elastomeric material, or an hyperelastic material can include reinforcements with fibers, wires, a fiber-mesh or a wire-mesh.

Pitch angles of threads 1120, 1121, 1125 and/or 1126 should be selected carefully in the design. Large, close to 90° absolute values of those pitch angles are more effective in the transfer of torque and less effective in the transfer of the axial and bending loads, vice versa for small pitch angles approaching 0°.

Figure 12:
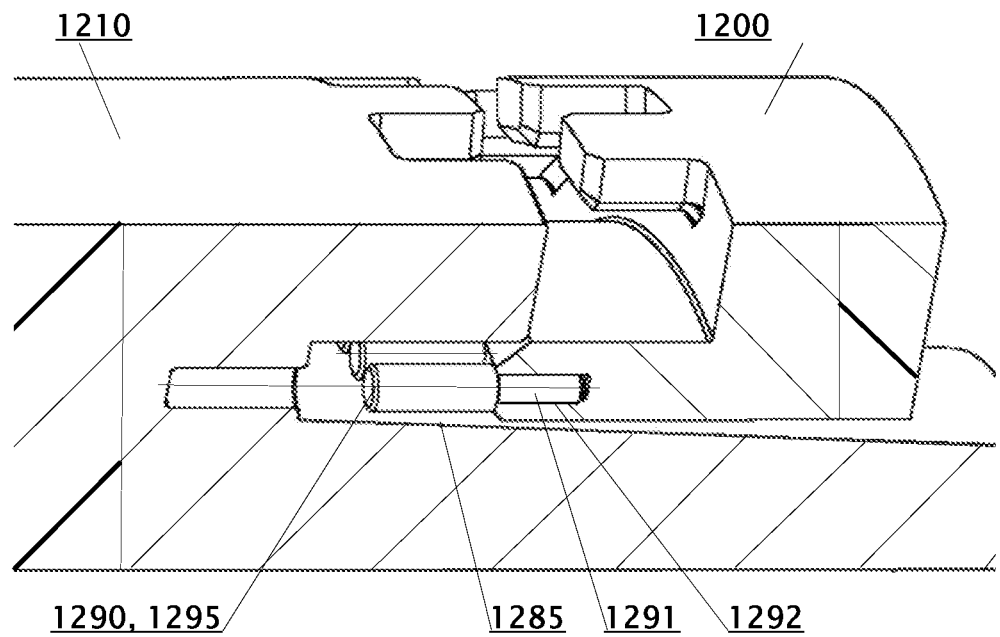

FIG. 12 depicts schematically a segment of a novel connector combining the dog-clutch and the fitted shear pin principles. The high torque transfer region is located near external (metal) nipple seals 1285 and the torque bearing protrusions extend partly through the wall thickness of box 1200 and they match cavities in pin 1210.

Pins 1290 or 1295 are tight fitted in cavities of box 1200 and pin 1210. Pins 1290 can have uniform cylindrical shape or pins 1295 can be of a slightly tapered shape (not shown) that would not be visible on the drawing, if shown. Optionally, stepped fitted pin design 1291 can be used in various implementations of this invention, as shown on FIG. 12. Optionally pin segment 1291 and the box region where it is inserted can be threaded, as designated with annotation 1292 in order to highlight that option (see also FIG. 18b). In a case the stepped fitted shear pin shape is selected, the stepped pin nest, threaded or not threaded, can be located in pin 1210, or it can be located instead in the box 1200 part of the connector, if preferred so, without affecting the functionality of this invention.

Figure 13:
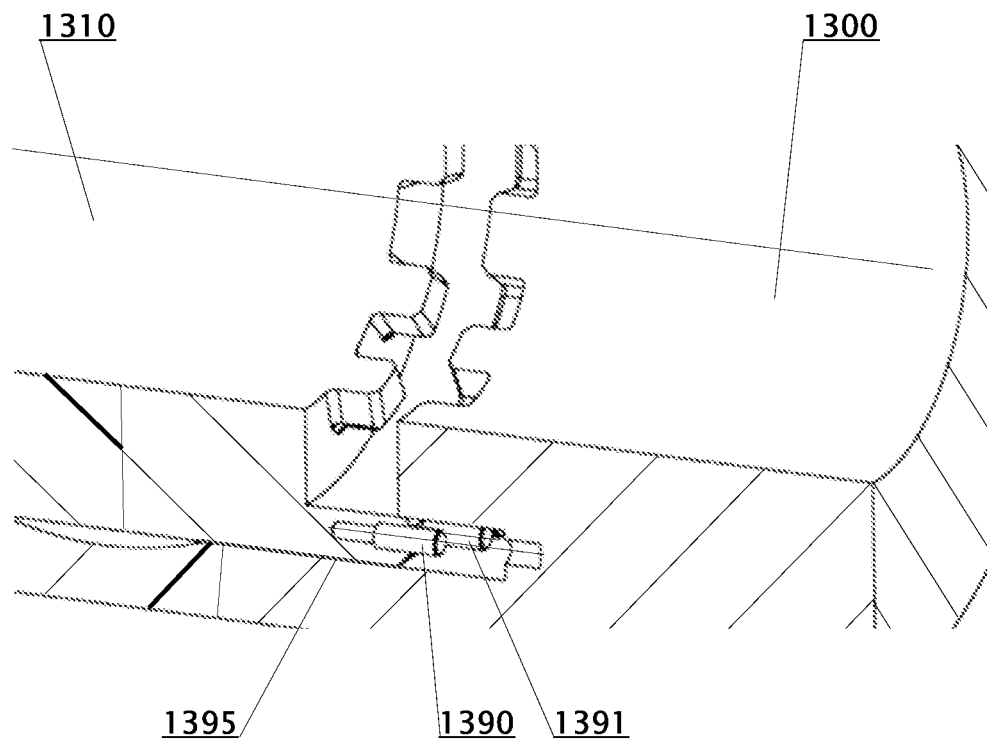

FIG. 13 depicts schematically a segment of a novel connector between box 1300 and pin 1310 that combines optionally the dog-clutch and the fitted shear pin principles. The high torque transfer region is located near internal (metal) nipple seals 1395 and the torque bearing protrusions extend partly through the wall thickness of box 1300. Fitted shear pins are depicted in fully inserted and partly inserted positions 1390 and 1391, respectively. Remarks already provided with descriptions of other drawings also apply to FIG. 13.

FIGS. 14a through 14e and 15a through 15c show novel connectors designed for relatively low design pressures to medium pressures with an objective to considerably decrease the assembly/disassembly fluid pressures in comparison with those used typically in known Merlin™ family connectors. For known connectors the assembly/disassembly fluid pressures increase with the reduction of connector size—lower hydraulic pressures are used for larger diameter connectors. For example for a known, high pressure production riser Merlin™ family connector having OD=8.625" (219.1 mm) the assembly/disassembly fluid pressure required is typically very high. The novel connector designs shown in FIGS. 14a through 14e and 15a through 15c have considerably smaller ODs than is the 8.625" regarded at present as the minimum feasible for the designs of known Merlin™ family connectors. In spite of the above, thanks to the design modifications introduced it was possible to considerably reduce the assembly/disassembly pressures required, to the extent that it may even be practicable to use compressed gas as the assembly/disassembly fluid. At the same time it was possible to achieve the overall length of the connectors assembled between the weld necks, as shown on FIGS. 14a and 15a of the order of 75% of the tubing (piping) OD. The overlaps between the boxes and the pins were around 60% of the ODs of the tubing (piping). Depending on the design loading of novel connectors featuring similar geometries it may be feasible to decrease the numbers and the pitch of threads used, etc., which may allow to reduce the length to ODs ratios and the overlap to ODs ratios even further.

The structural stiffenings of novel connectors also known as for example stiffening ribs or rib stiffeners or web stiffeners or stiffeners or ribs or webs are shown on FIGS. 14a through 14e and 15a through 15c and are represented schematically as infinitesimally thin shells for clarity of geometries shown. Simultaneously with the achievements highlighted in the paragraph above considerable material and weight savings were achieved, which may be advantageous in some applications.

Novel connectors shown on FIGS. 14a through 14e and 15a through 15c can be built conventionally (traditionally) by welding the stiffeners to the box and the pin, subdividing the fairing plate/screen into smaller panels and welding those to the webs. The hatchings through the mid-thicknesses of those meridionally-planar stiffeners 1431, 1432 shown in cross-sections are hatched as traditionally fabricated components. The preferred manufacturing method of novel connectors and their components shown in FIGS. 14a through 14e is 3D printing. In a case pin 1410 had been built using 3D printing, the hatchings of stiffeners 1431 and 1432 would have been the same as that of pin 1410.

Novel structural modifications introduced on FIGS. 14a through 14e and 15a through 15c are the following:

- Novel variations in the stress IDs 1411, 1511, tapering of the stress ODs 1415, 1515 of boxes 1400, 1500, or their approximations;
- Optional tapering of the inside (stress) diameters 1417 of pin 1410, or its approximation;
- Providing optional planar ribs 1421, 1521 and/or curved ribs 1523, 1524, 1525, optionally forming stiffening patterns like for example helicoidal pattern 1526, box pattern 1527 or honeycomb pattern 1528 on boxes 1400, 1500;
- Providing optional planar ribs 1431, 1432, 1433, 1434, 1435, 1436, 1437, 1438, 1439, 1440, 1441 and/or curved ribs 1455, 1456, 1457, optionally forming stiffening patterns like for example helicoidal patterns 1460, box pattern 1461, honeycomb patterns 1462, 1463 or other patterns 1464, 1465, 1466, 1467 on pin 1410;
- Introducing optional web stiffeners 1802, see also examples of other web stiffener arrangements feasible 1801, 1803, 1804, 1805, 1806 and 1807, see FIG. 18a. Web stiffener 1801 shown is double-sided, stiffeners 1802 through 1807 are shown as single-sided for the sake of examples only. A use of similar double sided web stiffeners or any other shapes meeting particular design objectives is also feasible.
- Fairing the IDs of the pins to constant design values with optional fairing plates or screens 1471, 1472, 1473 and 1474;
- Introducing stress relieving cut-outs 1481, 1482 and similar (shown, but not annotated) that also allow fluid flow across stiffeners;
- Adjusting distances between the ends of the threaded segments and inside and outside nipple seals in order to control the meridional bending stiffnesses of pins and boxes in those regions.

Optionally, but preferably in most cases cylindrical fairing plates 1471, 1472, 1473, 1474 can be provided with pressure equalizing holes, slots screens, etc., so that the fluid pressures are substantially the same in the flow and in the cavities formed by pin stiffeners and fairings. Design details can vary considerably depending on the fluid transported and wide ranges of design conditions. In particular pressure equalizing holes 1491 shown on FIGS. 15a and 15b may be suitable for tubing or piping connectors transporting gases with not too big flow transients. High pressure, flow and thermal transients, multiphase flow, a presence of solid sediments, draining requirements, etc. may require more and larger holes, slots or screens with wide ranges of solidity ratios. Hole or slot structural or thermal reinforcements like for example 1817 (FIG. 18b) may be required in cases of high pressure, flow and/or thermal transients.

For slender connector designs where reducing component weight is important the design of inside (and outside) nipple seal regions may require novel local connector wall thickness increase(s) near one or both ends like that depicted on FIG. 14a as 1403. External and internal structural reinforcements can be used in order to provide acceptable load paths, to optimize hoop stress loading, meridional bending stiffness and to prevent buckling during the assembly and/or in operation. Stiffening means arranged on the outside surface of said box can optionally include implementations featuring fiber reinforced plastic stiffenings of said box of said mechanical connector.

FIGS. 14a through 14d, 15b and 15c show for sake of examples single rows of honeycombs and/or box stiffeners. However, many more rows of sandwich stiffeners like those (in particular honeycombs of relatively smaller dimensions) could be used instead in their places, as it is often practiced in engineering. The webs corresponding would be more slender, the resulting straining of boxes and pins would be more uniform and even greater weight savings might result. The single row 'sandwich' stiffeners in FIGS. 14a through 14d, 15b and 15c are shown herein for example, because those are less typical in sandwich panel engineering. External sandwich panel fairings on box stiffeners (not shown) can be also used. All the above mentioned stiffener designs can also be used on novel high pressure connectors like those shown in FIGS. 16 and 17.

Figure 16:
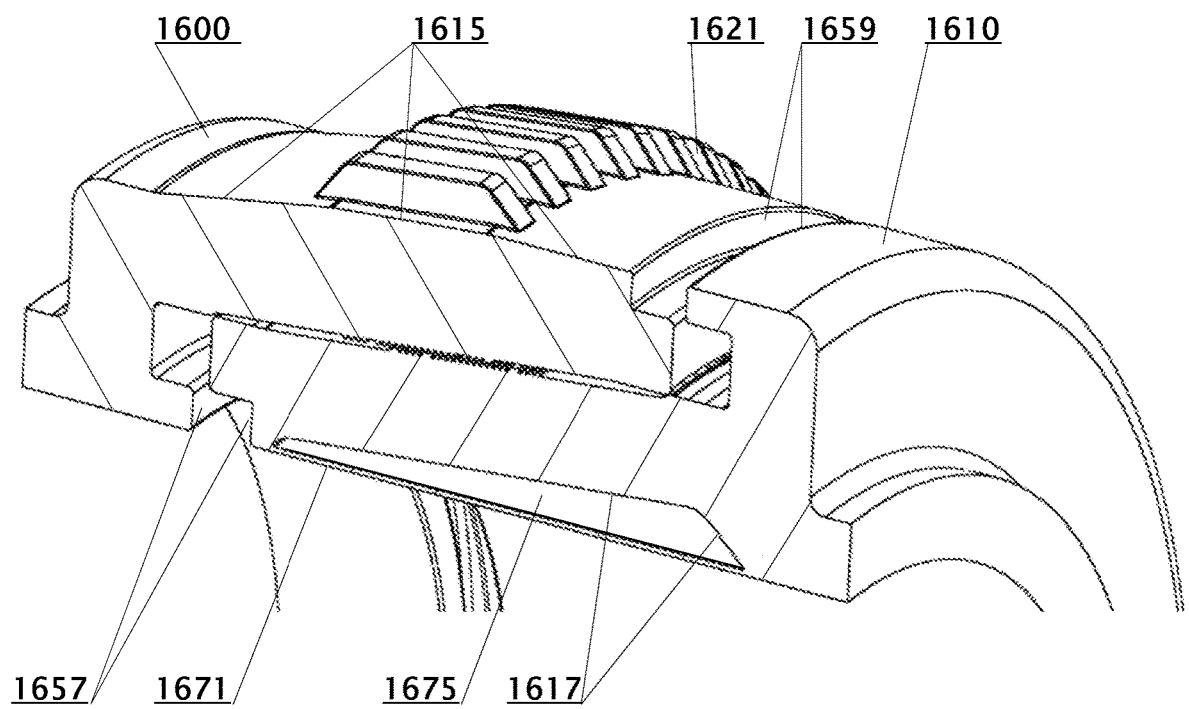

FIG. 16 depicts an example detail of a novel connector designed for relatively high design pressures and limited space available along the connector axis. The design shown features outside tubing or piping diameter considerably smaller than OD=8.625" (219.1 mm). The ratio of the length of the connector assembled (between the weld necks, as shown) to the outside diameter of the tubing is just above 60% and the ratio of the box/pin overlap to the outside tubing diameter is around 40%. Again, with further design optimizations, a reduced number of threads, a smaller thread pitch, smaller heights of the thread teeth, etc. as governed by a particular design premise achieving even smaller length and overlap ratios might be achievable. The materials used for novel connectors featured herein, and in particular for those depicted on FIGS. 14a through 17 are also of importance. The use of very high strength materials, in particular where their elastic moduli are not very high may also help in achieving very high design parameters of novel connectors at relatively small piping or tubing diameters (for example titanium and some nickel based alloys). Because of the high design pressure and the objectives to minimize the overall and box/pin overlap lengths the assembly/disassembly pressure required is relatively high, consistent with those used in the known Merlin™ family connector technology.

Box 1600 features multiple tapers 1615 on its outside diameter and meridional ribs 1621 also as known for example rib stiffeners or rib stiffenings or web stiffeners or structural stiffenings or stiffeners or webs, all used with or without the optional qualifier 'meridional'. More complex rib patterns like those shown on FIGS. 15a through 15c and highlighted in a discussion corresponding can be also used, if required. Pin 1610 features inside (stress) diameter tapering 1617 or its approximation, and inside diameter fairing or screen 1671. Fairing 1671 can be optionally provided on the inside of pin 1610 with pressure equalizing holes or slots (not shown) in order to equalize pressure between the tubing (piping) and pin cavity 1675. The optional pressure equalizing holes or slots are required for most designs.

All the connector components shown are represented as solids on FIG. 16. This connector can be constructed using conventional technology or 3D printing. A printed connector is shown on FIG. 16.

Figure 17:
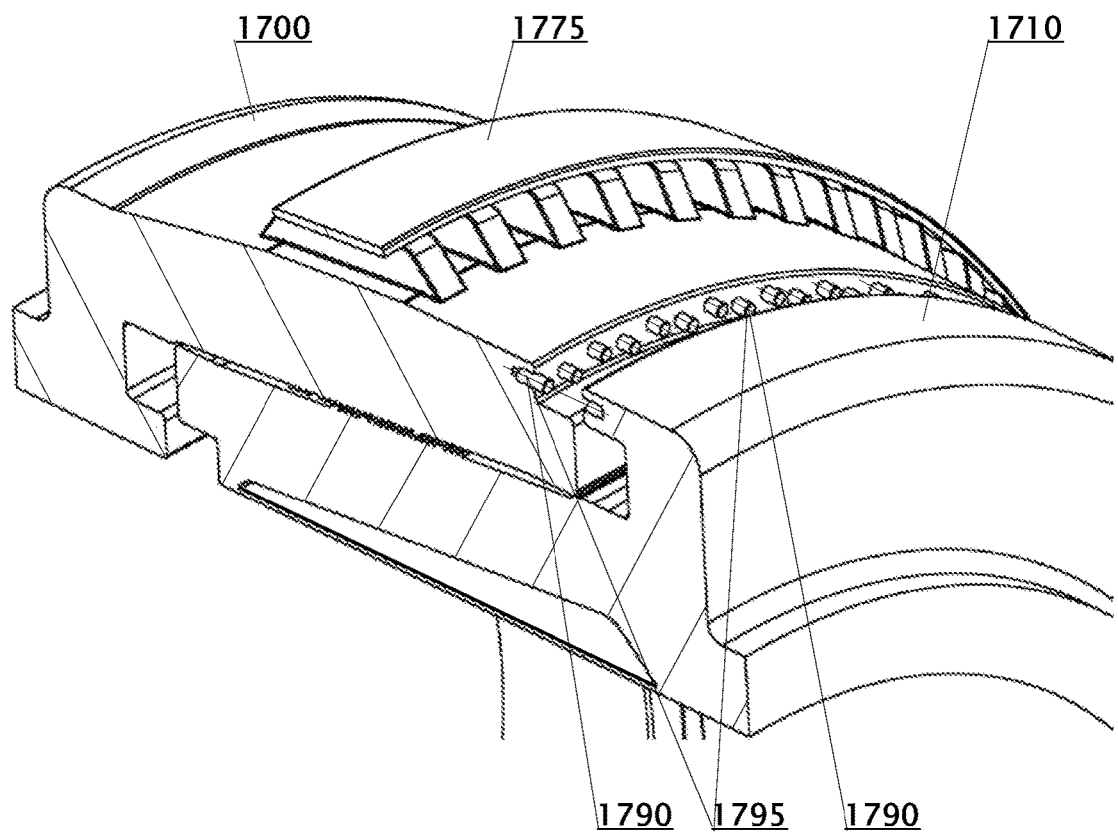

FIG. 17 depicts an example of a novel HP connector design featuring axisymmetric threads and shear fitted pins 1790, 1795 are arranged in two staggered rows near the outside metal (nipple) seals. Basic design of the novel connector shown on FIG. 17 is similar to that shown on FIG. 16. Fairing 1775 is provided for sake of an example on an outside of box 1700. Fairings could be similarly provided on the outside of boxes shown on FIGS. 14*a*, 15*a* through 15*c* and/or on FIG. 16 as well as on an outside of a box of any novel connector introduced herein, including connectors or clamps depicted on FIG. 1 through FIG. 11*z*, as applicable, FIG. 12, FIG. 13 and connectors details of which are shown on FIG. 18*a* through FIG. 20. Rib stiffeners or rib stiffenings or web stiffeners or structural stiffenings or stiffeners or ribs or webs depicted on FIGS. 14*a* through 14*e*, on FIGS. 15*a* through 15*c*, on FIGS. 16 and 17 represent examples only, because providing shell structures like those of pins, boxes, internal or external clamps with rib stiffeners or rib stiffenings or web stiffeners or structural stiffenings or stiffeners or ribs or webs is a regular, well known and understood design task. With regard to providing internal or external clamps with rib stiffeners or rib stiffenings or web stiffeners or structural stiffenings or stiffeners or ribs or webs it is noted that any arbitrary arrangement is acceptable. This includes combinations of rib stiffeners or rib stiffenings or web stiffeners or structural stiffenings or stiffeners or ribs or webs that coincide with planes perpendicular to the axes of the clamps and/or coincide with meridional planes of the clamps that are most often used. Rib stiffeners or rib stiffenings or web stiffeners or structural stiffenings or stiffeners or ribs or webs depicted for example on FIGS. 14*a* through 14*e*, on FIGS. 15*a* through 15*c*, on FIGS. 16-17 and FIG. 18*a* including their design patterns shown and/or discussed herein can be all used on boxes, on external clamps, on pins and on internal clamps described herein.

Pins 1790 or 1795 are tight fitted in cavities of box 1700 and pin 1710. Pins 1790 can have uniform cylindrical shape or pins 1795 can have a slightly tapered shape (not shown) that would not be visible on the drawing, if shown. Stepped fitted pin design is used in various implementations of this invention, as shown on FIG. 17, but a use of not-stepped pins is also feasible. Optionally, pin segment and the box region where it is inserted can be threaded, see 1792 on FIG. 18*b*. In a case the stepped fitted shear pin shape is selected, the stepped pin nest, threaded or not threaded, can be located in pin 1710, or it can be located instead in the box 1700, if preferred so, without affecting the functionality of this invention. Allen wrench (key) nest 1797 can be provided, see FIG. 18*b*, screwdriver slot, Phillips or torx nest, etc. can be used instead. All the connector components shown are represented as solids on FIG. 16. This connector can be constructed using conventional technology or 3D printing. A printed connector is shown on FIG. 17.

FIGS. 18*a* through 18*c* depict example design details of novel connectors.

FIG. 18*a* depicts several examples of web stiffeners rib stiffeners or rib stiffenings or structural stiffenings or stiffeners or ribs or webs that can be substantially used at any location on any stiffener on novel connectors or on external clamps or on internal clamps described herein. Stiffener examples are shown schematically as shells and they are mounted on a demonstration web 1808. Stiffener 1801 is a double sided stiffener, stiffener 1801 is a similar single-sided stiffener. Any other web stiffeners, shown or not shown can be single-sided or double-sided. Other examples shown are angle stiffener 1803, T-stiffener 1804, bulb plate stiffener 1805 (with the bulb shown as a solid component), undercut stiffener 1806 and double-undercut stiffener 1807.

FIG. 18*b* shows equalizing hole reinforcing ring 1817 and example fitted pins 1790 and 1795, which are described in the description of FIG. 17. Reinforcing ring 1817 can be used to strengthen a fairing plate or a screen in a case of pressure transients or/and it can be required because of pressure transients associated with high thermal transients.

The materials used can be metallic or non-metallic (tungsten, cemented carbides, crystals like corundum, beryllium, diamond for non-oxidizing flows, etc.).

FIG. 18*c* depicts an example of a typical axisymmetric thread used on boxes 1800 and/or pins 1810, but it is also a relevant illustration regarding left-handed and/or right-handed threads, see further below. Thread generatrix 1820 is that on the loaded side of the thread on box 1800 and thread generatrix 1830 is that on the unloaded side of the tooth. The loaded sides are those that resist disassembly of a connector. Angle $\Theta 2_b$ is measured between the normal to the box or connector axis (coinciding) and generatrix 1820. Angle $\Theta 1_b$ is measured between the normal to the box or connector axis (coinciding) and generatrix 1830. Thread generatrix 1840 is that on the loaded side of the thread on pin 1810 and thread generatrix 1850 is that on the unloaded side of the tooth. Angle $\Theta 2_p$ is measured between the normal to the pin or connector (coinciding) axis and generatrix 1840. Angle $\Theta 1_p$ is measured between the normal to the pin or connector axis (again coinciding) and generatrix 1850. Angles $\Theta 2_b$ and $\Theta 2_p$ are typically greater than zero (preferably approximately halves of angles $\Theta 1_b$ and $\Theta 1_p$), even though designs with angles $\Theta 2_b$ and $\Theta 2_p$ equal to or close to zero have been used. Angles $\Theta 2_b$ and $\Theta 2_p$ close to zero are superior structurally, but connectors featuring such angles can be very difficult or impossible to disassemble; assembling them can be difficult too. Known connectors typically use $\Theta 2_b = \Theta 2_p$ and $\Theta 1_b = \Theta 1_p$, which can also be the case in novel connectors. However, in many design cases novel connectors use mismatching thread angles that is to say $\Theta 2_b \neq \Theta 2_p$ and/or $\Theta 1_b \neq \Theta 1_p$, see FIG. 19. The manufacturing tolerances on thread angles $\Theta 1_b$, $\Theta 1_p$, $\Theta 2_b$ and $\Theta 2_p$ required should be very small (high accuracy required), and each few hundreds of a degree of thread angle mismatch makes a noticeable difference in thread tooth loading when an accurate Finite Element Analysis (FEA) is carried out. Therefore, conservatively connectors can be regarded as utilizing novel generatrix angle mismatches when any of the absolute values of mismatch angle $|\Delta\Theta 2| = |\Theta 2_b - \Theta 2_b|$ or that of mismatch angle $|\Delta\Theta 1| = |\Theta 1_b - \Theta 1_b|$ is not smaller than 0.02°, but smaller or larger values like for example 0.01°, 0.02°, 0.05°, 0.075°, 0.1°, 0.125°, 0.15°, 0.175°, 0.2°, 0.25°, etc. . . . or even more than 0.35° can be selected for the above purpose.

The types of mechanical connectors of long torsional and bending fatigue life provided with tapering outside diameters of boxes with optional tapering inside diameters of pins or/and optional radial ribs are immaterial, all connectors described or/and disclosed herein can be provided with variable outside stress diameters of boxes, variable stress inside diameters of pins or/and optional ribs. In addition to the connectors similar to those depicted those shown on FIGS. 14*a*, 16 and 17 connectors depicted on FIGS. 1 through 11*y* can be also provided with variable outside diameters of the boxes, tapered outside stress diameters of boxes (or their approximations), with optional variable or tapered inside stress diameters of pins (or their approximations) or/and optional ribs. The said novel variations and/or tapering of stress diameters are not limited to those depicted on FIGS. 14*a* through 17. In particular the taper angles can vary along the boxes and/or pins in order to provide hoop stress and meridional bending flexibility distributions along of the boxes and/or pins optimal for any particular application examples shown on FIGS. 14*a* through 17 were selected because they feature meeting design requirements that tend to fall on technically demanding sides.

Figure 19:
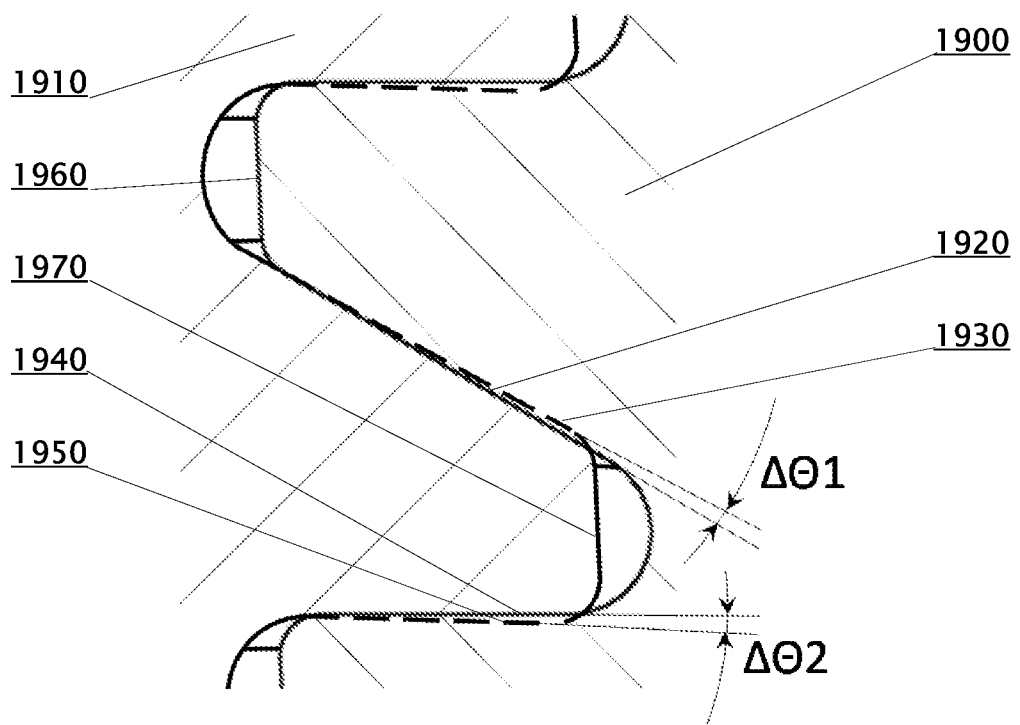

FIG. 19 depicts schematically a detail of a cross section of interacting threads of box 1900 and pin 1910. Optional tooth crest geometry modifications that result in interference fit are shown exaggerated.

The typical radial interference fit between box 1900 and pin 1910 results in normal contact pressures between tooth surfaces 1920 and 1950 of pin 1910 as well as 1930 and 1950 of box 1900, respectively. As already highlighted above, the above mentioned radial interference fits are illustrated in exaggeration on FIG. 19, with the thread side annotations indicated respectively. Thus, FIG. 19 illustrates in exaggeration the interference fit of the unloaded sides 1920 of the pin and 1930 of the box and it also illustrates in exaggeration interference fit between the loaded sides 1950 of the pin and 1940 of the box.

In addition to the 'regular' radial interference fit of the thread, a design of additional, superimposed interference fits as illustrated schematically on FIG. 19 is preferably carried out so that the material stressing of box 1900 and pin 1910 remains essentially in the elastic range. For axisymmetric threads, thread mismatch angles $\Delta\Theta 1$ and $\Delta\Theta 2$ are in the meridional planes of the connectors, as shown in exaggeration on FIG. 19. For threads featuring non-zero pitch angle values, thread mismatch angles $\Delta\Theta 1$ and $\Delta\Theta 2$ are defined analogously to the above, but the thread mismatch angles are measured in planes normal to crest lines of the threads. Using generatrices on unloaded and loaded sides of teeth while defining the above angles assures that those angles are always measured in planes normal to crest lines of the threads. With a novel thread mismatch angle between the generatrix of surface 1920 and the generatrix of surface 1930 $\Delta\Theta 1 > 0$, an increase of normal contact pressure near tip 1970 of tooth of the thread on pin 1910 results in comparison with the corresponding normal contact pressure distributions in known designs, i.e. those featuring the radial interference fit only. With a novel thread mismatch angle between the generatrix of surface 1940 and the generatrix of surface 1950 $\Delta\Theta 2 > 0$, additional increase of normal contact pressure near tip 1970 along other parts of surfaces 1920, 1930, 1940 and 1950 result. Whenever thread mismatch angle $\Delta\Theta 2$ is greater than approximately thread mismatch angle $\Delta\Theta 1$ the interference fit results also in bending and shear of tooth of pin 1910 that is defined by surfaces 1930, 1950 and tooth tip 1970. With slim designs of pin teeth the said bending may also be effective whenever thread mismatch angle $\Delta\Theta 1 \approx 0$, or is negative (under the absolute value symbol). Axial interference fit between surfaces 1940 and 1950 against interference fit between the outside contact abutment surfaces is therefore affected by the said radial interference fits. Essentially elastic bending of teeth interacting results in more even axial and/or bending load distributions along connectors than those that would have taken place for angles $\Delta\Theta 1 = \Delta\Theta 2 = 0$ due to the resultant decrease in the spring stiffness of the threads. This effect is more pronounced for 'slim teeth' threads (and relatively small axial spacing), than it would be for threads utilizing a greater axial spacing. FIG. 19 illustrates teeth interaction geometries featuring essentially rectilinear generatrices of contact surfaces 1920, 1930, 1940 and 1950, however in general cases some or all of the said generatrices can be curvilinear for more accurate control of normal contact pressure distributions along the contact surfaces.

It is well known that end teeth take most of the loading on threaded connections. For novel connectors designs featuring relatively smaller design pressures, smaller axial loads and/or smaller bending loads than those typically specified for connectors used on production risers offshore, using less thread teeth may be acceptable. Thread angle mismatching results in improved, more uniform thread loading along the connector. That is because of the smaller spring constant of a smaller axial spacing, slimmer teeth. Denser grouping of greater axial spacing teeth near the ends of the thread helps additionally, because of greater spring stiffnesses of those teeth than are those of a regular axial spacing teeth. In such arrangements more of the load of the regular end teeth is transferred to nearby teeth featuring increased axial spacing, see the thread on pin 1810, FIG. 18c, where only 3 'slim' teeth are used between the end 'thick' tooth and the next 'thick' tooth. Similar approach was utilized in the designs shown on FIG. 14a, 15a through 15c, 16 and 17, in all cases on both thread ends.

Maximum contact pressures in regions of pin tooth tip 1970 increase the effectiveness of leak prevention along the surfaces interacting of box 1900 and pin 1910. In cases where temperature gradients exist along the connector, heat transfer coefficient (according to the Fourier Law) across the contact surfaces is higher where higher contact pressures occur. Other important factors affecting the heat transfer are for example the roughness and the waviness of the contact surfaces as well as film heat transfer coefficients (conduction, convection and radiation, whichever applies) of fluids, vacuum (or solids, see FIG. 20) filling voids and gaps between the contact surfaces.

Whenever the tooth crest shape modification principle illustrated on FIG. 19 is reversed (increased contact pressures in the region of box tips 1960, not shown on drawings) similar crest shape modifications would have similar positive effect on leak-proofing, but the structural effects would be decreased, because there is normally a gap between the inside abutment surfaces. However, the said reversed tooth crest shape modification principle may enhance heat transfer between pins and boxes in installations where connector pins 1910 tend to be hotter than connector boxes 1900.

Figure 20:
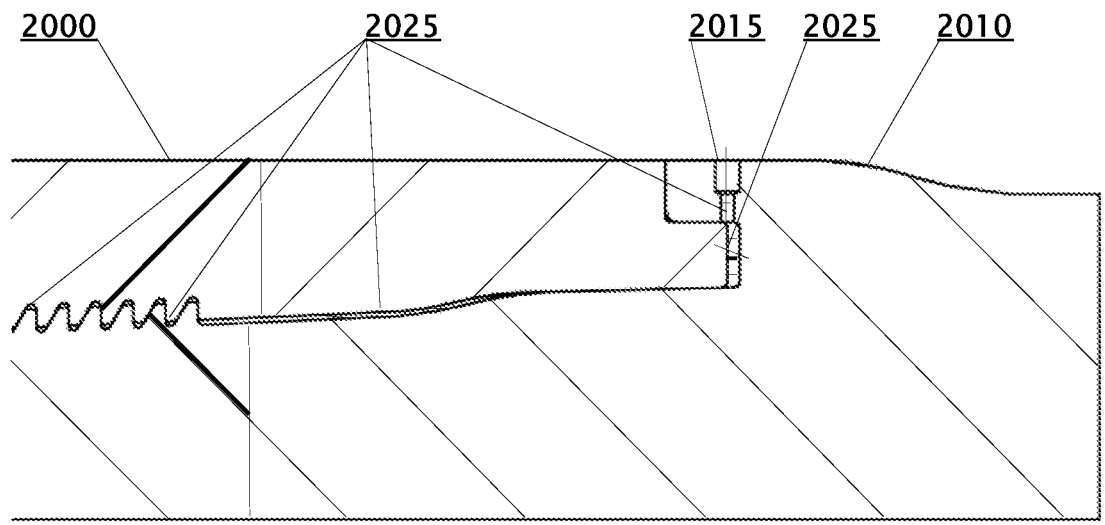

FIG. 20 depicts a detail of connector box 2000 interacting with pin 2010 featuring a novel use of assembly/disassembly fluid 2025 solidified in cavities. According to one implementation of this principle, after an assembly at an elevated temperature with the assembly/disassembly fluid liquid (molten if it is metallic), the connector is cooled in a controlled way, so that the desired excess of assembly/disassembly fluid is removed, after which plugs 2015 are inserted into the fluid outlet ports and fluid inlet port(s) are (are) also plugged allowing the remaining fluid to solidify in all the voids during a controlled cooling. According to another implementation of this principle the assembly temperature may not need to be elevated and instead of an essentially liquid (or molten) assembly/disassembly fluid, a polymeric resin freshly mixed with a hardener, and/or accelerator, and/or catalyst(s), etc. can be used. After the box and the pin are fully telescoped together, the excess of the assembly/disassembly fluid is removed, the resin remaining is allowed to polymerize, thus also forming an essentially solid seal. Many resins, including some epoxy resins can be subsequently optionally re-liquefied by heating up for optional disassemblies and pressurized at elevated temperatures for the purpose of disassembling. Glass Transition Temperature of a polymer used versus the design temperature range of a connector needs to be taken into account. Whichever implementation is used, axial and bending load cycling can be optionally used after the assemblies during the fluid solidification stage.

For all novel connectors, and in particular for those featuring lighter designs, care should be taken to make sure that the design properly addresses and prevents occurrence of buckling in all the modes buckling could potentially occur. That is in particular important during the assembly/disassembly and in operation. Buckling potential remains often unidentified during finite element analyses (FEAs), and other established engineering methods are used instead. For novel connectors one can mention for example cardioidal buckling of pin, bellows-mode buckling of pins and/or boxes, shell buckling and/or stiffener web-buckling of optional fins. Those may be caused by the assembly/disassembly fluid pressure and/or by combinations of loads under various loading scenarios.

Suitable safety measures must be applied at all times, while taking into account that considerable potential energy can be stored in the connector system during operations, during assembly and disassembly, and particularly so whenever highly compressed gas is used.

High torsional capacity arrangements can involve a single set of means limited to one connector region or any of the high torsional load capacity means can be mixed in the design of any particular connector. It is not practical to depict on drawings all the implementations of this invention involving all novel combinations of configurations feasible, accordingly FIGS. 1 through 20 should be treated as examples only, selected for the explanation of operational principles of the designs under this invention.

Newly designed connector elements should be dimensioned for specific design requirements. In particular some novel connectors require high static and fatigue torsional and bending capacities of the same order, while for example their design axial load capacities may be a great deal smaller than are those typical of the applications of the Merlin™ family connectors. In such cases novel connectors may require smaller numbers of threads similar to those shown herein as 160, 165, 350, 355, 1140, etc., and the teeth profiles used may be 'slimmer'. The designs of such novel connectors may turn up to be more compact than are typically those used in Merlin™ family connectors used on a pipe of the same size. Stress analyses, design testing required, etc. are similar to those typically used in designing and qualifying known Merlin™ family connectors, with torsional load related considerations added. Whenever thermal loading is involved, including transients, the testing programs may need to be extended accordingly. The teeth designed to carry predominantly torsional loads or predominantly bending may have more symmetrical profiles than are those that carry axial, bending and axial pre-stressing loads, because typical loadcases of novel connectors may involve reversible torsional loads (i.e. clockwise and anticlockwise) and reversible bending loads (i.e. left and right in plane, and left and right out-of-plane) of say an adjacent elbow, while negative and positive load amplitudes are often similar.

For many novel implementations it is recommended to use a carefully selected torsional preload of interacting surfaces, which in particular can be achieved by means of radial preload which results in a desired circumferential fit between the surfaces interacting. The use of a suitable torsional preload is preferable for similar reasons as are those with regard to the axial and bending loading of traditional Merlin™ family connectors, which is obvious to anybody skilled in the art. For the same reason, whenever a close to 90° pitch angle grooving is used, or splines are used, providing such connectors with optional external ribs that would stiffen the connector in meridional bending might be considered in the design optimization. Increasing meridional bending stiffness of a connector by means of meridional ribs hardly affects its bulk torsional flexibility. For the same reason splines may be often preferred to high pitch angle threads 1120, 1121.

It is noted that the description and figures included herein do not limit the design range of the novel connectors to only those solutions depicted on drawings and/or discussed explicitly. The discussion and figures included herein characterize whole classes and families of novel connectors with only some specific representations shown as outline examples characterizing broader classes of novel connectors.

For example novel connectors utilizing fitted pins many other but shown shapes of fitted pins used in mechanical engineering (including those having for example square or hexagonal cross-sections) that are suitable for torque transfer according to this invention, can be also used to transfer torsional loads while being arranged between other box and pin surfaces, not shown on FIGS. 5, 6, 17 and 18*b*. For example, some designs of novel connectors may be suitable for placing fitted pin rows in the cavities of the (metal) nipple seals, like those shown as 140, at the end of a box, at the end of a pin or in both those locations, see FIGS. 12 and 13. Fitted pins can also be used between dog-clutch teeth 780, 706, 716, 990, 906, 916, etc. All such families of connectors feasible are hereby regarded as novel connectors. Connectors featuring other grooving patterns than are those shown on FIG. 11*a* through 11*x* or on other figures herein are also regarded as connectors according to this invention.

Dog-clutch teeth can also be arranged at the ends of (metal) nipple seals, like those shown as 140, again at either one or at both connector ends, see FIGS. 11*n*, 11*p*, 11*r*, 11*w*, 11*x*, 11*y*, 12 and 13.

Novel connectors can be welded to the ends of pipes to be connected, or the pins and the boxes forming a connector can be shaped in the actual pipe material used. Typically high yield strength and small grain high quality materials are used for manufacturing novel connectors. Components of novel connectors can be built from materials compatible with sweet or sour service requirements; they can be clad or lined, etc., as the design needs require. Those include boxes and/or pins and/or other components used in the same connector being made of different materials. Boxes and/or pins and or/other components used in the same connector can utilize or not utilize weld overlay(s), lining and/or cladding as required. CRAs, titanium alloys, aluminum alloys, magnesium alloys, nickel based alloys, steels and other alloys can be used depending on the design needs. Conventional or novel welding techniques, like for example friction welding and 3D printing can be used. Molding or injection molding can also be used with many metals or alloys (example aluminum alloys).

During the design multiple considerations should be taken into account, in order to provide novel connectors with high fatigue strength. In particular the accuracy of finish of the surfaces of the connector is important for pre-stressing and for high fatigue load applications. It is recommended in particular that novel connectors be built to high degree of accuracy and very smooth surface finish. It is recommended to consider carrying out shot peening, laser peening or equivalent during the manufacturing operations. High accuracy grinding and polishing should also be used, or at least considered. Benefits of thermal treatment should also be utilized where applicable, including surface thermal treatment, nitriding, etc. For small diameter connectors precision manufacturing technology should be used.

In cases of crisp separations between the axial-bending and torsional load capacity areas (for example for dog-clutch, key and spline designs) novel mechanical connectors need to be designed against accidental locking in a similar way to that, which is used in Merlin™ family connectors and/or its third party derivations, see for example U.S. Pat. No. 8,056,940.

Whenever a novel connector has to be assembled at a specific relative azimuth angle orientation of a pin versus a box, it is optionally recommended that external markings are provided to facilitate the assembly with that correct azimuth angle. An optional assembly guide system can be provided and it can be designed in varieties of ways. It can be removable, or it can be left permanently on the connector in use, etc. Subject to specific design requirements for specific connectors the above recommendations normally apply to most novel connectors.

Merlin™ family connectors and mechanical connectors of long torsional and bending fatigue life and other novel connectors have excellent leak-proof capabilities. Metal (nipple) seals at both the inside and outside diameters feature interference fits, which are very effective in sealing. For additional sealing barriers axisymmetric, zero pitch angle threads can be utilized. They are typically radially, circumferentially and axially prestressed. Non-zero pitch angle threads (wherever used) as well as external abutment surfaces such as 1459, 1659 that are interference fitted against the thread surfaces normal to the axis of the connector can also be utilized. An optional additional sealing barrier can be added by incorporating O-ring(s) elastomeric or metal, metal C-ring(s), E-ring(s), U-ring(s), etc. in the gap between inside abutment surfaces such as 1457 and/or 1657. The engineer needs to make sure that sufficient draining/exit is provided to remove the excess of the assembly/disassembly fluid after the assembly. Special means may need to be provided for that, like for example channels connecting thread tooth cavities, additional assembly/disassembly fluid outlet/inlet ports, if required etc. These may be especially required in cases where the threads utilize novel thread angle mismatching described above. In particular, it can be noted in the above context that axisymmetric threads can be utilized to provide very effective extra in-service sealing between boxes and pins of connectors according to this invention.

Wherever axisymmetric threads are utilized to provide in-service sealing, it may be beneficial to provide optional check valves or other similar arrangements in plugs closing the assembly/disassembly fluid outlet/inlet ports. Those together with optional fluid capture/removal systems can be used in a case in service swelling occurs in any sealed compartment of the annulus between the box and the pin; that can happen because of variations in the pressure of fluids transported by the connector.

In order to improve even further the leak resistance of all connectors of the types listed herein, in some applications it may be feasible to utilize for assembly and disassembly fluids that would solidify in the design range of working temperatures of the said connectors, thus becoming solid seals, or practically solid seals in cases such as using natural or synthetic resins, mastics, or mastics like substances, etc. Assembly/disassembly at elevated temperatures may be utilized for that purpose, but that need not necessarily be the case, like for example in a case of using liquid mercury or of sodium-potassium eutectic (NaK) at environmental temperatures for connectors operating in low temperatures including cryogenic temperature ranges. The fluids used can be nonorganic, organic and in particular metallic.

Care should be taken on the physical, chemical, electro-chemical, toxic and metallographic properties of the solidifying fluids used.

The physical properties include in particular the temperatures and pressures of the triple points of the fluids and their critical properties, the boiling temperatures, as well, the temperatures of recrystallization as well as the degrees of shrinkage (or otherwise) while solidifying. The chemical properties involve the fluid reactiveness with the connector materials, with the fluids transported in the pipelines or tubing as well as with other materials used. The chemical and electro-chemical properties of importance also include corrosion related aspects. Fluid toxicity can also be of importance. For example mercury cannot be used in aeronautical applications that utilize aluminum alloys. The metallographic properties include the subjectivity to diffuse into structural alloys (or other materials used), etc., (hydrogen induced brittleness, desirable or undesirable nitriding, etc.). One can also mention here phase changes in solid sealants that occur with the change of temperature, because of natural changes in crystal structures, of the solubilities of alloyed phases in other alloyed phases etc., including eutectoidal changes etc.

Ideally the fluid used would be liquid at the temperature of application and would solidify with required shrinking, if any is required at all, and remain solid in the entire range of the design conditions. The solidification shrinking, as prescribed may be beneficial, because it may partly or wholly take care of the need to remove excess assembly/disassembly fluid at the last moments of connector assembly. Such solid seals would fill all the gaps very effectively and work like O-rings. Also ideally the solid seals would have lower material strength than that of the connector material, so that they could easily deform plastically under the action of changing loads. The temperature of recrystallization would ideally fall below the design operational range of temperatures, which would enable unlimited ductility under dynamic loading (example: lead solid seals).

For applications where it could be difficult or impossible to find a fluid/solid substance meeting all the above criteria, the work below the temperatures of recrystallization may be acceptable in some applications, in particular when the solid seal material is temporarily heated above its temperature of recrystallization. Phase changes due to different phase equilibriums with temperature (like for example eutectoidal transitions) can have similar effect in lieu of recrystallization. Alloys where transitions like that take place and also other alloys should be examined thoroughly in order to make sure that no hardening like phenomena that could be unacceptable take place no undesirable phases be formed, etc. Also in some applications it may be acceptable to allow temporary melting of the sealing material in the design temperature ranges followed by re-solidification. In cases where the liquid material can boil, extreme care would be required in order to make sure that the vapors do not cause cavitation damage or other structural damage as well as that the subsequent re-solidification happens slowly enough to evenly re-distribute the seal material when it remains liquid, and not to upset the connecting functions of the connector. It is preferred to avoid boiling in the design temperature ranges. Just in case, fluid inlet and outlet plugs can be provided with pressure overload safety valves.

For applications in the environmental ranges of working temperatures sealing materials also used as primary coolant in nuclear reactors can be considered. Those include mercury, lead, lead-bismuth eutectic, sodium, potassium, sodium-potassium eutectic (NaK). Other materials include for example aluminum, aluminum alloys, copper, copper alloys including bronzes and brasses, lithium, lithium-sodium eutectic, tin, bismuth, zinc, magnesium, low melting (fusible) alloys like Rose's metal, Wood's metal, Field's metal, Darcet's alloy, safe metal, Low 117, Low 136, bend metal, Mellotte's metal, matrix metal, base metal, tru metal, cast metal, etc. Other known metals and alloys, in particular binary, ternary, etc. eutectics specially designed for particular design conditions can be also used. For example a feasibility of formations of binary lithium-potassium and ternary lithium-sodium-potassium eutectics can be investigated, and if feasible, their properties can be investigated and evaluated for use as liquid/(metal) nipple seals. Many of the above listed alloys have melting temperatures considerably below the boiling temperature of water, accordingly boiling water or water steam can be conveniently and economically used during the novel connector assemblies/disassemblies. Some remain liquid even below the water ice melting temperature.

The use of metallic or alloyed liquids/solid sealants can be of particular benefit where good heat transfer properties are required between pins and boxes. Many alloys feasible are good solders, and when applicable good solder like wetting of connector materials can be desirable both to improve solid to solid heat transfer and the sealing properties. Suitable flux substances can be added. Sealant density can be also of importance, however where the volumes of the sealant are small, the sealing and/or conduction benefits may outweigh the increase of weight of the connector.

INDUSTRIAL APPLICABILITY

Known Merlin™ family connectors are used primarily for connecting tendon and rigid riser, including Steel Catenary Riser (SCR) joints. In those applications tension and bending loads are high, while torsional loads are very small. Use of Merlin™ family connectors have been at least suggested for rigid jumper joints, however such a use would be limited to those jumper connections that do not see very high torsional loads. Novel connectors are suitable for use in rigid jumpers subject to very high static and fatigue torsional and bending loads. For example complicated three dimensional rigid jumpers are often used in ultra deepwater.

Simple shaped inverted 'U' or 'W-shaped' rigid jumpers are often used to connect subsea wellheads with Pipeline End Terminations (PLETs) or Pipeline End Manifolds (PLEMs). Those are fitted at ends of subsea pipelines that expand thermally in their longitudinal directions. PLETs and PLEMS slide on their mudmats imposing torsional loads on the vertical segments of the jumpers and connectors and bending loads on the remaining segments of those jumpers. Whenever the jumpers are short, high torsional loads must be resisted by the connectors. Novel connectors are more suitable for the use with inverted 'U' and 'W-shaped' rigid jumpers than are known Merlin™ family connectors, and they are more economical to use than collet connectors are.

Another class of examples of suitable use of novel connectors are those required for connecting elbows and pipe segments in rigid jumper designs of SCR hang-offs disclosed in U.S. Pat. No. 8,689,882 by Wajnikonis and Leverette. Those inventors state that spools resisting rotational deflections of the SCRs are subject to high torsional loads; bending loads are also mentioned.

Newer riser hang-offs according to WO/2016/191,637 issued as U.S. Pat. Nos. 10,024,121 and 10,240,400 and also granted as British Patent GB 2,556,700, all by Wajnikonis ideally require novel connectors. These connectors are typically subjected to even higher static and fatigue torsional and bending loads than are those experienced in SCR hang-offs according to Wajnikonis and Leverette. In the presently discussed newer designs, the torsional and bending loads tend to be of the same order of high magnitudes.

In both the older and the newer classes of the said SCR and rigid riser hang-offs the effective tensions are very small, the actual or 'wall' tensions in those connectors being governed by so called 'end cap' pressure effects. That implies considerably lower actual or 'wall' tensions than are those typically experienced by known Merlin™ family connectors used for example to connect SCR joints. All the technical terms used here are used in engineering codes and are familiar to those skilled in the art.

Novel connectors can be used to connect pipes made of materials that cannot be welded together (example steel alloys and titanium alloys) or of other materials that are difficult or impossible to weld. Additional fields of industrial application may be listed. Because of their reliability and the extremely low susceptibility to leaks, novel connectors can be used for piping and pipelines in the chemical, onshore or offshore cryogenic installations and in the nuclear industry. Depending where known or novel Merlin™ family connectors are used, the additional level of leak-tightness provided by utilizing external clamps 1170 and/or internal clamps 1180 according to this invention depicted on FIG. 11$y$ and on FIG. 11$z$ can be important in preventing leaks of Green House Gases (GHGs) and/or vapors and/or their liquid phases. Those include for example only carbon dioxide $CO_2$, carbon monoxide CO, natural gas or methane $CH_4$, ammonia $NH_3$, sulphur dioxide $H_2S$, various nitrogen oxides $NO_x$, sulphur oxides $SO_x$, a multitude of freon gases, vapors and/or other refrigeration gases, most of the above either in a gaseous or liquid state. Helium He, nitrogen $N_2$, hydrogen $H_2$, halogenic gases like fluorine $F_2$, chlorine $Cl_2$, bromine $Br_2$, iodine $I_2$, astatine $At_2$, etc. and many other substances can be also carried as internal fluids in gas or liquid phase. External clamps 1170 and/or internal clamps 1180 already described can be also utilized with connectors utilized in lines and/or installations containing methanol $CH_3OH$, ethanol $C_2H_5OH$, other alcohols, glycols or glycerins, etc., multiple grades of petroleum oil, petroleum products like all grades of gasoline (petrol), kerosene, jet-fuels, rocket propellants, and many more. These and many other substances used universally in everyday life, as well as many substances used in Chemical Industry (some very exotic) are GHGs and many can be additionally very harmful to life and/or to the environment. External clamps 1170 and/or internal clamps 1180 according to this invention depicted on FIG. 11$y$ and on FIG. 11$z$ can be used in any industry, including the chemical, oil & gas, steel production, cement production and Nuclear Industry in order to increase reliability of connectors with regard to a possibility of toxic, greenhouse and/or radioactive leaks. The remainder of an assembly/disassembly fluid can be left in the connector or replaced with other substances including fluids or solids (note above and Parent application Ser. No. 15/782,835) in which the transported substances do not dissolve well or through which the transported substances do not diffuse well. This invention can also be beneficial by providing more reliable connectors for pipelines crossing environmentally critical areas like National Parks, densely populated areas, etc. External clamps 1170 and/or internal clamps 1180 according to this invention depicted on FIG. 11$y$ and on FIG. 11$z$ can be also beneficial in preventing leaks of precious water that are considerable in the U.S. and in many other countries. In addition to the above features, novel connectors have very slim designs and low weights. Accordingly, they also deserve to be considered for aerospace applications, in particular cryogenic tubing or piping.

Low cost, high production volumes of connector components used in piping made of non-metallic materials, like for example plastics, composites, bonded and unbonded flexible pipe, etc. may be another possible field of application. Large numbers of very accurately dimensioned plastic boxes and pins used in novel connectors can be mass produced for example by casting or by injection molding. When plastic materials are used, tooling for assembling/disassembling may be low pressure hydraulic or pneumatic.

What is claimed is:

1. A telescopically assembled mechanical connector provided with a thread on substantially matching substantially frustoconical surfaces of a box and a pin, said substantially matching substantially frustoconical surfaces of said box and said pin extending substantially between two sets of nipple seals, whereas one said set of said nipple seals is located near an end of said box and another said set of said nipple seals is located near an end of said pin and whereas each said set of said nipple seals incorporates axially engaging, substantially cylindrical surfaces with an outside surface and an inside surface of a male substantially cylindrical annular segment interacting radially through a mechanism of a hoop stress with substantially matching surfaces of a substantially cylindrical annular cavity, whereas said sets of said nipple seals are used for sealing a cavity between said box and said pin;

whereas said telescopically assembled mechanical connector is assembled and disassembled utilizing a pressure of an assembly/disassembly fluid which expands said box and contracts said pin in a radial direction, which enables an assembly stroke in an axial direction that makes up a connection by engaging said threads of said box and said pin or which enables a disassembly stroke along said axial direction by disengaging said threads of said box and said pin respectively; whereas said threads of said box and said pin can engage only in a correct axial position due to a use of a non-uniform axial spacing of said threads, and whereas an excess of said assembly/disassembly fluid is removed through fluid outlet ports;

whereas:
said telescopically assembled is defined as being assembled in a telescopic way,
being assembled in said telescopic way is defined as having all points of said pin and/or said box substantially follow substantially straight lines during an assembly, whereas said straight lines are substantially parallel to substantially coinciding axes of said pin and of said box;
whereas said telescopically assembled mechanical connector includes an at least one mechanical clamp interacting structurally with said box and/or said pin, while remaining unbonded to said box and/or said pin;
whereas said mechanical clamp interacting structurally with said box restricts structurally a shell of said box from radial deformations outwards, that is away from an axis of said telescopically assembled mechanical connector, and/or said mechanical clamp interacting structurally with said pin restricts structurally a shell of said pin from radial deformations inwards, that is towards said axis of said telescopically assembled mechanical connector;
whereas said mechanical clamp stabilizes a substantially circular shape of a cross-section of said telescopically assembled mechanical connector by stiffening structurally said box and/or said pin, respectively;
whereas said mechanical clamp interacting structurally with said box and/or said pin is installed after said box and said pin are assembled telescopically and said excess of said assembly/disassembly fluid is removed through said fluid outlet ports and said mechanical clamp interacting structurally with said box and/or said pin is removed before said disassembly stroke is started;
wherein a radial restricting action of said at least one mechanical clamp interacting structurally with said box and/or said pin by stiffening structurally said outside surface of said box and/or by stiffening structurally said inside surface of said pin structurally compresses radially female and male threads provided on said substantially matching substantially frustoconical surfaces of said box and said pin at all locations around a circumference of said box and around a circumference of said pin,
and wherein said telescopically assembled mechanical connector includes at least one of:
said mechanical clamp stiffening structurally an outside surface of said box,
or said mechanical clamp stiffening structurally an inside surface of said pin.

2. The telescopically assembled mechanical connector according to claim 1, whereas the outside surface of the box is an outside stress diameter surface of said box.

3. The telescopically assembled mechanical connector according to claim 1, whereas the inside surface of the pin is an inside stress diameter surface of said pin.

4. The telescopically assembled mechanical connector according to claim 1, whereas the telescopically assembled mechanical connector includes one or more stiffening ribs.

5. The telescopically assembled mechanical connector according to claim 1, whereas the mechanical clamp includes one or more stiffening ribs.

6. The telescopically assembled mechanical connector according to claim 1, whereas the mechanical clamp stiffening the outside surface of the box is an annular stiffening clamp.

7. The telescopically assembled mechanical connector according to claim 1, whereas the mechanical clamp stiffening the inside surface of the pin is an annular stiffening clamp.

8. The telescopically assembled mechanical connector according to claim 1, whereas at least one of the box or the pin utilizes:
friction welding,
injection molding,
3-Dimensional printing,
traditional welding fabrication.

9. The telescopically assembled mechanical connector according to claim 1, whereas at least one of the box or the pin is made of at least one of:
a high strength steel,
or a corrosion resistant alloy,
or a titanium alloy,
or an aluminum alloy,
or a magnesium alloy,
or a nickel based alloy,
or a non-metallic material including a plastic material,
or a non-metallic natural or a non-metallic synthetic material,
or an composite material,
or a substantially elastomeric material, or a material behaving in a substantially hyperelastic way,
or at least one of said box or said pin utilizes at least one of a lining or a cladding or a weld overlay.

10. The telescopically assembled mechanical connector according to claim 9, wherein the non-metallic material, including the plastic material, or the natural material, or the synthetic material, or the elastomeric material, or the hyperelastic material includes reinforcements with fibers, wires, a fiber-mesh or a wire-mesh.

11. The telescopically assembled mechanical connector according to claim 1, whereas the mechanical clamp utilizes:
   friction welding,
   injection molding,
   3-Dimensional printing,
   traditional welding fabrication.

12. The telescopically assembled mechanical connector according to claim 1, whereas the mechanical clamp is made of at least one of:
   a high strength steel,
   or a corrosion resistant alloy,
   or a titanium alloy,
   or an aluminum alloy,
   or a magnesium alloy,
   or a nickel based alloy,
   or a non-metallic material including a plastic material,
   or a non-metallic natural or a non-metallic synthetic material,
   or an composite material,
   or a substantially elastomeric material,
   or a material behaving in a substantially hyperelastic way,
   or at least one of said box or said pin utilizes at least one of a lining or a cladding or a weld overlay.

13. The telescopically assembled mechanical connector according to claim 12, wherein the non-metallic material, including the plastic material, or the natural material, or the synthetic material, or the elastomeric material, or the hyperelastic material includes reinforcements with fibers, wires, a fiber-mesh or a wire-mesh.

14. A process comprising at least one of:
   a step (a) of said process including an assembly of a telescopically assembled mechanical connector followed by a step (b) of said process including an installation of an at least one mechanical clamp interacting structurally with a box and/or a pin of said telescopically assembled mechanical connector,
   a step (c) of said process including a removal of said at least one mechanical clamp interacting structurally with said box and/or said pin of said telescopically assembled mechanical connector followed by a step (d) of said process including a disassembly of said telescopically assembled mechanical connector,
wherein:
   said telescopically assembled mechanical connector is provided with a thread on substantially matching substantially frustoconical surfaces of said box and said pin, said substantially matching substantially frustoconical surfaces of said box and said pin are extending substantially between two sets of nipple seals, whereas one said set of said nipple seals is located near an end of said box and another said set of said nipple seals is located near an end of said pin and whereas each said set of said nipple seals incorporates axially engaging, substantially cylindrical surfaces with an outside surface and an inside surface of a male substantially cylindrical annular segment interacting radially through a mechanism of a hoop stress with substantially matching surfaces of a substantially cylindrical annular cavity, whereas said sets of said nipple seals are used for sealing a cavity between said box and said pin;
   whereas said telescopically assembled mechanical connector is assembled and disassembled utilizing a pressure of an assembly/disassembly fluid which expands said box and contracts said pin in a radial direction, which enables an assembly stroke in an axial direction that makes up a connection by engaging said threads of said box and said pin or which enables a disassembly stroke along said axial direction by disengaging said threads of said box and said pin respectively; whereas said threads of said box and said pin can engage only in a correct axial position due to a use of a non-uniform axial spacing of said threads, and whereas an excess of said assembly/disassembly fluid is removed through fluid outlet ports;
   whereas:
      said telescopically assembled mechanical connector_is defined as being assembled in a telescopic way,
      being assembled in said telescopic way is defined as having all points of said pin and/or said box substantially follow substantially straight lines during said assembly, whereas said straight lines are substantially parallel to substantially coinciding axes of said pin and of said box;
   said at least one mechanical clamp interacting structurally with said box and/or said pin is installed on said telescopically assembled mechanical connector, while remaining unbonded to said box and/or said pin after said telescopically assembled mechanical connector is assembled telescopically and after said excess of said assembly/disassembly fluid is removed through said fluid outlet ports;
   whereas said mechanical clamp interacting structurally with said box restricts structurally a shell of said box from radial deformations outwards, that is away from an axis of said telescopically assembled mechanical connector, and/or said mechanical clamp interacting structurally with said pin restricts structurally a shell of said pin from radial deformations inwards, that is towards said axis of said telescopically assembled mechanical connector;
   whereas said mechanical clamp stabilizes a substantially circular shape of a cross-section of said telescopically assembled mechanical connector by stiffening structurally said box and/or said pin;
   whereas a radial restricting action of said at least one mechanical clamp interacting structurally with said box and/or said pin by stiffening structurally said outside surface of said box and/or by stiffening structurally said inside surface of said pin structurally compresses radially female and male threads provided on said substantially matching substantially frustoconical surfaces of said box and said pin at all locations around a circumference of said box and around a circumference of said pin;
   whereas said at least one mechanical clamp interacting structurally with said box and/or said pin:
      stiffens structurally an outside surface of said box,
      or stiffens structurally an inside surface of said pin;
   said at least one said mechanical clamp interacting structurally with said box and/or said pin is removed before said disassembly stroke is started.

15. The telescopically assembled mechanical connector according to claim 14, whereas the telescopically assembled mechanical connector includes one or more stiffening ribs.

16. The telescopically assembled mechanical connector according to claim 14, whereas the mechanical clamp includes one or more stiffening ribs.

17. The telescopically assembled mechanical connector according to claim 14, whereas the mechanical clamp is an annular stiffening clamp.

18. The telescopically assembled mechanical connector according to claim 14, whereas at least one of the box or the pin or the mechanical clamp utilizes:
- friction welding,
- injection molding,
- 3-Dimensional printing,
- traditional welding fabrication.

19. The telescopically assembled mechanical connector according to claim 14, whereas at least one of the box or the pin or the mechanical clamp is made of at least one of:
- a high strength steel,
- or a corrosion resistant alloy,
- or a titanium alloy,
- or an aluminum alloy,
- or a magnesium alloy,
- or a nickel based alloy,
- or a non-metallic material including a plastic material,
- or a non-metallic natural or a non-metallic synthetic material,
- or an composite material,
- or a substantially elastomeric material,
- or a material behaving in a substantially hyperelastic way,
- or at least one of said box or said pin utilizes at least one of a lining or a cladding or a weld overlay.

20. The telescopically assembled mechanical connector according to claim 19, wherein the non-metallic material, including the plastic material, or the natural material, or the synthetic material, or the elastomeric material, or the hyperelastic material includes reinforcements with fibers, wires, a fiber-mesh or a wire-mesh.

* * * * *

UNITED STATES PATENT AND TRADEMARK OFFICE
CERTIFICATE OF CORRECTION

| | | |
|---|---|---|
| PATENT NO. | : 11,906,079 B2 | Page 1 of 1 |
| APPLICATION NO. | : 17/976608 | |
| DATED | : February 20, 2024 | |
| INVENTOR(S) | : Krzysztof Jan Wajnikonis | |

It is certified that error appears in the above-identified patent and that said Letters Patent is hereby corrected as shown below:

In the Specification

1. In the formula Column 20, Line 52 replace "*a* tan" with "atan".

The correct formula is: $\alpha = \lim_{\Delta\varphi \to 0} [\operatorname{atan}(\frac{2 \cdot \Delta H}{\Delta\varphi \cdot D_h})]$ 2. In Column 20, Lines 56 through 63 replace "$\Delta\phi$" with "$\Delta\varphi$" in all five locations.

3. In the formula Column 21, Line 7 replace "*a* tan" with "atan" in both locations.

The correct formula is: $\alpha = \lim_{\Delta\varphi \to 0} [\operatorname{atan}(\frac{2 \cdot \Delta H}{\Delta\varphi \cdot D_h})] = \operatorname{atan}(\frac{H}{\pi \cdot D_h})$ Signed and Sealed this
Fifth Day of November, 2024

Katherine Kelly Vidal
*Director of the United States Patent and Trademark Office*